(12) United States Patent
Beigi

(10) Patent No.: US 10,042,993 B2
(45) Date of Patent: Aug. 7, 2018

(54) ACCESS CONTROL THROUGH MULTIFACTOR AUTHENTICATION WITH MULTIMODAL BIOMETRICS

(71) Applicant: Homayoon Beigi, South Salem, NY (US)

(72) Inventor: Homayoon Beigi, South Salem, NY (US)

(*) Notice: Subject to any disclaimer, the term of this patent is extended or adjusted under 35 U.S.C. 154(b) by 48 days.

(21) Appl. No.: 14/747,211

(22) Filed: Jun. 23, 2015

(65) Prior Publication Data

US 2015/0347734 A1  Dec. 3, 2015

Related U.S. Application Data

(63) Continuation-in-part of application No. 13/287,994, filed on Nov. 2, 2011, now Pat. No. 9,064,257.

(Continued)

(51) Int. Cl.
*G06F 21/32* (2013.01)
*G06F 21/62* (2013.01)
(Continued)

(52) U.S. Cl.
CPC .......... *G06F 21/32* (2013.01); *G06F 21/6245* (2013.01); *G06Q 20/3223* (2013.01);
(Continued)

(58) Field of Classification Search
CPC ... G06F 21/32; G06F 21/6245; H04L 9/3236; H04L 9/3268; H04L 63/0861;
(Continued)

(56) References Cited

U.S. PATENT DOCUMENTS 6,553,494 B1   4/2003   Glass
6,684,186 B2   1/2004   Beigi et al.
(Continued)

FOREIGN PATENT DOCUMENTS

WO   WO98/34203   8/1998
WO   WO0031699    6/2000
WO   WO02/41271   5/2002

OTHER PUBLICATIONS

"A k-nearest Neighbor Approach for User Authentication Through Biometric Keystroke Dynamics," Hu et al., Communications, 2008, ICC '08 IEEE International Conference, pp. 1556-1560.
(Continued)

*Primary Examiner* — Kambiz Zand
*Assistant Examiner* — Benjamin Kaplan
(74) *Attorney, Agent, or Firm* — Gordon & Jacobson, P.C.

(57) ABSTRACT

A system is provided in which a person may use a Cellular (Mobile) Telephone, a PDA or any other handheld computer to make a purchase. This is an example only. The process may entail any type of transaction which requires authentication, such as any financial transaction, any access control (to account information, etc.), and any physical access scenario such as doubling for a passport or an access key to a restricted area (office, vault, etc.). It may also be used to conduct remote transactions such as those conducted on the Internet (E-Commerce, account access, etc.). In the process, a multifactor authentication is used.

44 Claims, 39 Drawing Sheets

Related U.S. Application Data

(60) Provisional application No. 61/409,151, filed on Nov. 2, 2010.

(51) Int. Cl.

| | |
|---|---|
| *H04L 9/32* | (2006.01) |
| *H04L 9/00* | (2006.01) |
| *H04L 29/06* | (2006.01) |
| *G06Q 20/32* | (2012.01) |
| *G06Q 20/38* | (2012.01) |
| *G06Q 20/40* | (2012.01) |
| *H04W 12/06* | (2009.01) |

(52) U.S. Cl.
CPC ....... *G06Q 20/3827* (2013.01); *G06Q 20/409* (2013.01); *H04L 9/006* (2013.01); *H04L 9/3231* (2013.01); *H04L 9/3236* (2013.01); *H04L 9/3263* (2013.01); *H04L 9/3268* (2013.01); *H04L 63/0861* (2013.01); *H04W 12/06* (2013.01); *H04L 2209/56* (2013.01); *H04L 2209/805* (2013.01); *H04L 2463/082* (2013.01)

(58) Field of Classification Search
CPC . H04L 2463/082; H04L 9/006; H04L 9/3231; H04L 9/3263; H04L 63/082; H04L 2209/56; H04L 2209/805; G06Q 20/3827; G06Q 20/409; G06Q 20/3223; H04W 12/06
USPC ........................................ 713/155; 726/7, 28
See application file for complete search history.

(56) References Cited

U.S. PATENT DOCUMENTS

| | | | |
|---|---|---|---|
| 7,200,749 | B2 | 4/2007 | Wheeler |
| 7,474,770 | B2 | 1/2009 | Beigi |
| 7,522,751 | B2 | 4/2009 | White et al. |
| 7,702,918 | B2 | 4/2010 | Tattan et al. |
| 7,711,152 | B1 | 5/2010 | Davida et al. |
| 8,384,515 | B2 | 2/2013 | Rachlin |
| 8,595,804 | B2 | 11/2013 | Pratt et al. |
| 9,064,257 | B2 | 6/2015 | Beigi |
| 2001/0000535 | A1 | 4/2001 | Lapsley et al. |
| 2002/0095587 | A1 | 7/2002 | Doyle et al. |
| 2004/0139332 | A1 | 7/2004 | Lim |
| 2004/0151353 | A1 | 8/2004 | Topping |
| 2007/0055517 | A1* | 3/2007 | Spector ............... G06F 21/32 704/246 |
| 2007/0186106 | A1* | 8/2007 | Ting .................. H04L 63/104 713/168 |
| 2010/0115114 | A1* | 5/2010 | Headley ............... G06F 21/32 709/229 |
| 2012/0110341 | A1 | 5/2012 | Beigi |
| 2013/0132718 | A1* | 5/2013 | Agrawal ............. H04L 9/3268 713/158 |

OTHER PUBLICATIONS

"A New Approach for Hand-Palm Recognition", Saeed et al., Enhanced Methods in Computer Security, Biometric and Artificial Intelligence Systems, Lecture Notes in Computer Science, pp. 185-194, Springer London ISBN: 1-4020-7776-9.

"A Novel Approach for Ear Recognition Based on ICA and RBF Network", Zhang et al., 2005, Machine Learning and Cybernetics, Proceedings of 2005 International Conference, vol. 7, pp. 4511-4515.

"Access Control System with Hand Geometry Verification and Smart Cards" Sanchez-Reillo et al., IEEE AES Systems Magazine, Feb. 2000.

"Acoustic Ear Recognition for Person Identification," Akkermans et al., Automatic Identification Advanced Technologies, 2005, Fourth IEEE Workshop, pp. 219-223.

"An Approach to Feature Selection for Keystroke Dynamics Systems Based on Pso and Feature Weighting," Azevedo et al, Evolutionary Computation, CEC 2007, IEEE Congress, pp. 3577-3584.

"An Introduction to Near-Field Communication and the Contactless Communication API," C. Enrique Ortiz, sun, Jun. 2008, available at http://java.sun.com/developer/technicalArticles/javame/nfc/.

"Appearance-Based Facial Recognition Using Visible and Thermal Imagery: A Comparative Study", Selinger et al., 2003.

"Computer-Access Security Systems Using Keystroke Dynamics," Bleha et al., IEEE Transactions on Pattern Analysis and Machine Intelligence, vol. 12, No. 12, pp. 1217-1222, Dec. 1990.

"Ear Recognition by Means of a Rotation Invariant Descriptor," Fabate et al., Pattern Recognition, 2006, ICPR 2006, 18th International Conference, vol. 4, pp. 437-440.

"Evaluating the Reliability of Credential Hardening Through Keystroke Dynamics," Bartlow and Cukik, Software Reliability Engineering, 2006, ISSRE '06. 17th International Symposium, pp. 117-126.

"Face Recognition: Features Versus Templates," Brunelli and Poggio, IEEE Transactions on Pattern Analysis and Machine Intelligence, vol. 15, No. 10, pp. 1042-1052, Oct. 1993.

"Human Ear Recognition in 3d," Chen and Bhanu, IEEE Transactions on Pattern Analysis and Machine Intelligence, vol. 29, No. 4, pp. 718-737, Apr. 2007.

"Human Identification Based on 3d Ear Models," Cadavid and Abdel-Mottaleb, Biometrics: Theory, Applications, and Systems, 2007. BTAS 2007, First IEEE International Conference, pp. 1-6.

Internet X.509 Public Key Infrastructure Certificate and Certificate Revocation List (CRL) Profile, RFC 5280 (Proposed Standard,) Cooper et al., 2008.

"Multimodal Recognition Based on Face and Ear", Yuan et al., Wavelet Analysis and Pattern Recognition, 2007 ICWAPR '07, International Conference, vol. 3, pp. 1203-1207.

"Multi-View Ear Shape Feature Extraction and Reconstruction," Liu and Yan, Signal-Image Technologies and Internet-Based System, 2007, SITIS '07 Third International IEEE Conference, pp. 652-658.

"Personal Identification Based on Iris Texture Analysis" Ma et al., IEEE Transactions on Pattern Analysis and Machine Intelligence, vol. 25, No. 12, pp. 1519-1533, Dec. 2003.

Practice Note: Examples of Financial Services Using Mobile Phones, World Wide Web http://www.ictregulationtoolkit.org/en/PracticeNote.3096.html.

"Rapid Heterogeneous Connection Establishment: Accelerating Bluetooth Inquiry Using IrDA", Ryan Woodings et al., Proc. of the Third Annual IEEE Wireless Communications and Networking Conference (WCNC) 2002, vol. 1, Orlando, Florida, Mar. 2002, pp. 342-349.

"The Transformational Potential of M-Transactions", Vodaphone Group PLc, 2007.

"User Authentication Through Typing Biometrics Features," Araujo et al., IEEE Transactions on Signal Processing, vol. 53, No. 2, pp. 851-855, Feb. 2005.

"Using 2d Wavelet and Principal Component Analysis for Personal identification Based on 2d Ear Structure," Nosrati et al. 2007, Intelligent and Advanced Systems, ICIAS 2007, International Conference, pp. 616-620.

"Visible-Spectrum Biometric Retina Recognition," Borgen et al., 2008, International Conference on Intelligent Information Hiding and Multimedia Signal Processing (IIHMSP2008) pp. 1056-1062.

Wizzit Has Done Its Homework, Says Mphahlele World Wid Web, Crotty, 2005, http://www.nextbillion.net/archive/files/Wizzit%20Business%20Report.pdf.

Encyclopedia of Cryptography and Security, Henk C. A. van Tilborg and Sushil Jajodia, Springer US, New York, 2nd edition, 2011, ISBN: 978-1-4419-5906-5.

Fundamentals of Speaker Recognition, Homayoon Beigi, Springer, New York, 2011, ISBN: 978-0-387-77591-3, http://www.fundamentalsofspeakerrecognition.org.

(56) References Cited

OTHER PUBLICATIONS

"Real-Time On-Line Unconstrained Handwriting Recognition using Statistical Methods," Krishna S. Nathan et al., in International Conference on Acoustics, Speech, and Signal Processing (ICASSP95), May 1995, vol. 4, pp. 2619-2622.
"Pre-Processing the Dynamics of On-Line Handwriting Data, Feature Extraction and Recognition," Homayoon S.M. Beigi, in Progress in Handwriting Recognition, A.C. Downton and S. Impedovo, Eds., pp. 191-198. World Scientific Publishers, New Jersey, 1997, ISBN: 981-02-3084-2.
"Character Prediction for On-line Handwriting Recognition," Homayoon S.M. Beigi, in Proceedings of the Canadian Conference on Electrical and Computer Engineering, Sep 1992, vol. II, pp. TM10.3.1-TM10.3.4.
"Ear recognition based on 2d images," Li Yuan and Zhi chun Mu, in Biometrics: Theory, Applications, and Systems, 2007. BTAS 2007. First IEEE International Conference on, Sep. 2007, pp. 1-5.
"Multi-view ear recognition based on b-spline pose manifold construction," Zhiyuan Zhang and Heng Liu, in Intelligent Control and Automation, 2008. WCICA 2008. 7th World Congress on, Jun. 2008, pp. 2416-2421.
Handbook of Face Recognition, Stan Z. Li and Anil K. Jain, Eds.,Springer, New York, 2005, ISBN: 978-0-387-40595-7.
Unconstrained Face Recognition, Shaohua Kevin Zhou et al, vol. 5 of International Series on Biometrics, Springer, New York, 2008, ISBN: 978-0-387-26407-3.
Handbook of Fingerprint Recognition, ] D. Maltoni et al, Springer, New York, 2003, ISBN: 978-0-387-95431-8.
"Biometric identification through hand geometry measurements," R. Sanchez-Reillo et al., IEEE Transactions on Pattern Analysis and Machine Intelligence, vol. 22, No. 10, pp. 1168-1171, Oct. 2000.
"Stride and cadence as a biometric in automatic person identification and verification," C. BenAbdelkader et al., in Automatic Face and Gesture Recognition, 2002. Proceedings. Fifth IEEE International Conference on, May 2002, pp. 372-377.
"Emotiv epoc+," WWW, 2015, available at https://emotiv.com.
"Wireless non-contact eeg/ecg electrodes for body sensor networks," Y.M. Chi and G. Cauwenberghs, in Proceedings of the International Conference on Body Sensor Networks (BSN), Jun. 2010, pp. 297-301.
"Code signing," Eric Fleischman, The Internet Protocol Journal, pp. 14-26, Mar. 2002, available at htip://www.cisco.com/web/about/ac123/ac147/archived issues/ipj 5-1/ipj 5-1.pdf.

\* cited by examiner

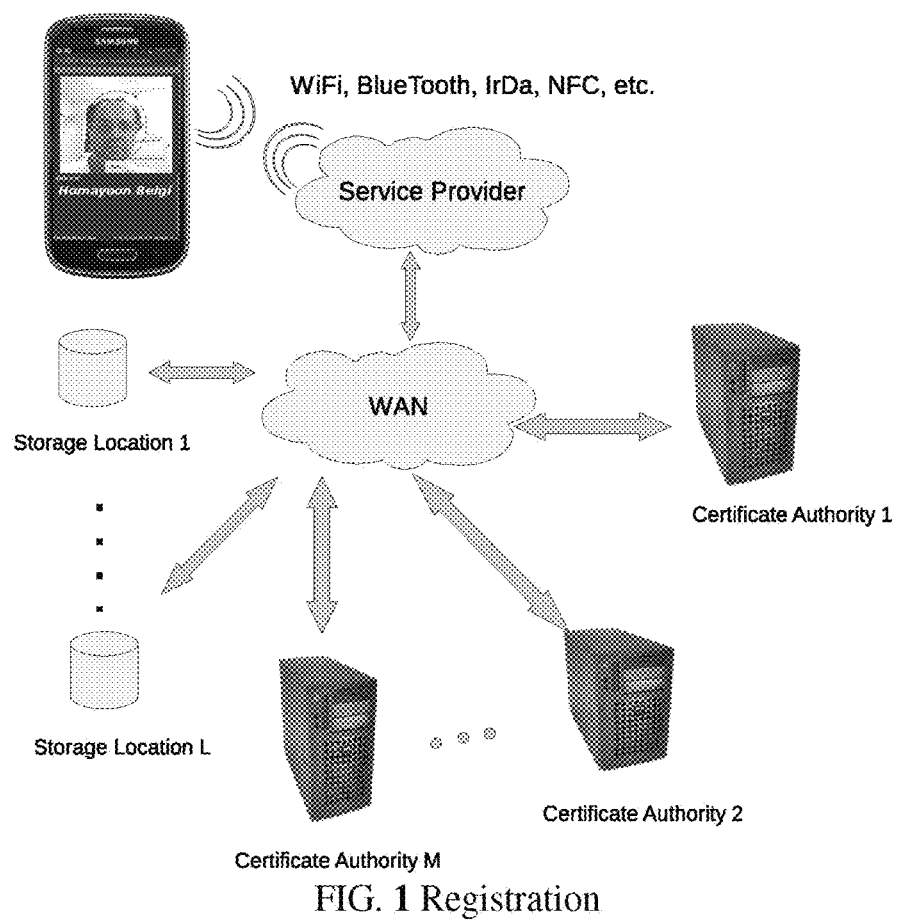
FIG. 1 Registration

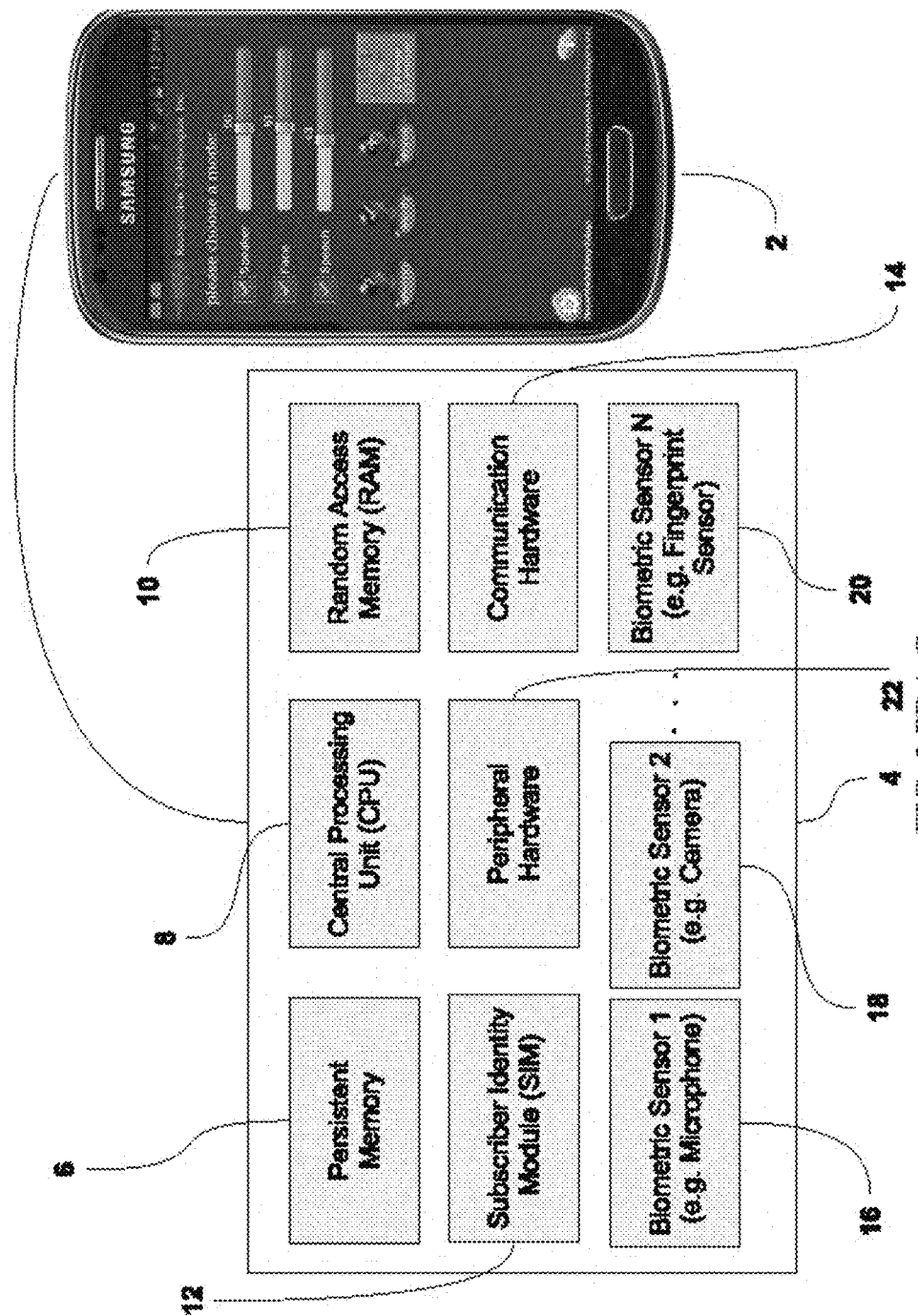
FIG. 2 PDA Components

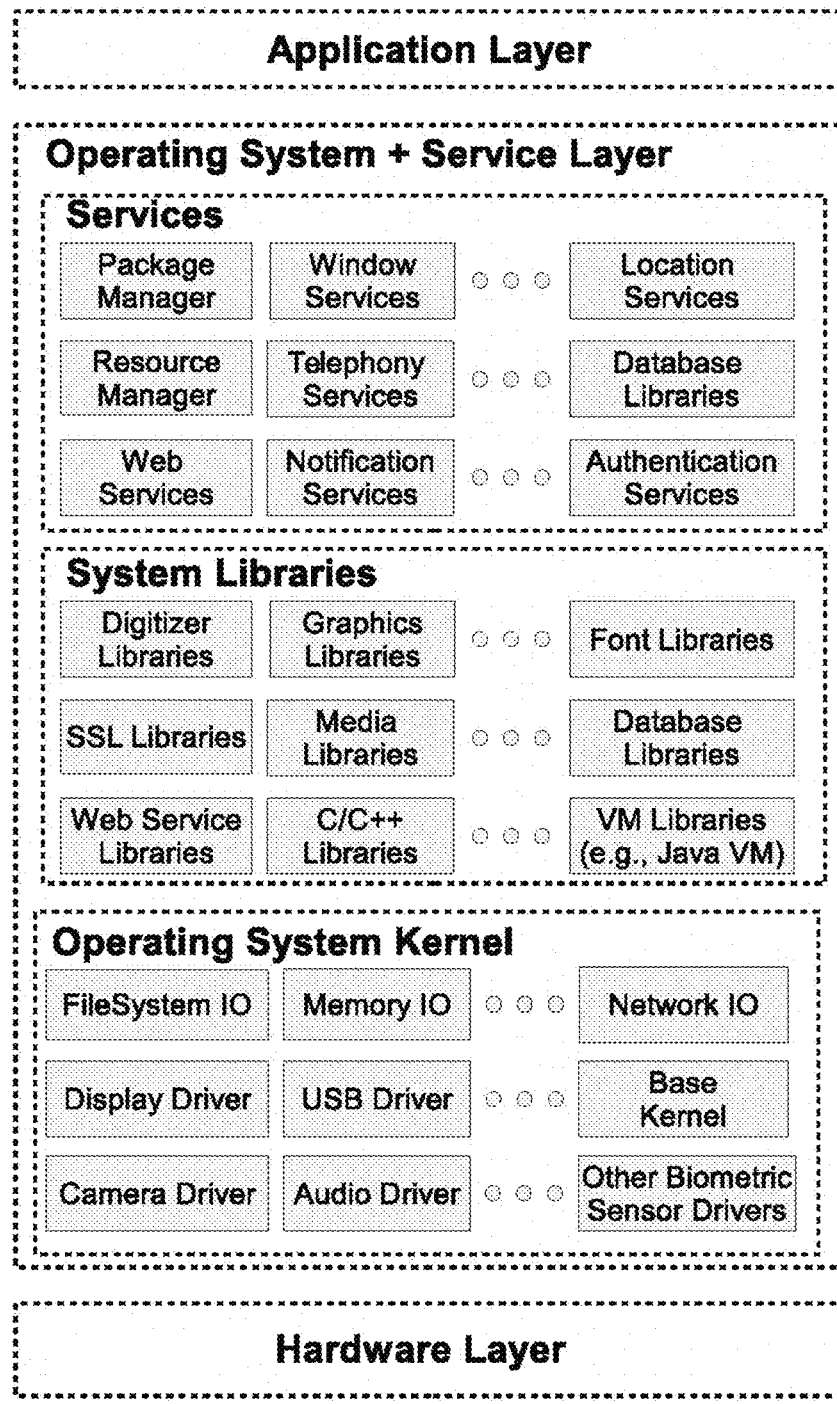
FIG. 3 Generic Architecture

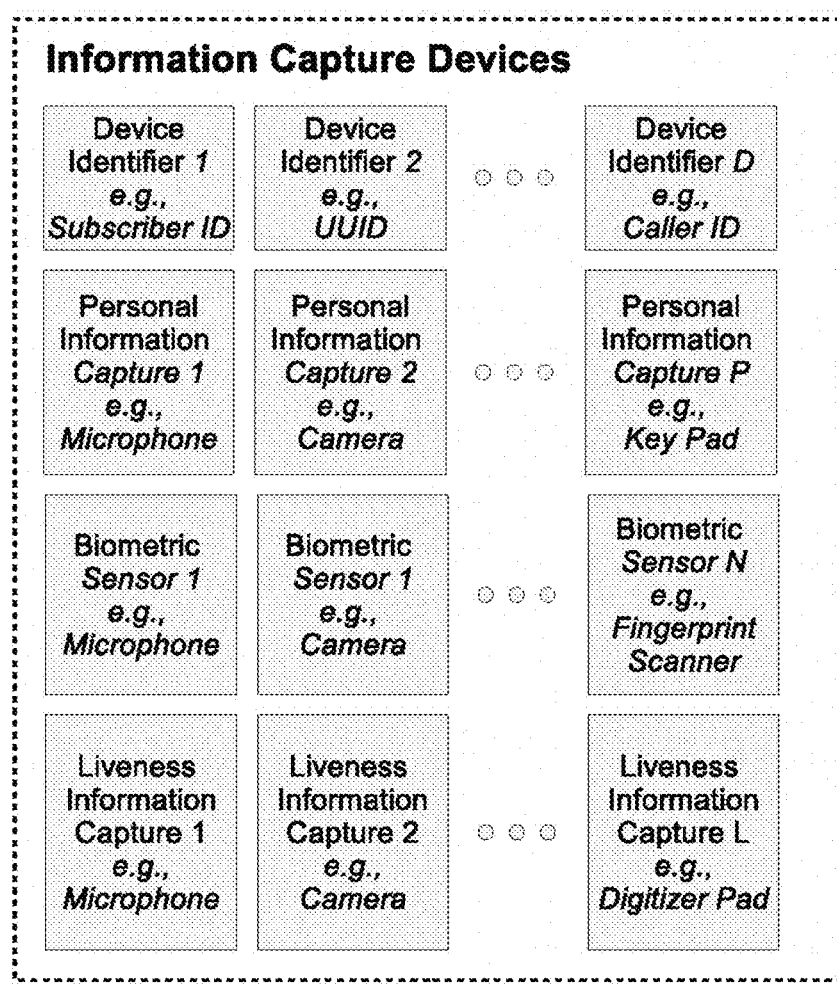
FIG. 4 Capture Devices

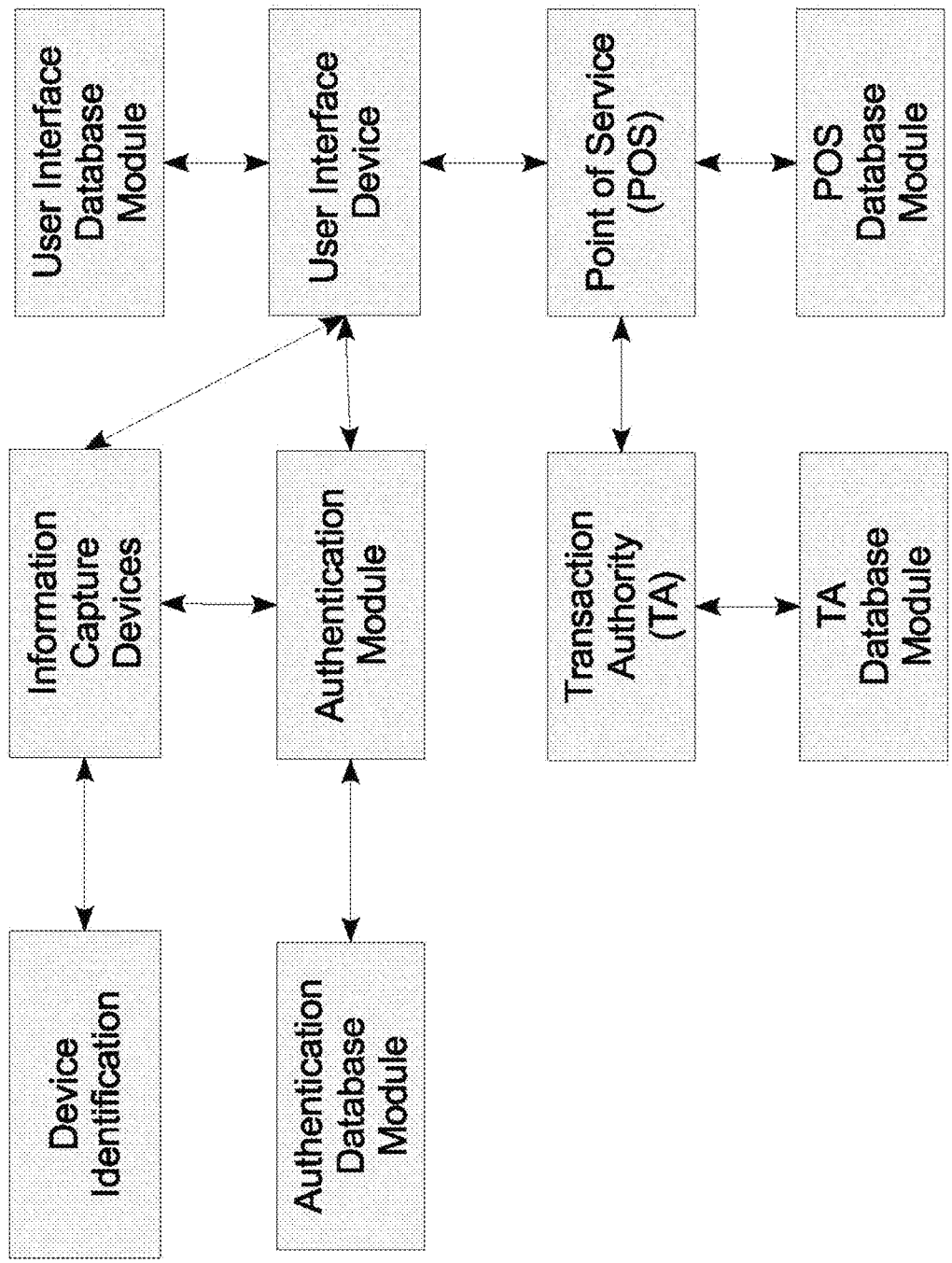
FIG. 5 System Components

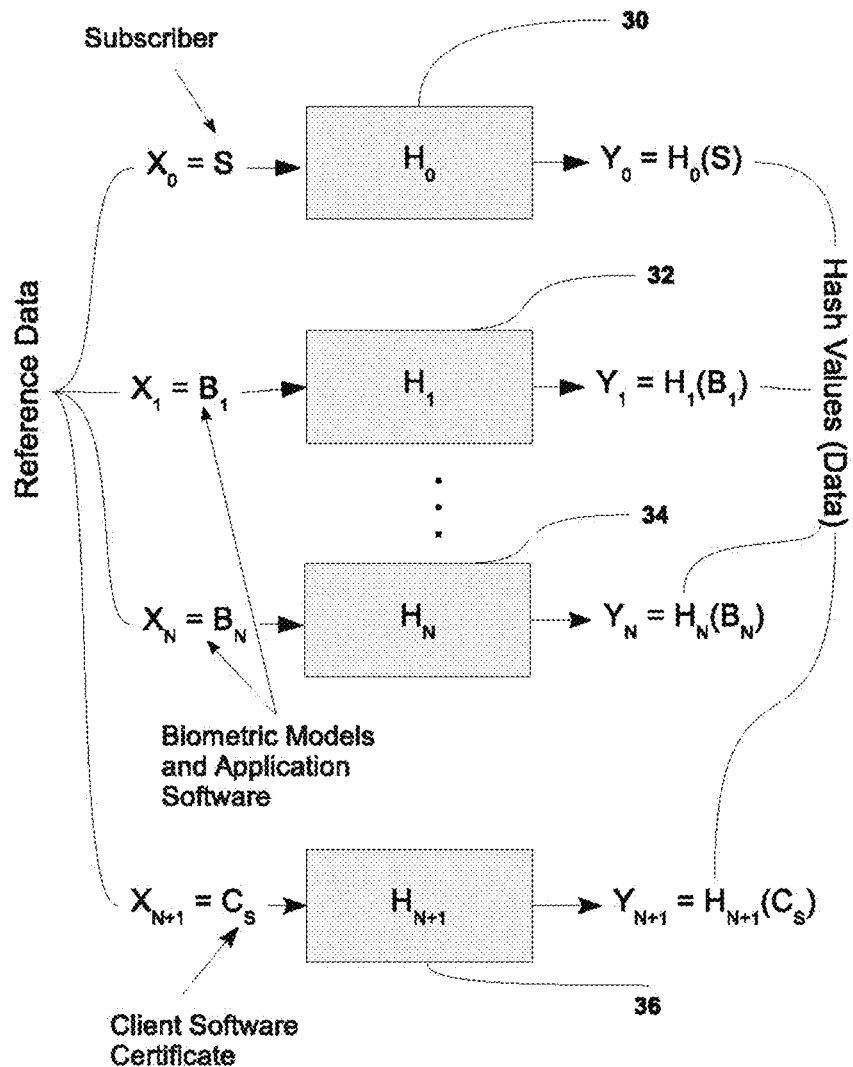
FIG. 6 Hash Function
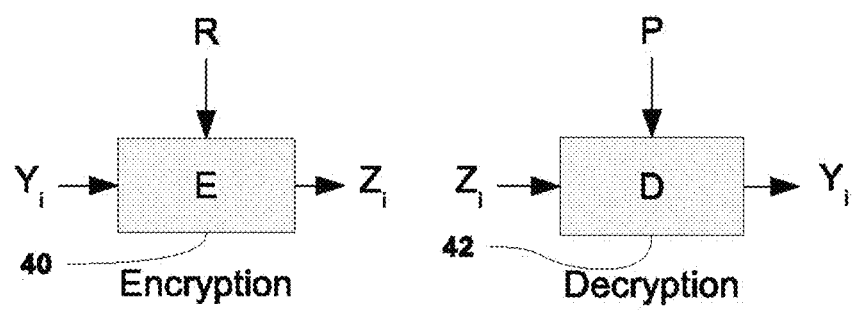
FIG. 7 Encryption and Decryption Functions

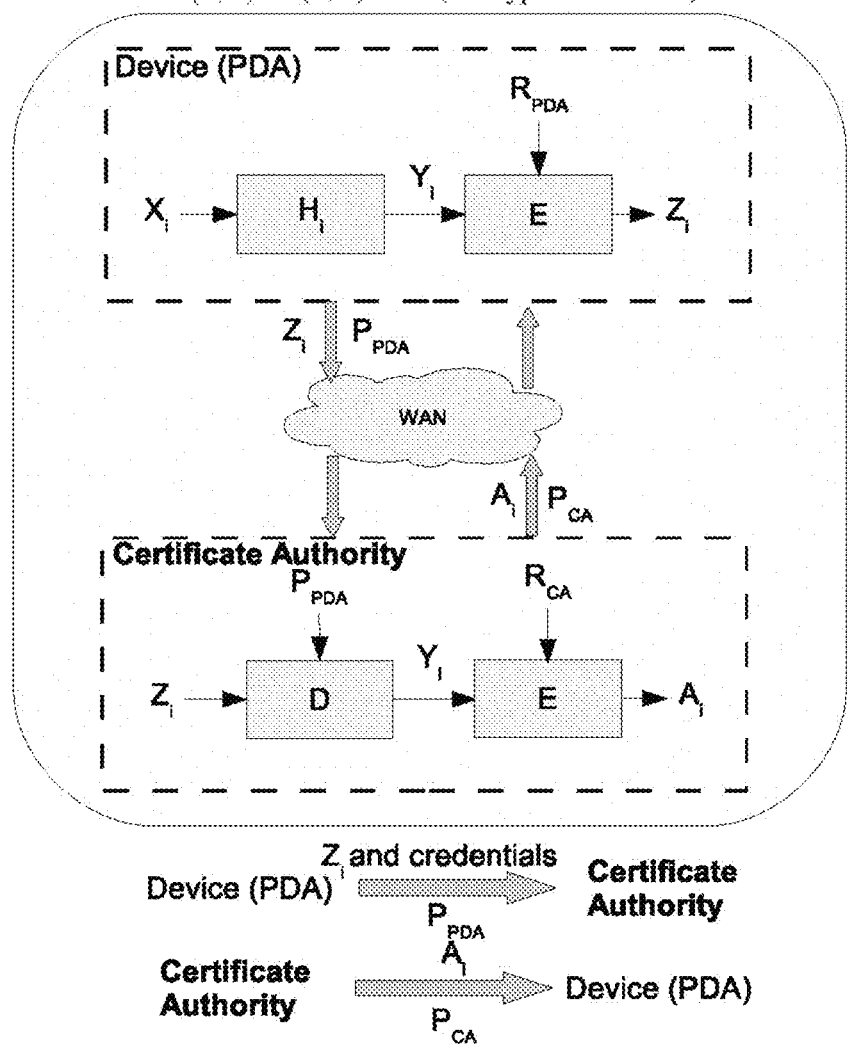
FIG. 8 Digital Signing

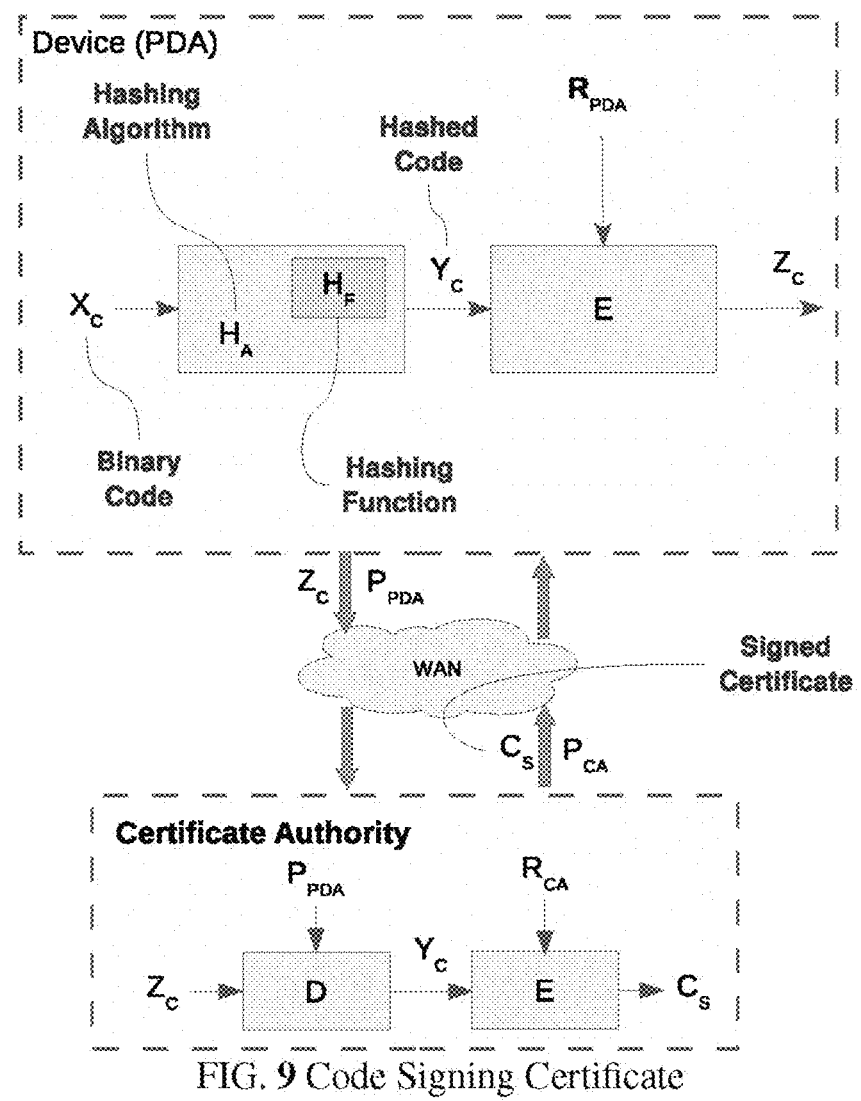
FIG. 9 Code Signing Certificate

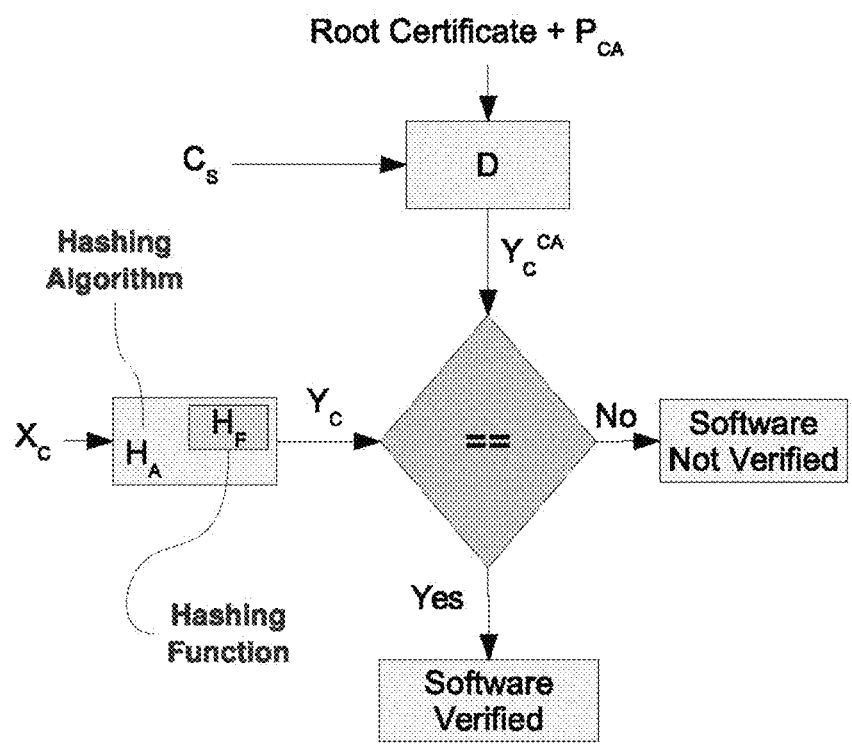
FIG. 10 Code Signature Verification

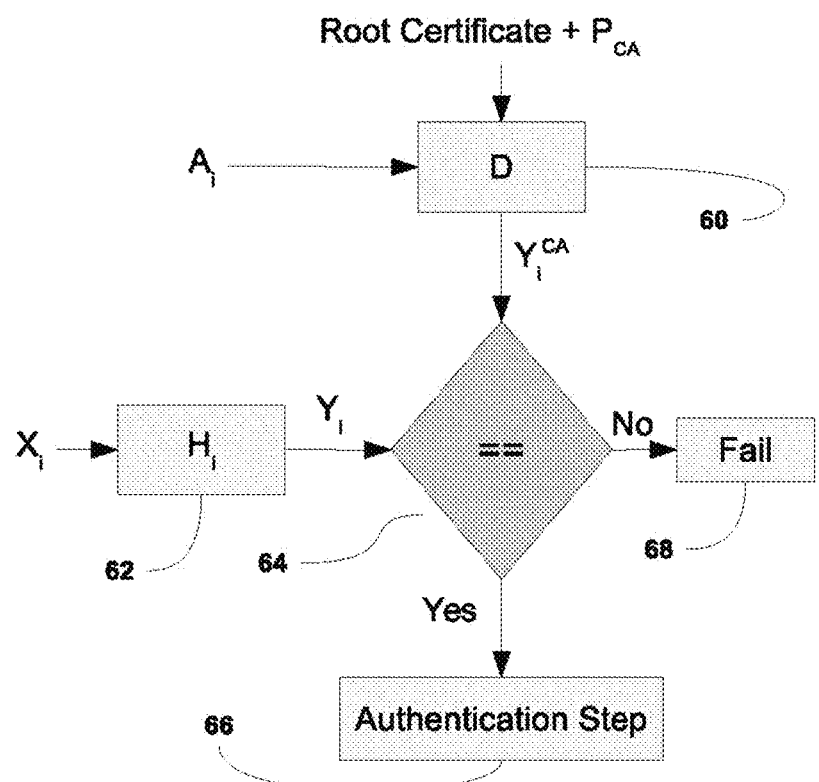
FIG. 11 Validation Process

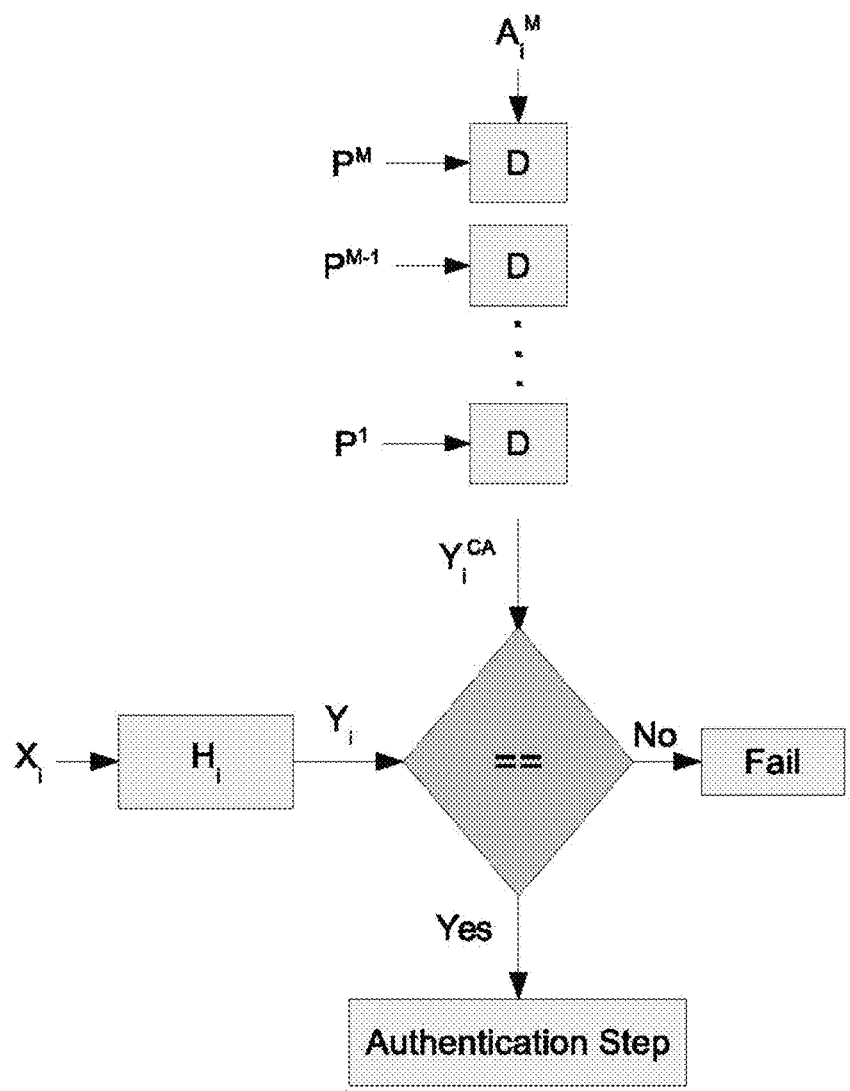
FIG. 12 serial Validation Process

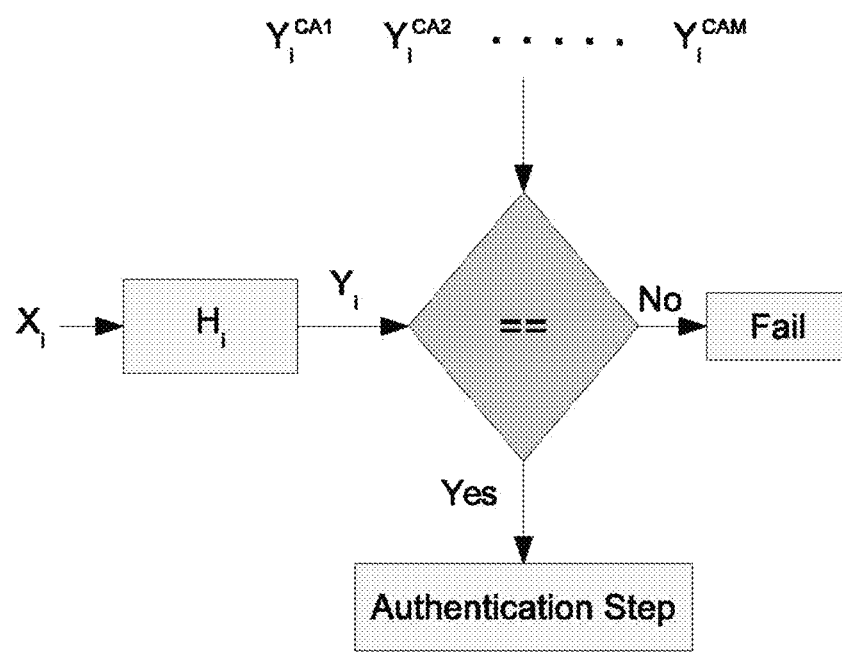
FIG. 13 Parallel Validation Process

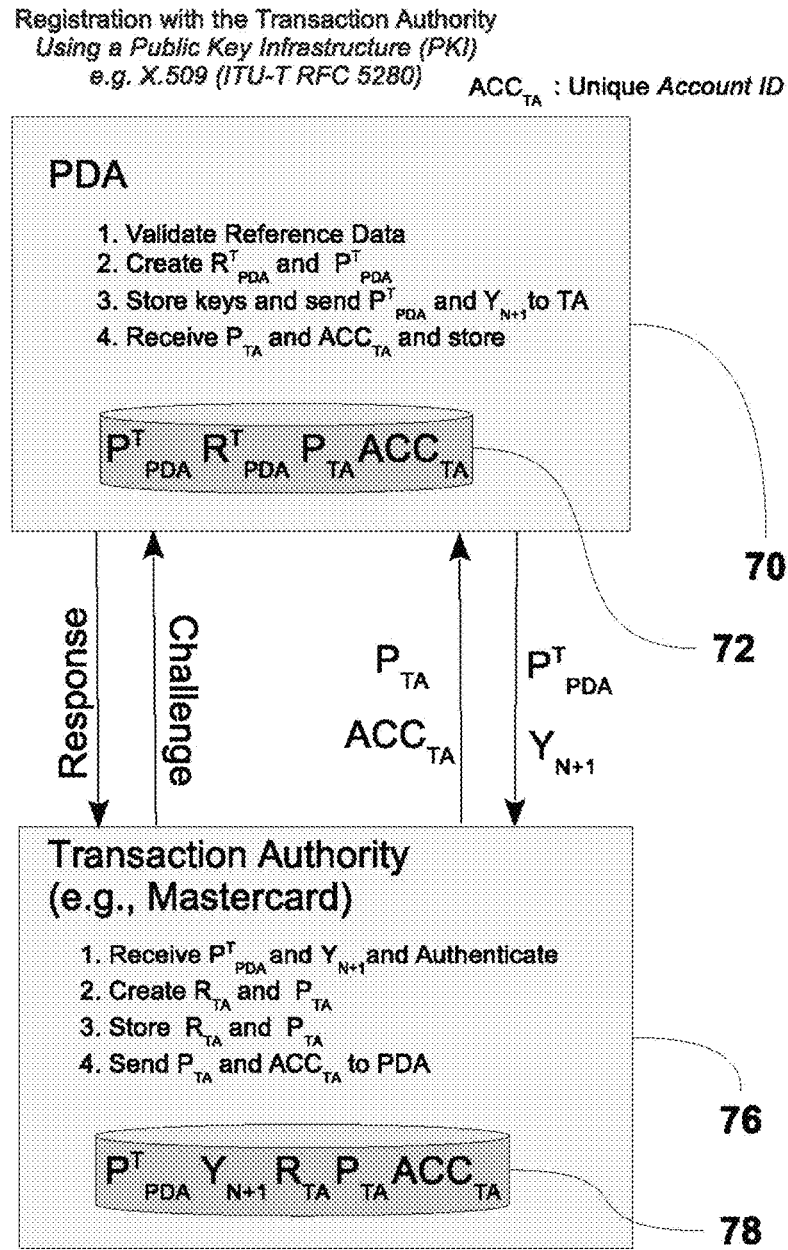
FIG. 14 Registration with the Transaction Authority

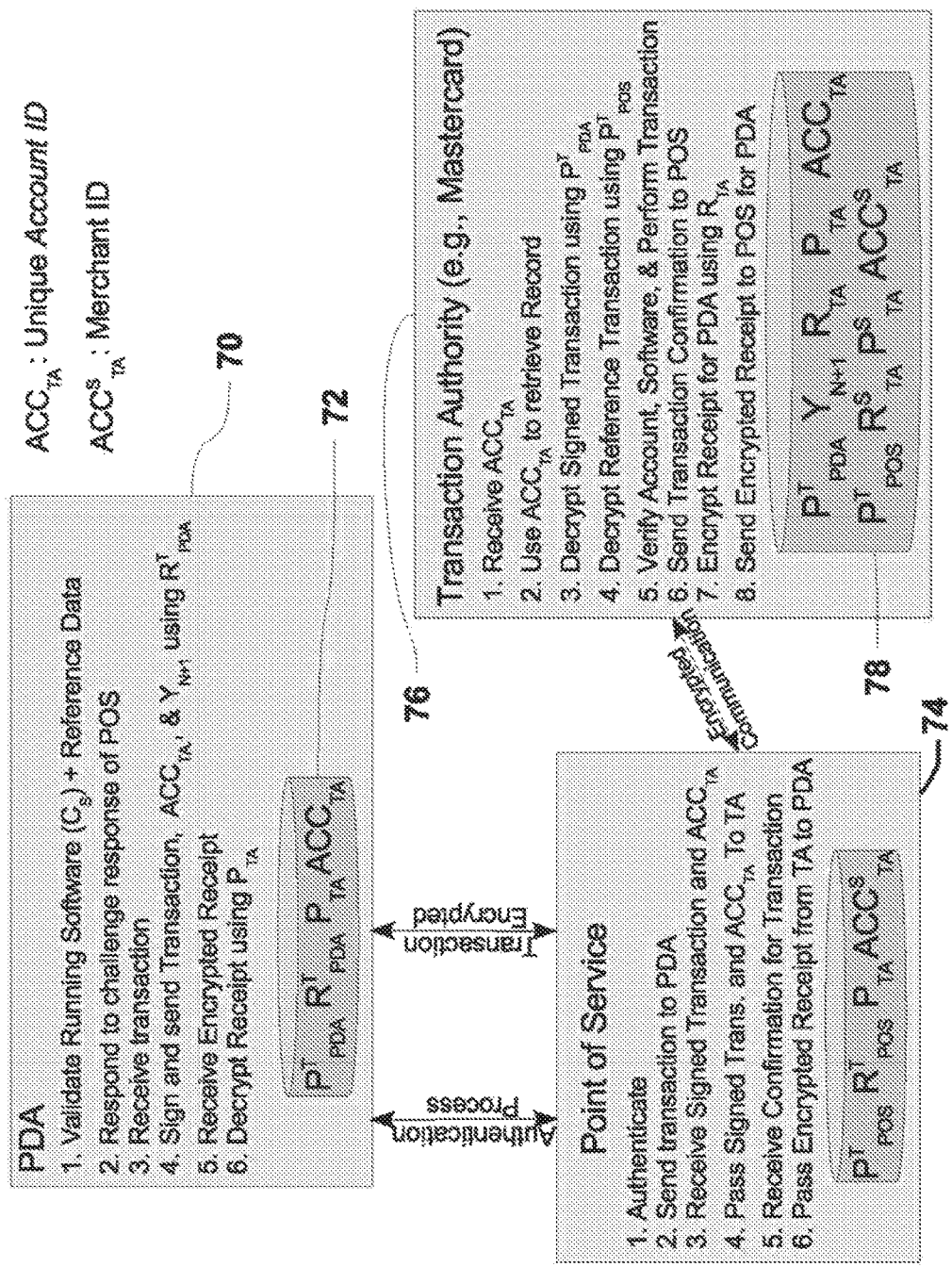
FIG. 15 Generic Transaction Process

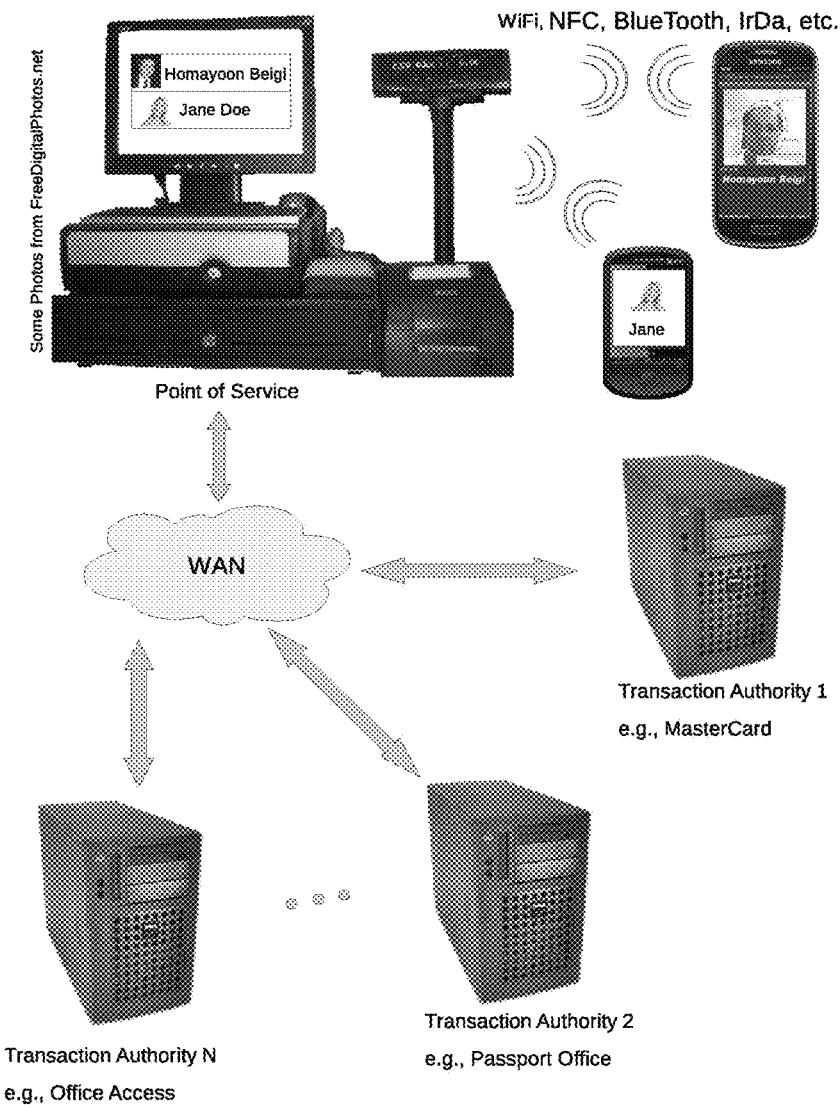
FIG. 16 POS Sales Transaction

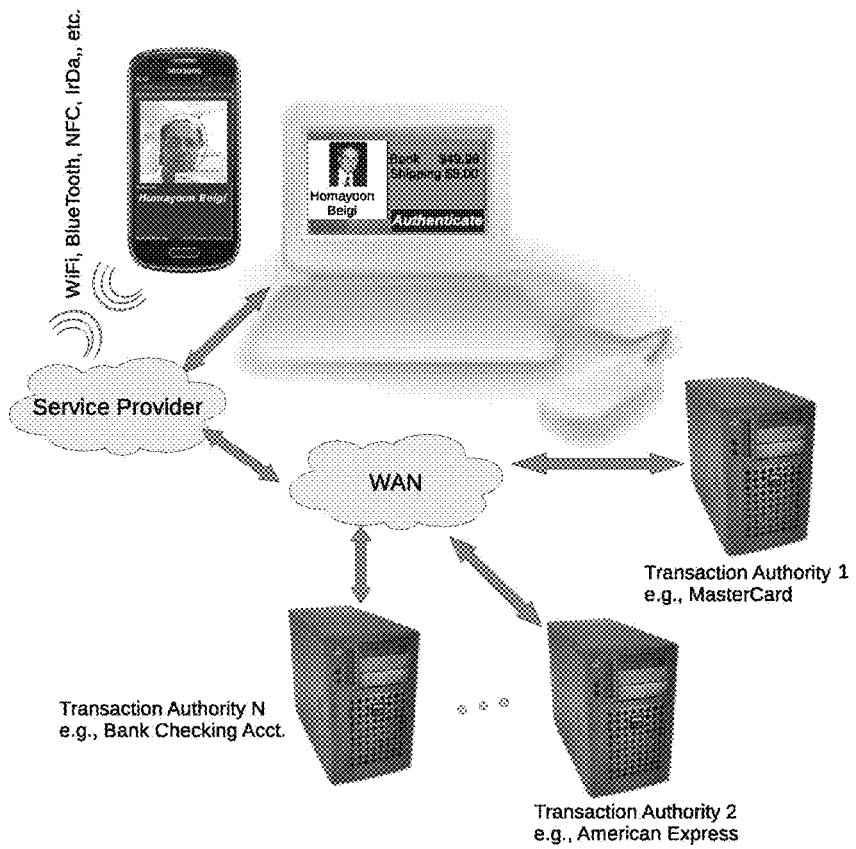
FIG. 17 Electronic Commerce Transaction
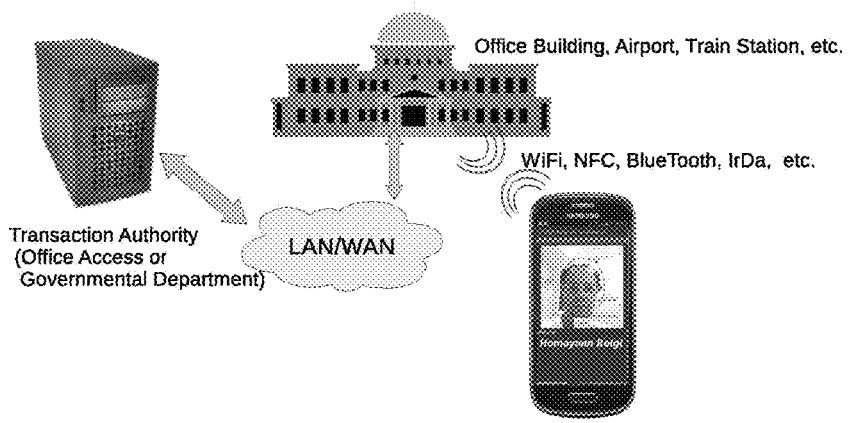
FIG. 18 Passport or Office Entry Transaction

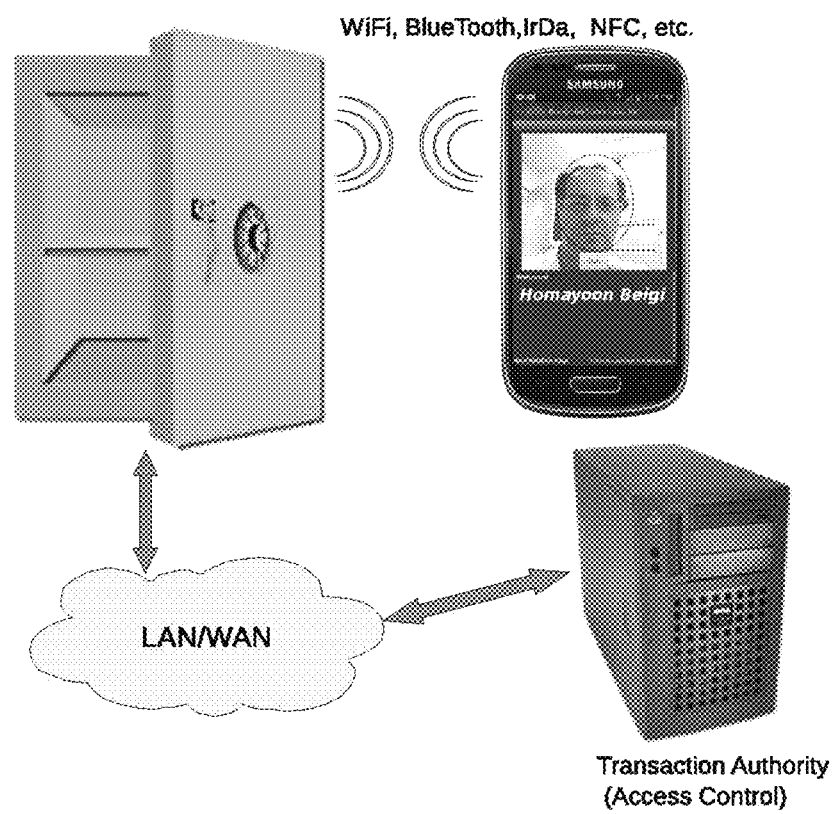
FIG. 19 Vault Access Transaction

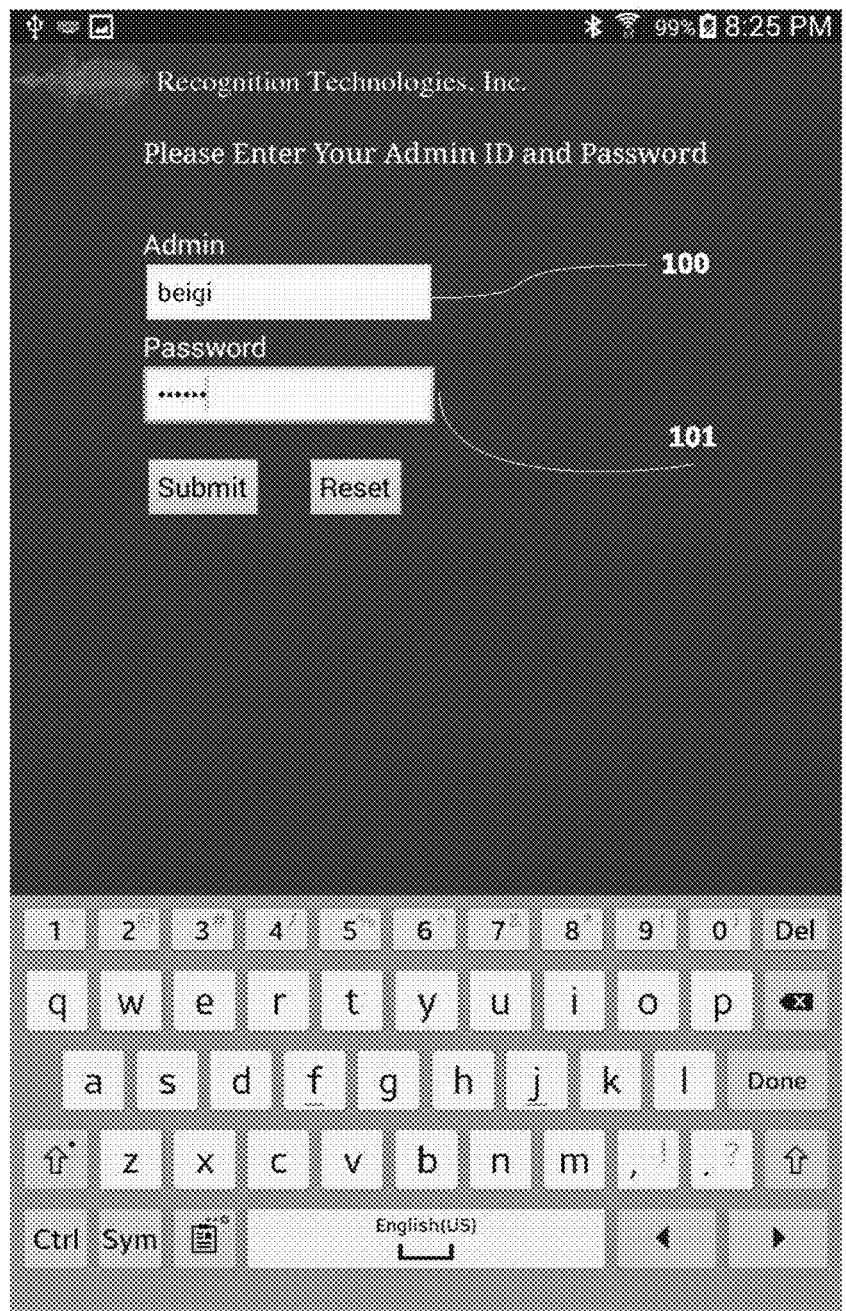
FIG. 20 Access Control – Client Administration Login

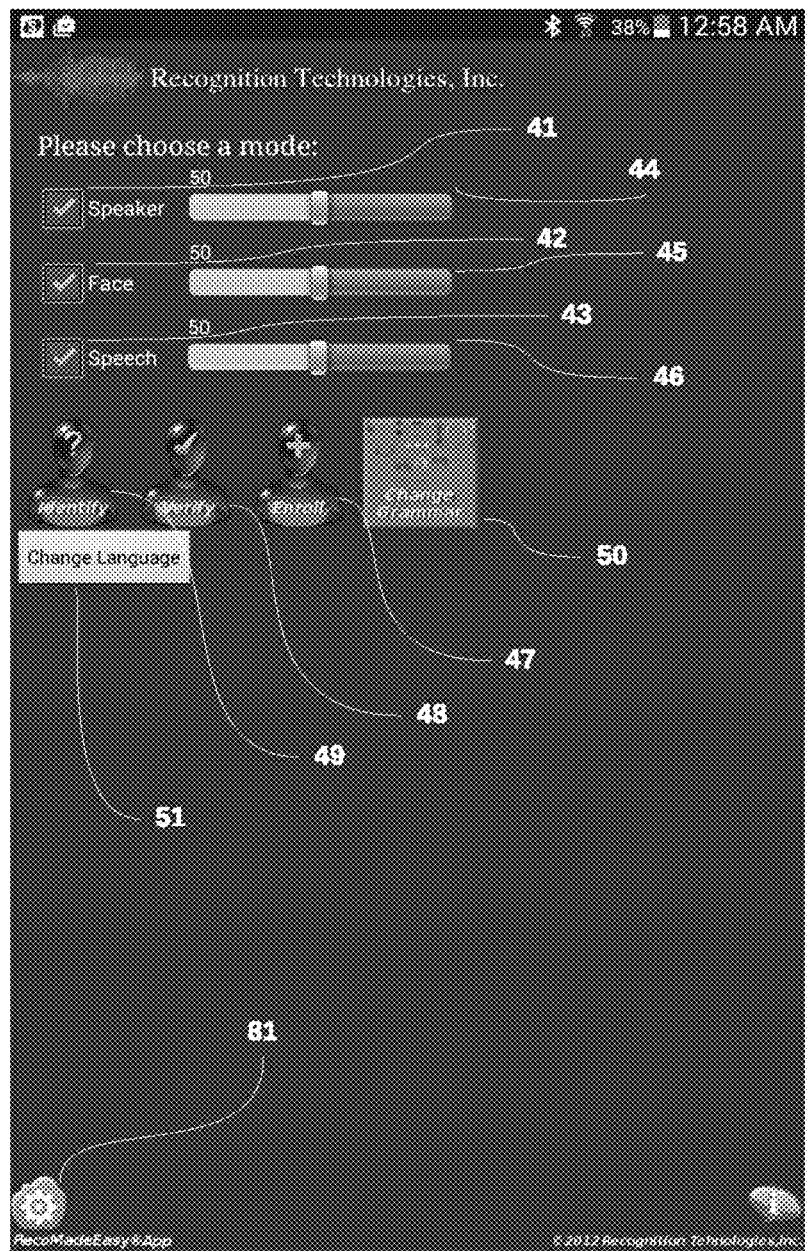
FIG. 21: Mixture Components (Speaker, Face, and speech-based Liveness Test)

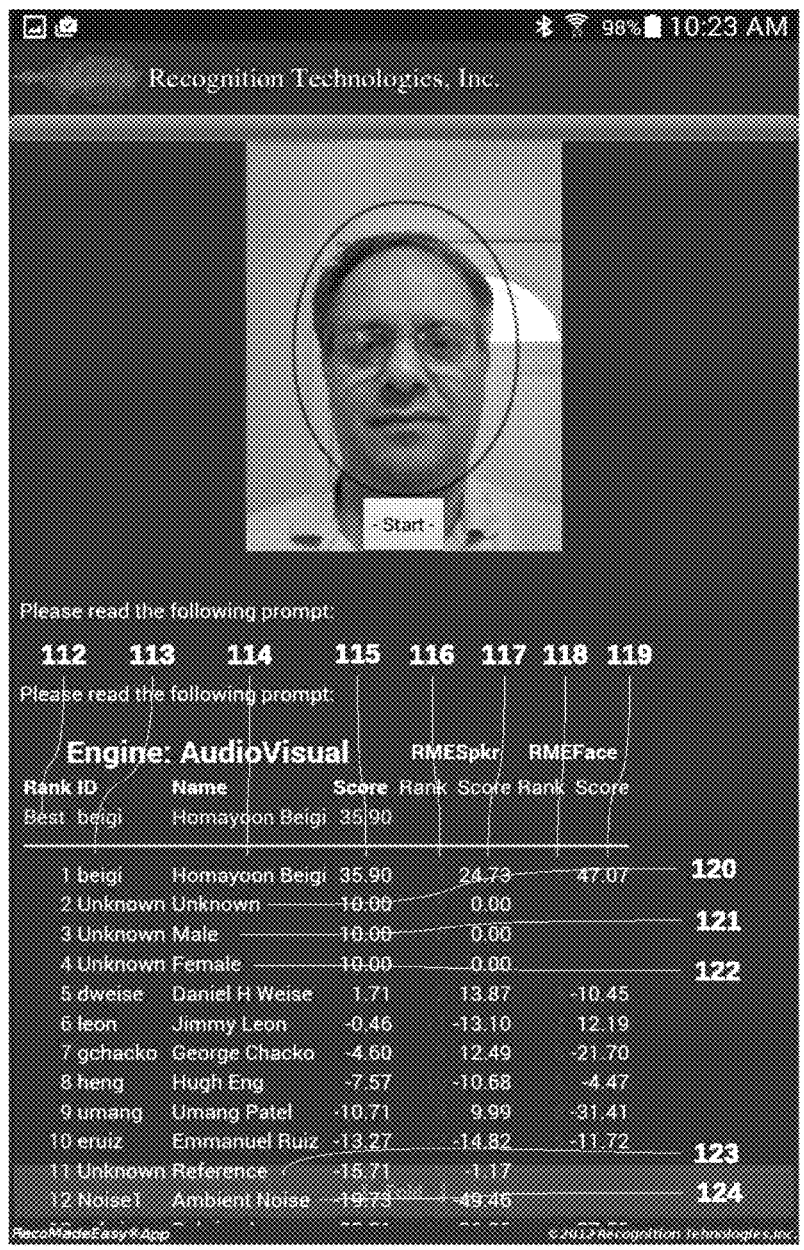
FIG. 22 Fusion Results for Speaker and Face Recognition

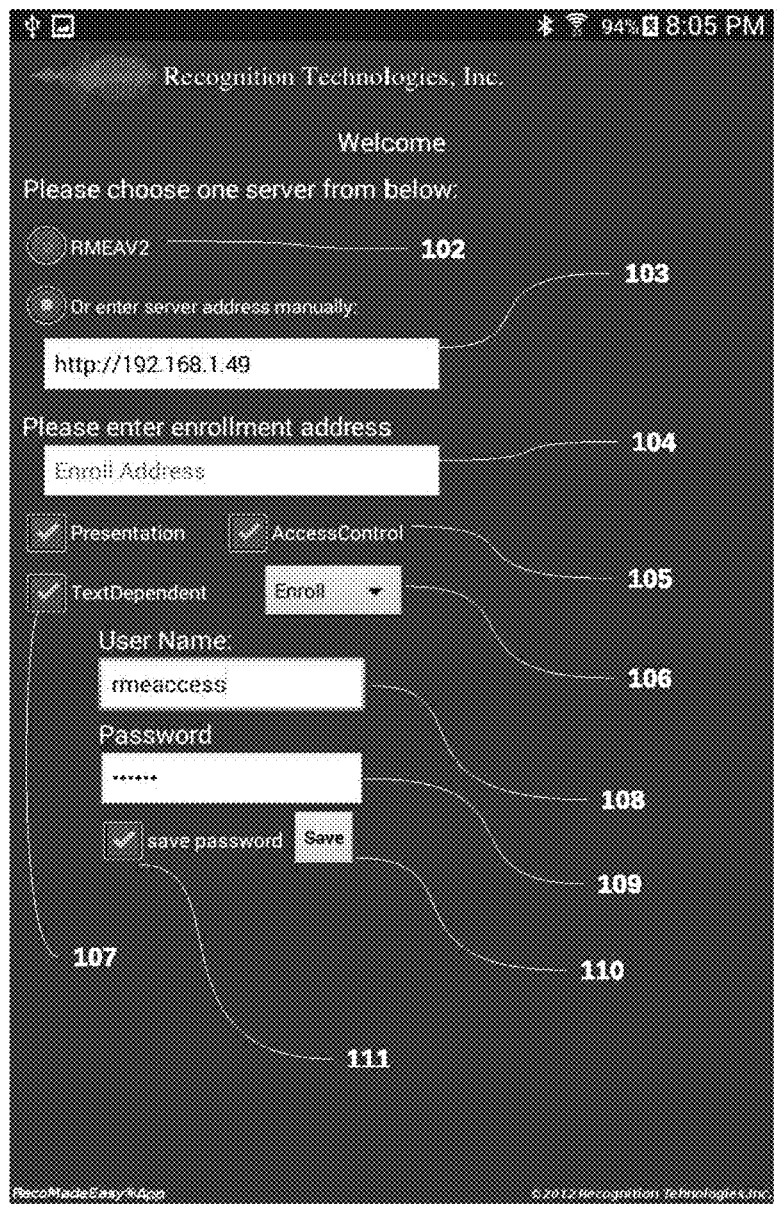
FIG. 23: Access Control – Administration Configuration for Enrollment Mode

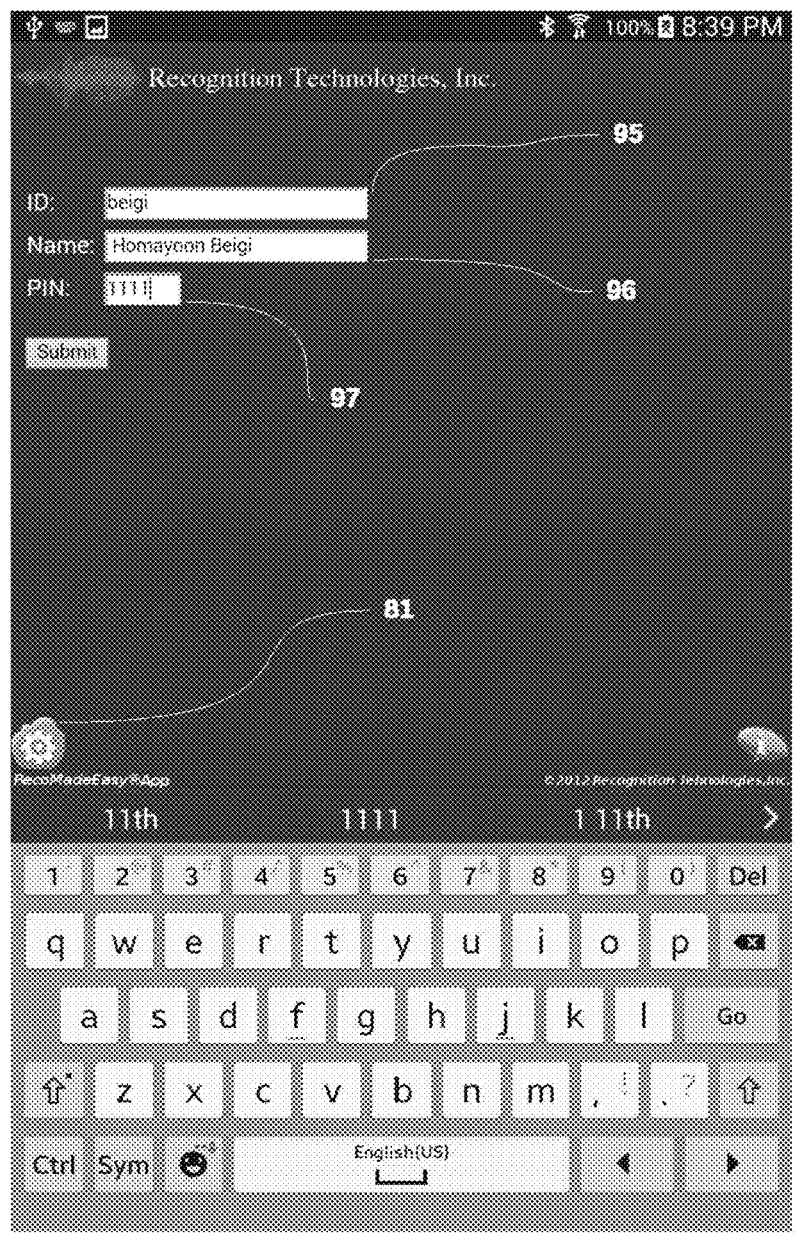
FIG. 24 Access Control – Enrollment User ID, Name, and PIN

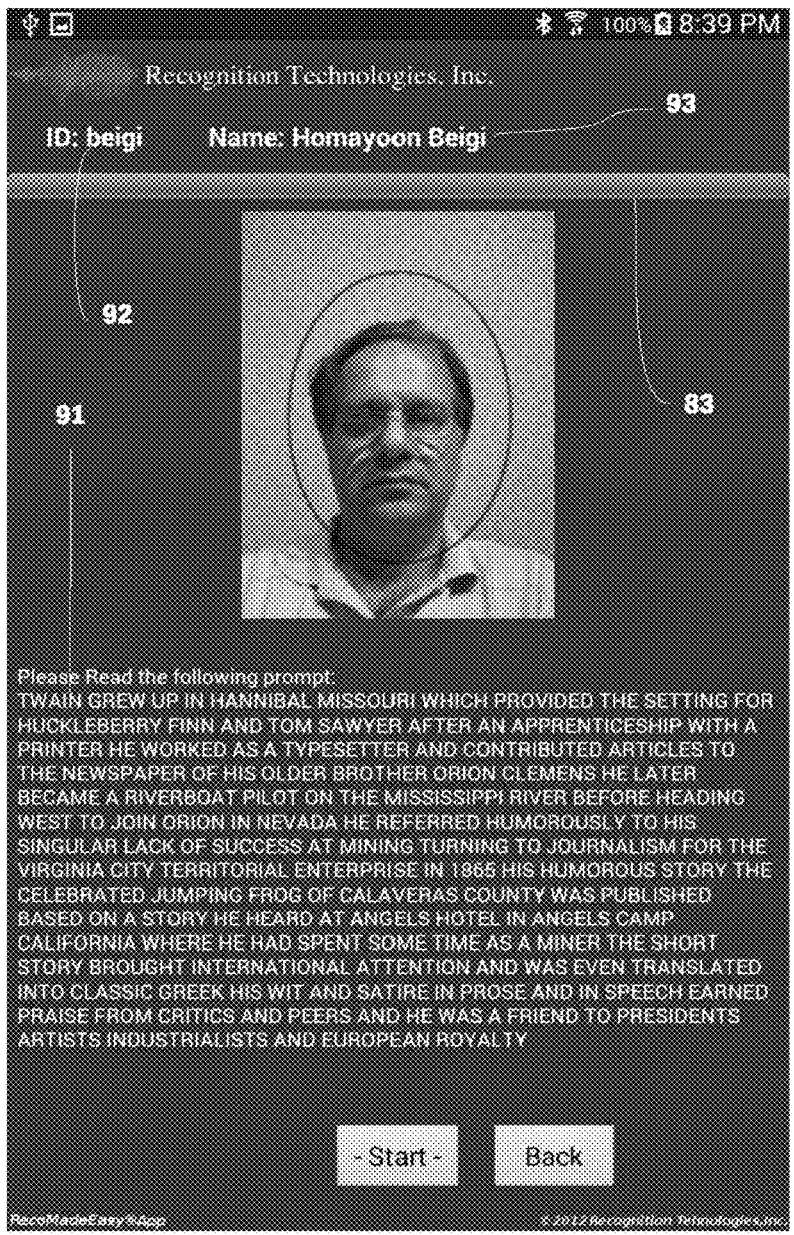
FIG. 25 Access Control – Enrollment Beginning

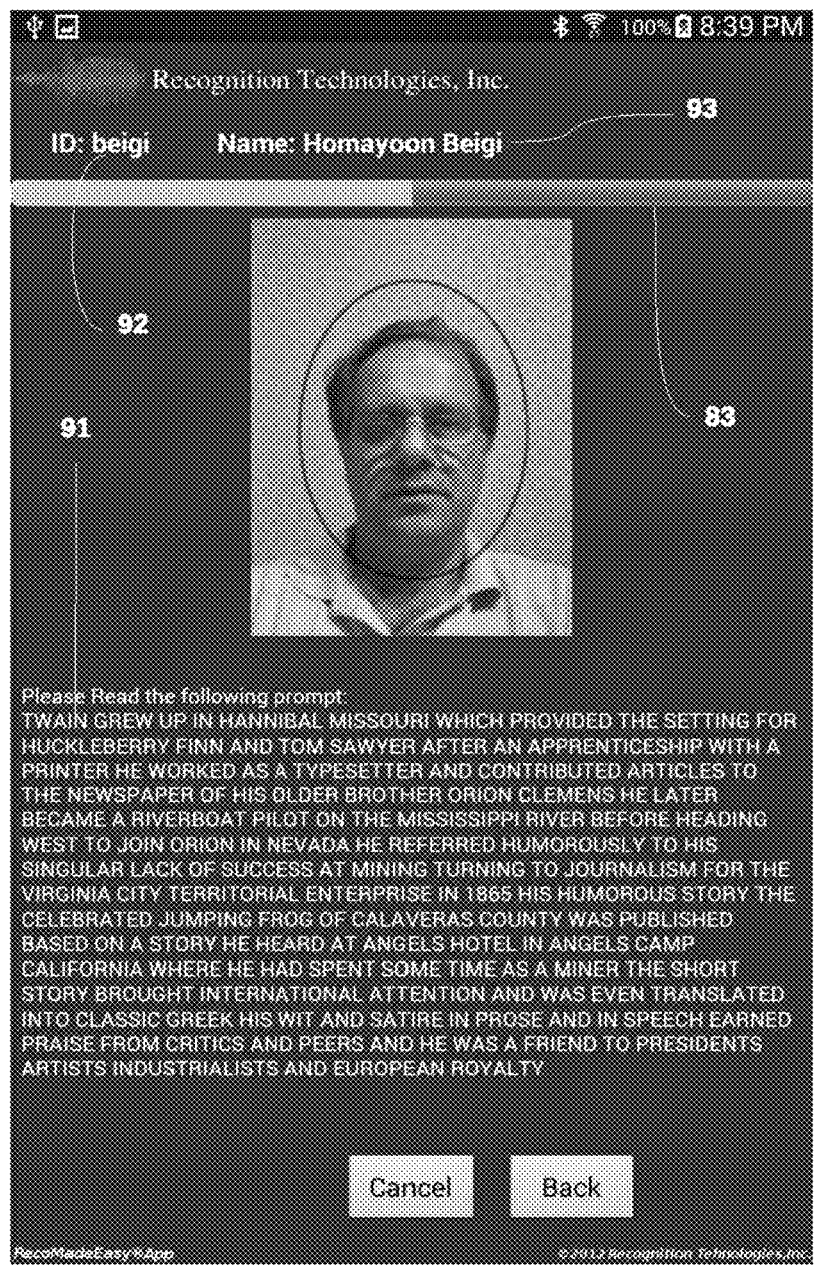
FIG. 26 Access Control – Enrollment Video Capture Progress

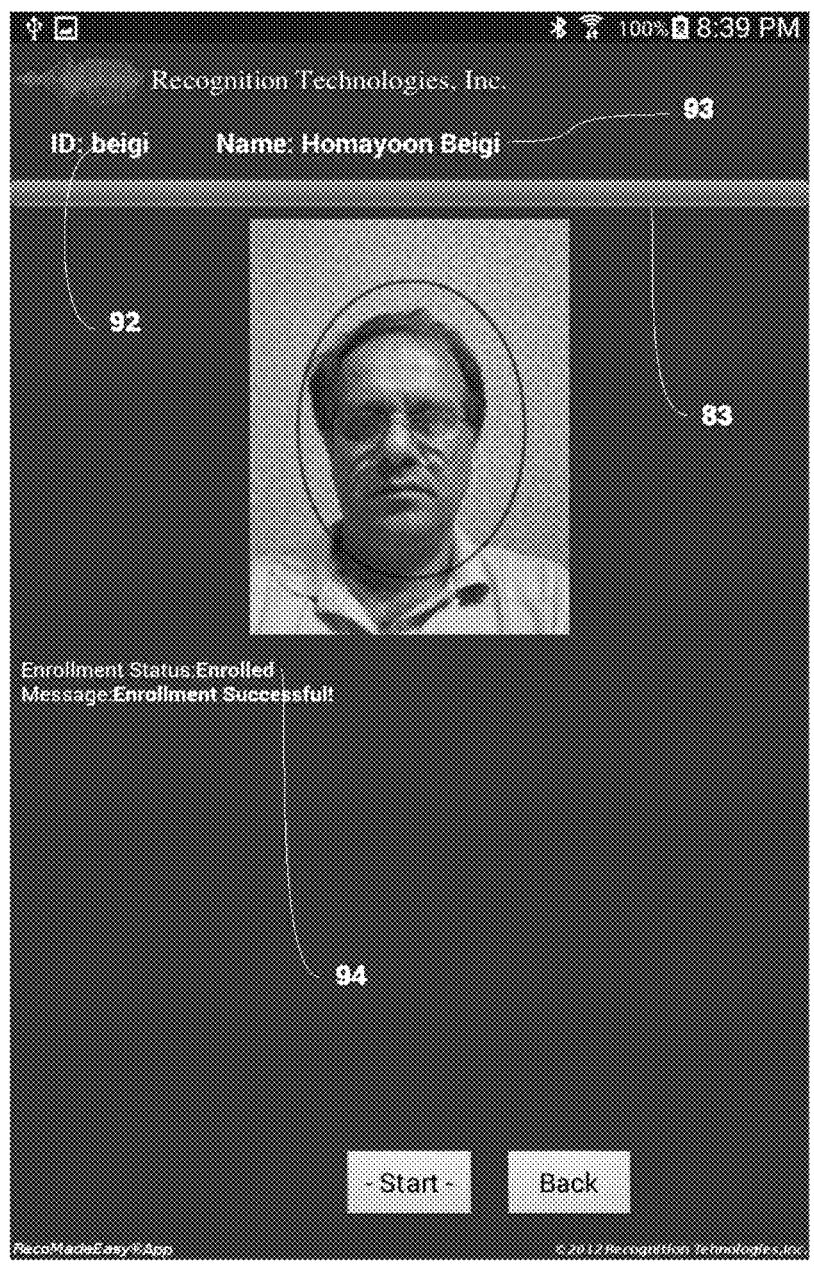
FIG. 27 Access Control – Enrollment Successful

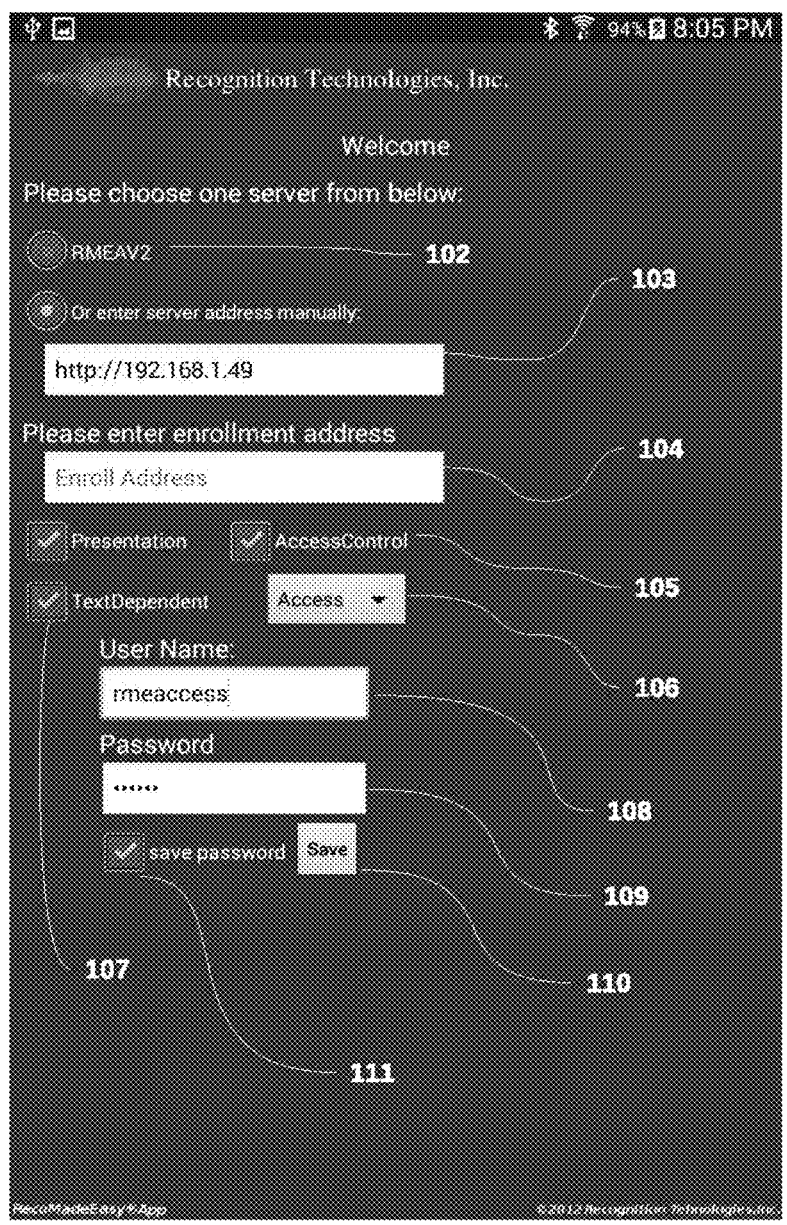
FIG. 28 Access Control – Administration Configuration for Access Mode

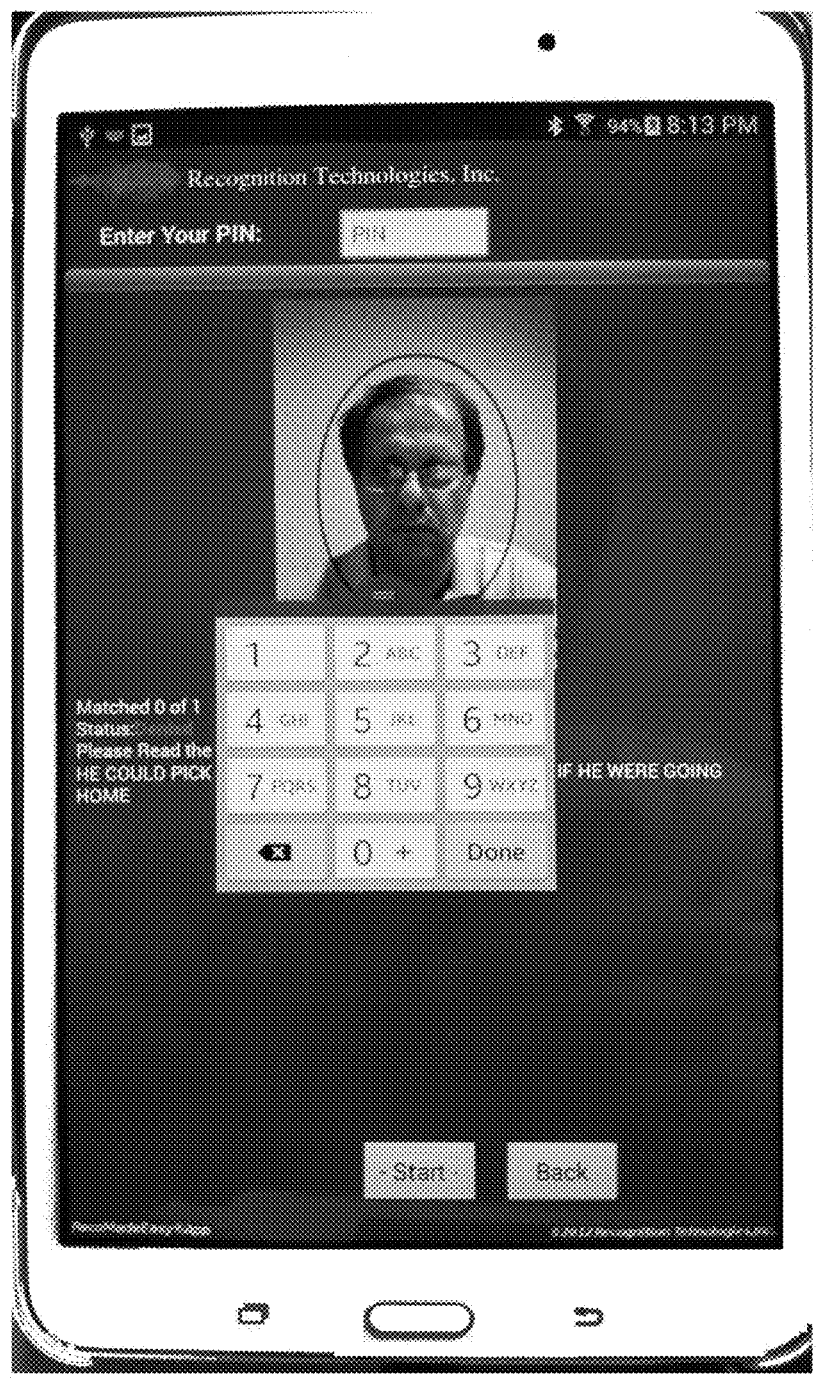
FIG. 29 Access Control Device

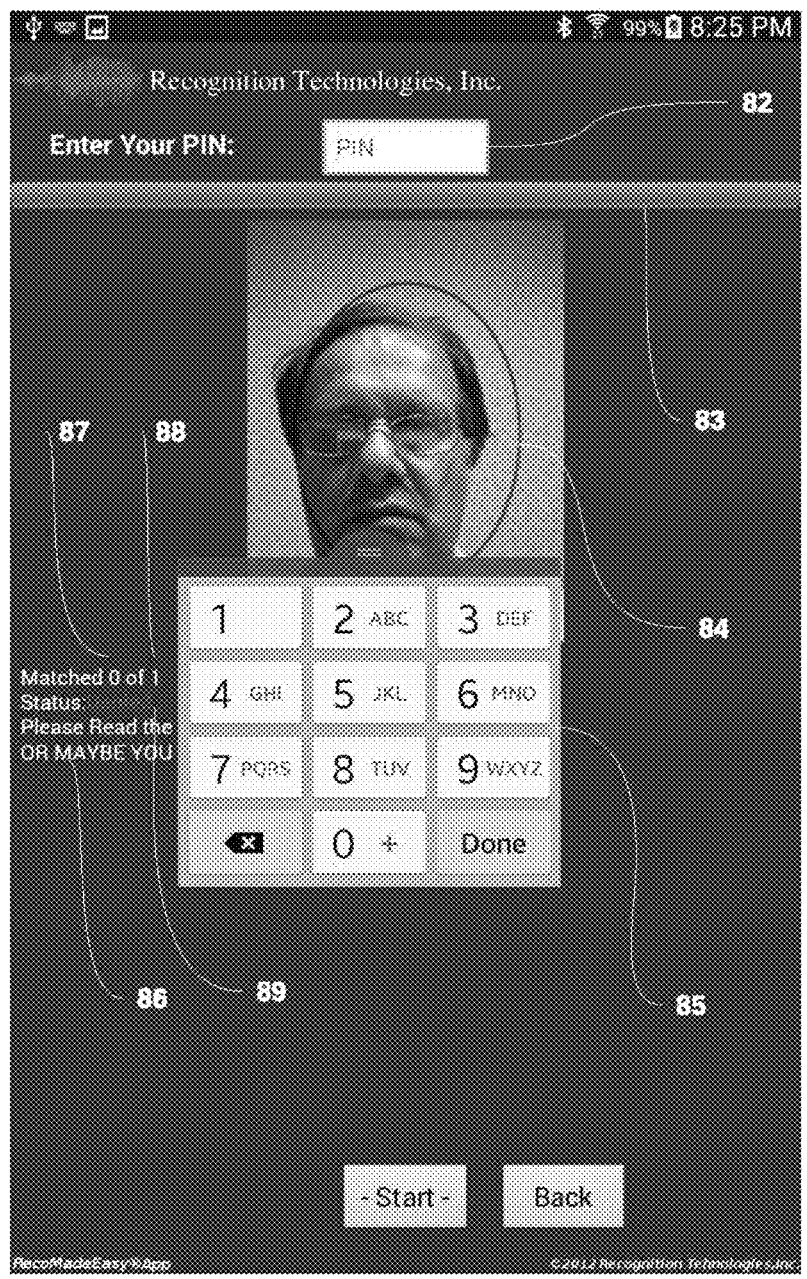
FIG. 30 Access Control PIN Entry

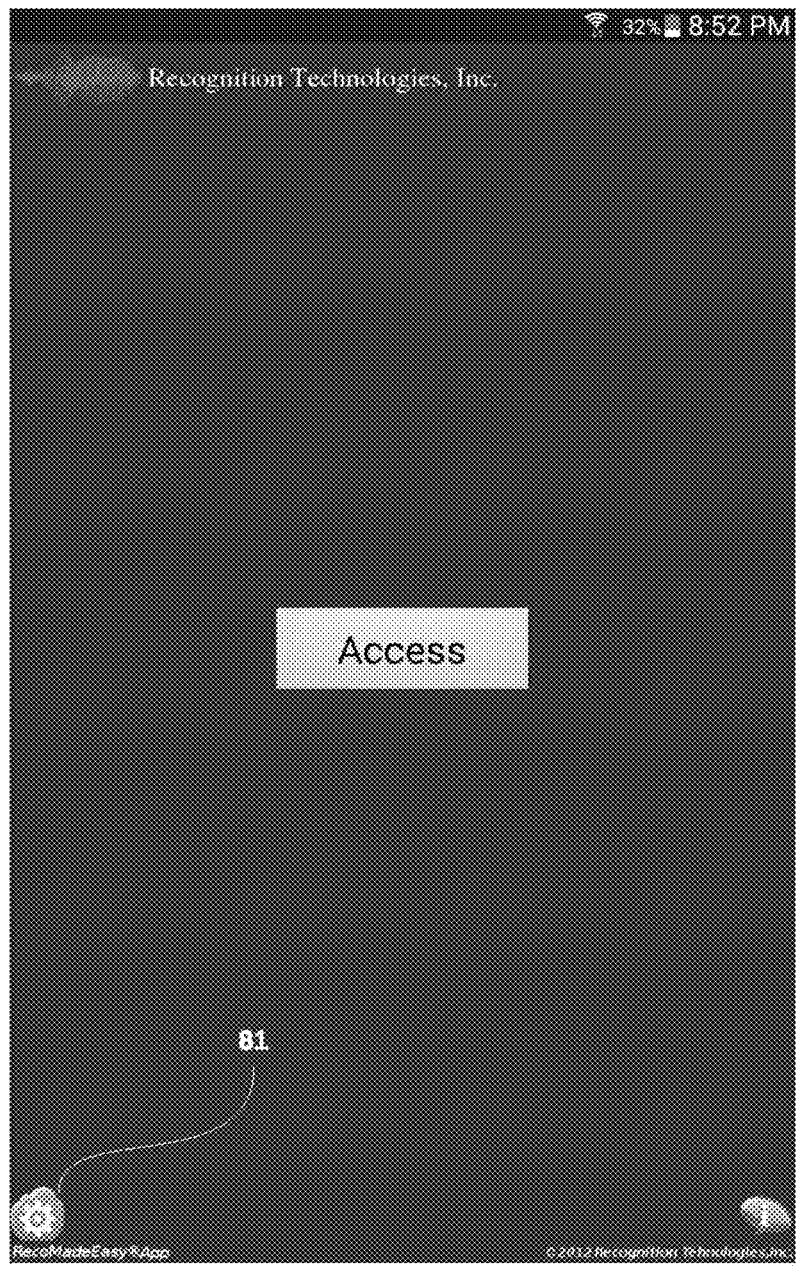
FIG. 31 Access Control Button

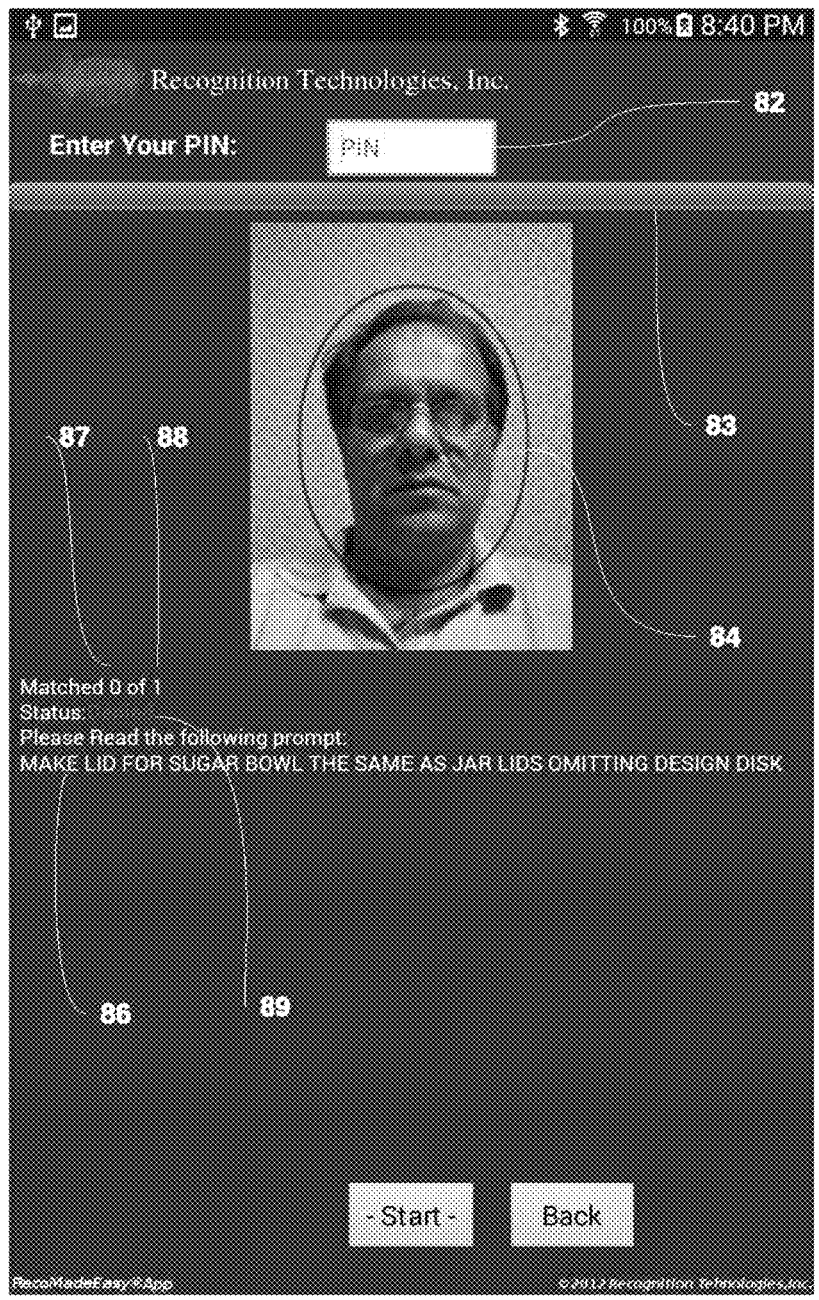
FIG. 32 Access Control Begin – Default Status: Denied

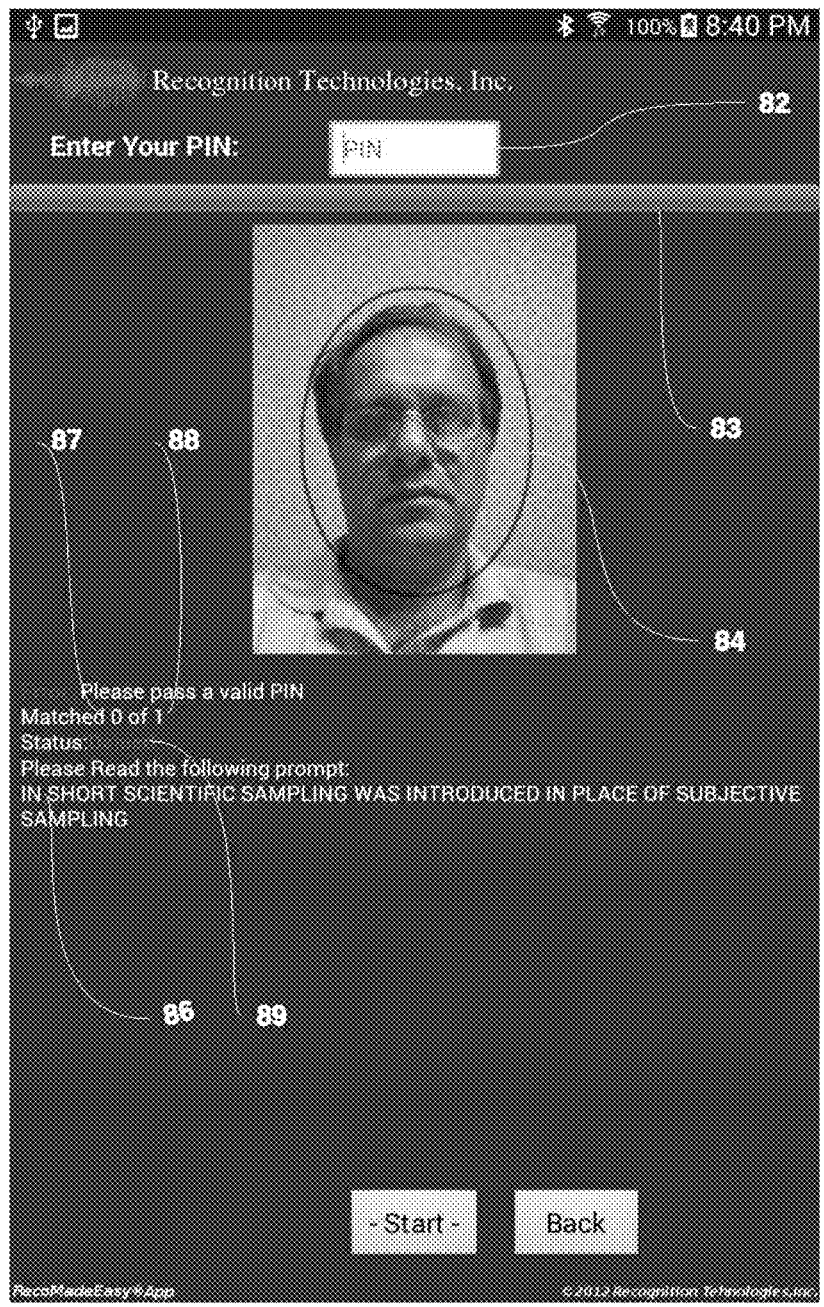
FIG. 33 Access Control – PIN Required

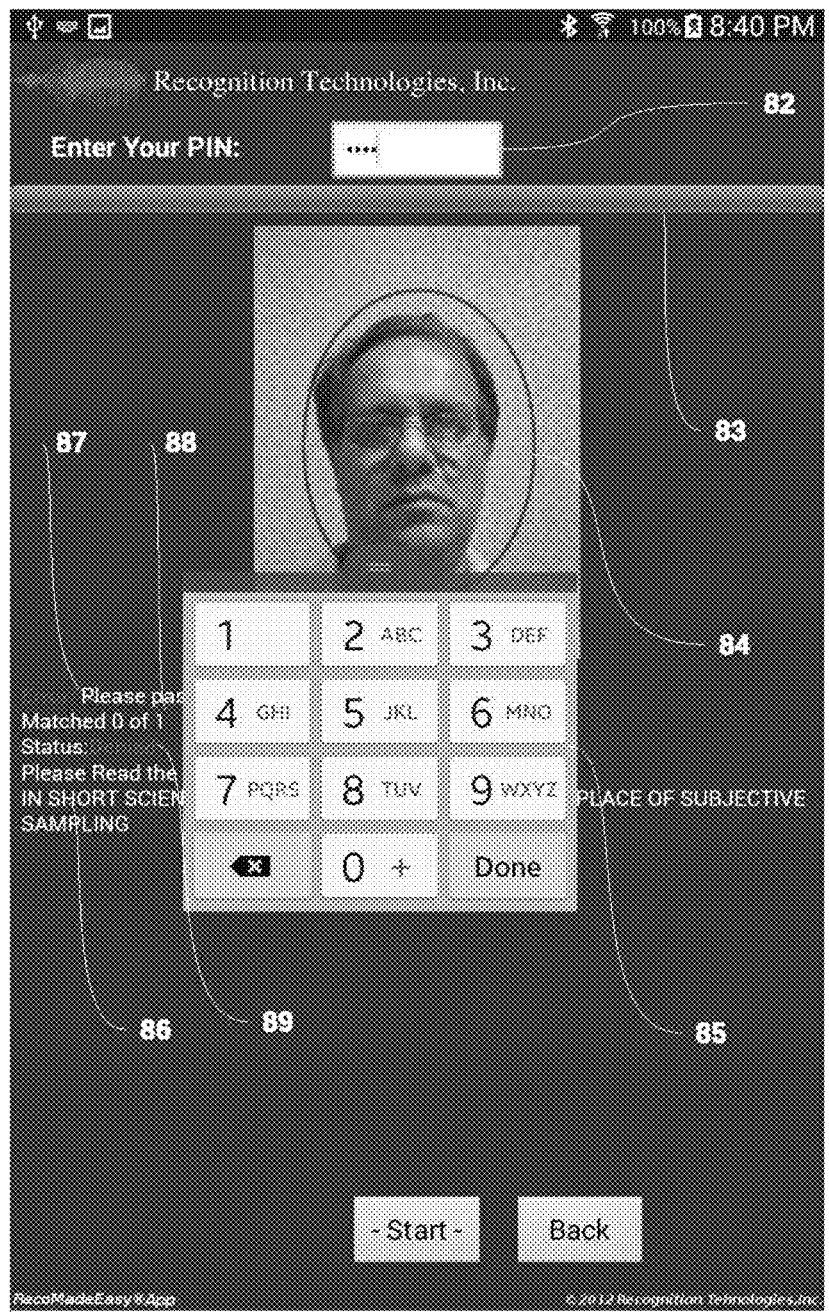
FIG. 34 Access Control – Enter PIN

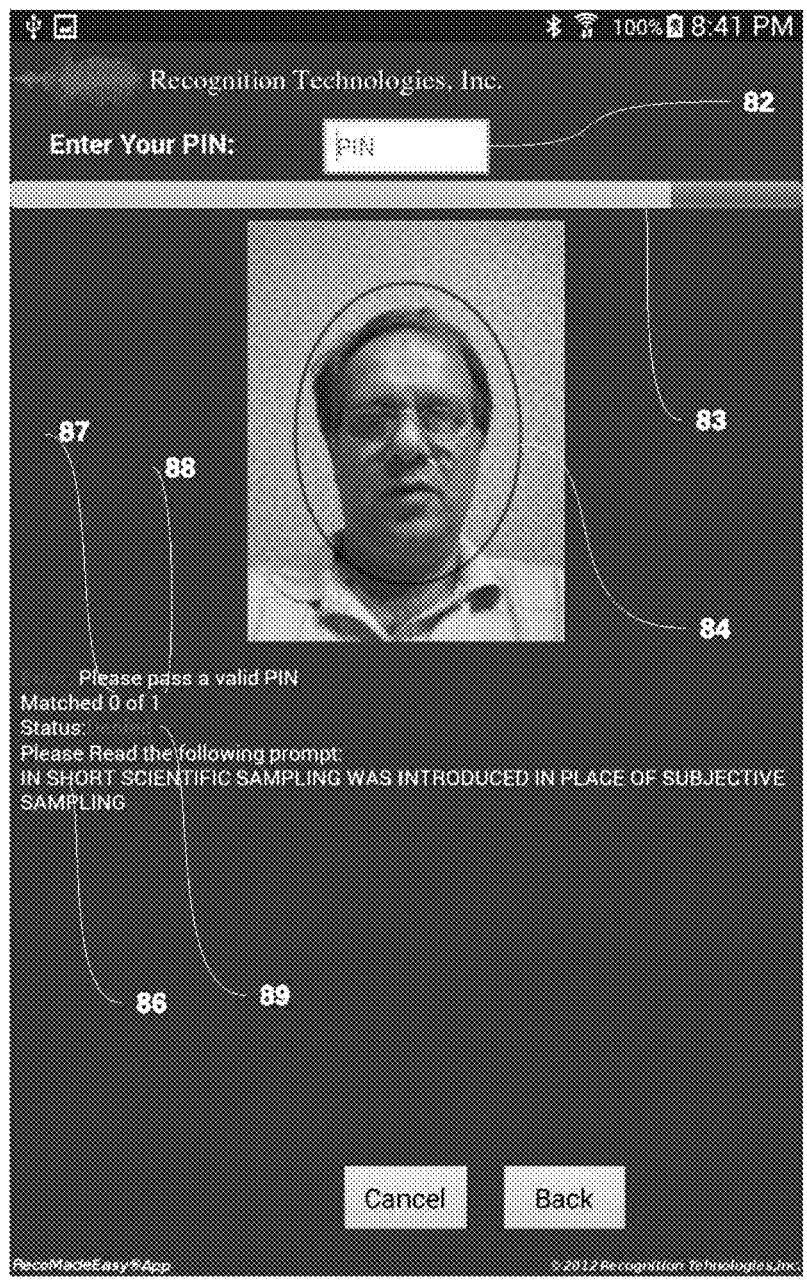
FIG. 35 Access Control – Video Capture Progress

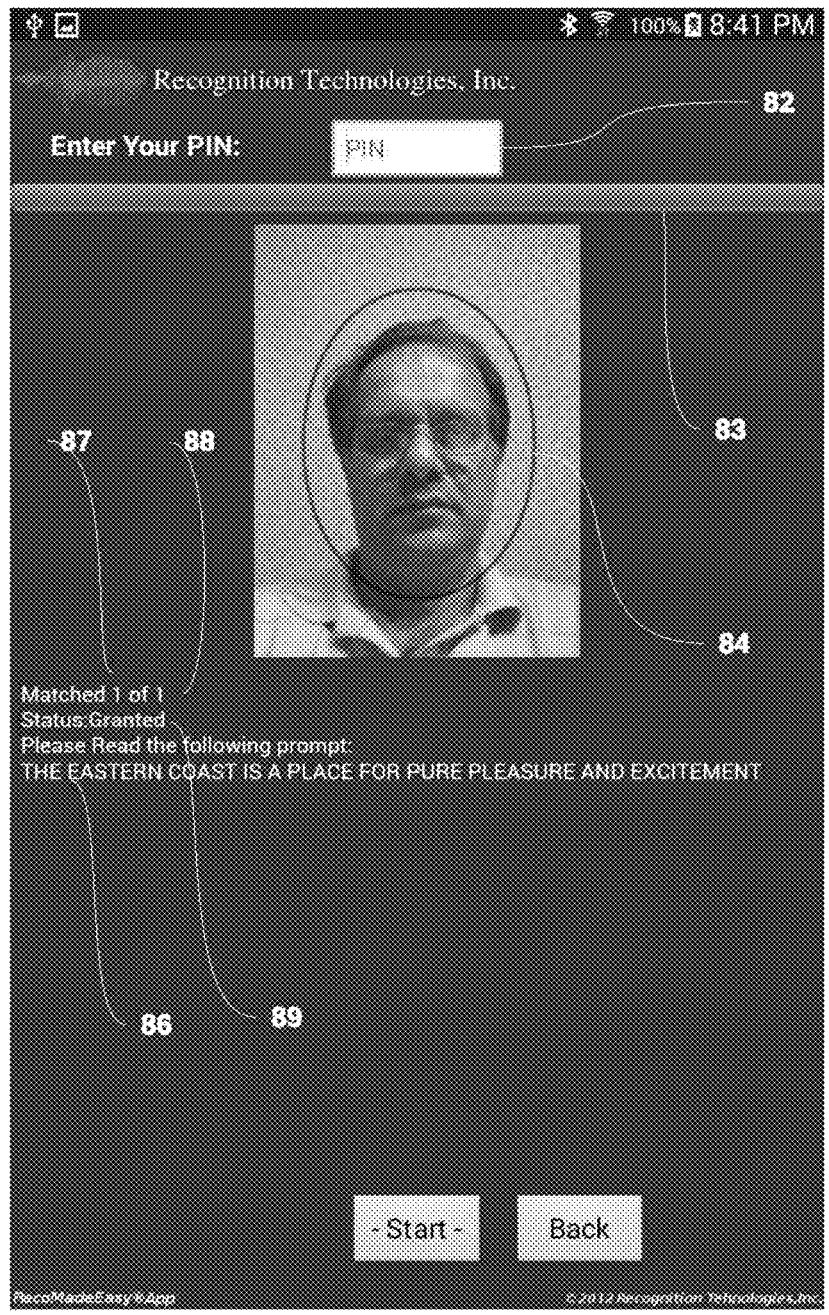
FIG. 36 Access Control – Access Granted

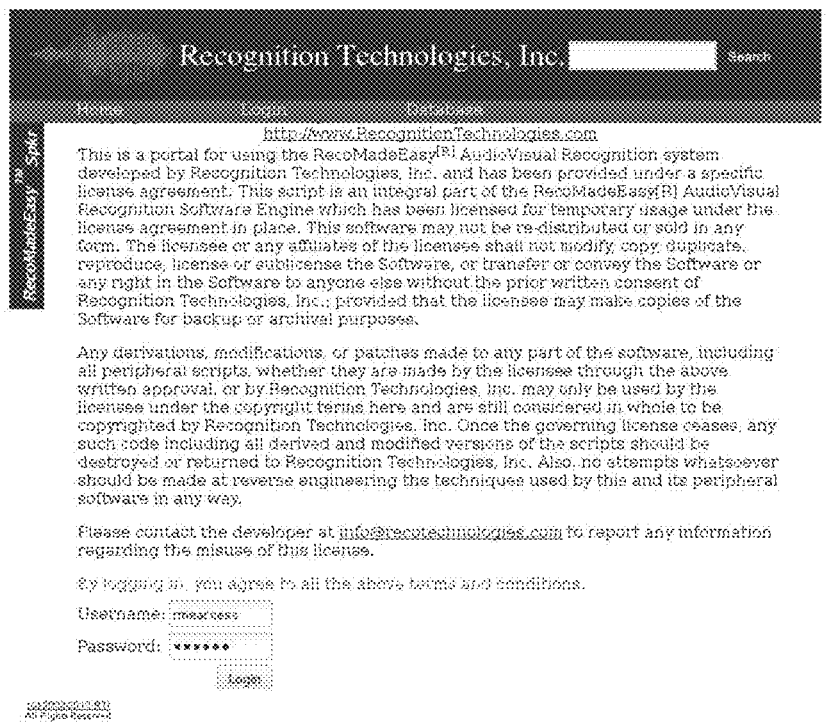
FIG. 37 Server Administration Login

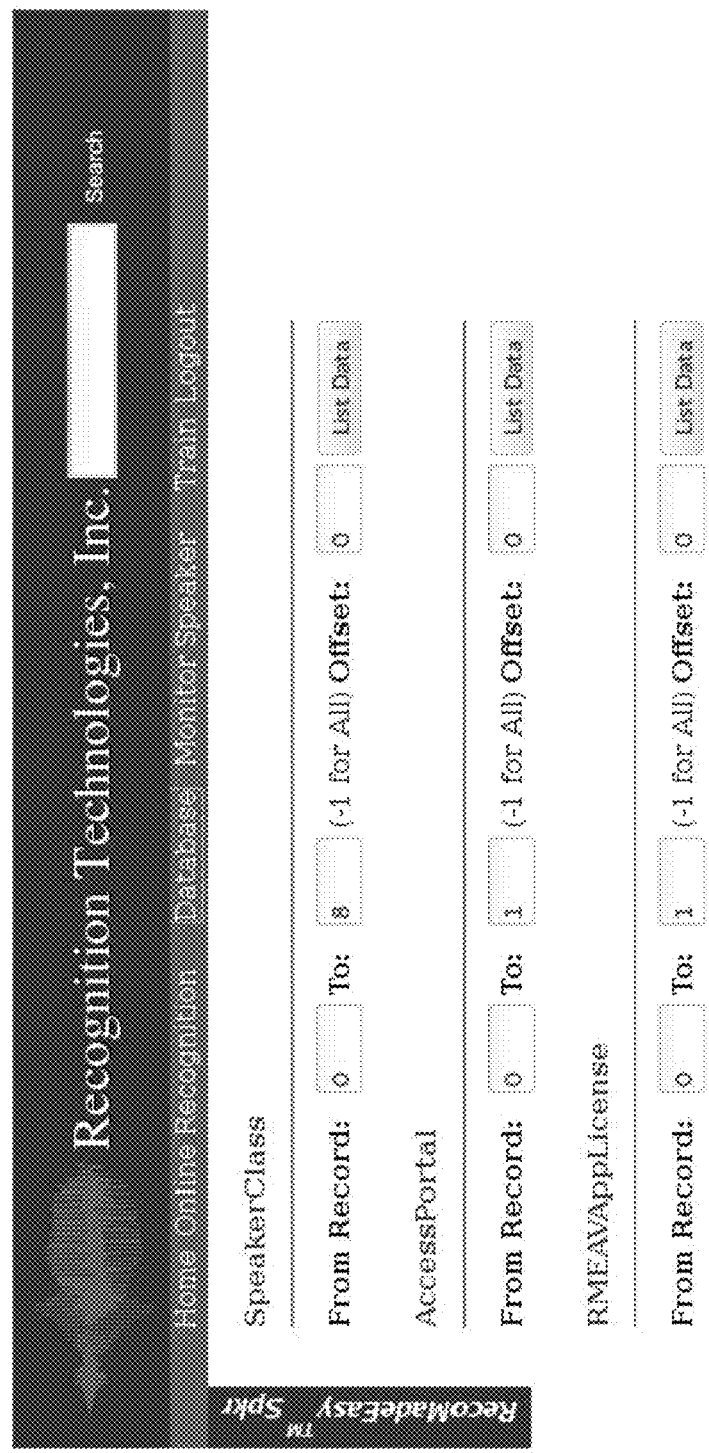
FIG. 38 Database List

FIG. 39 Enrollment Database

FIG. 40 Portal Database

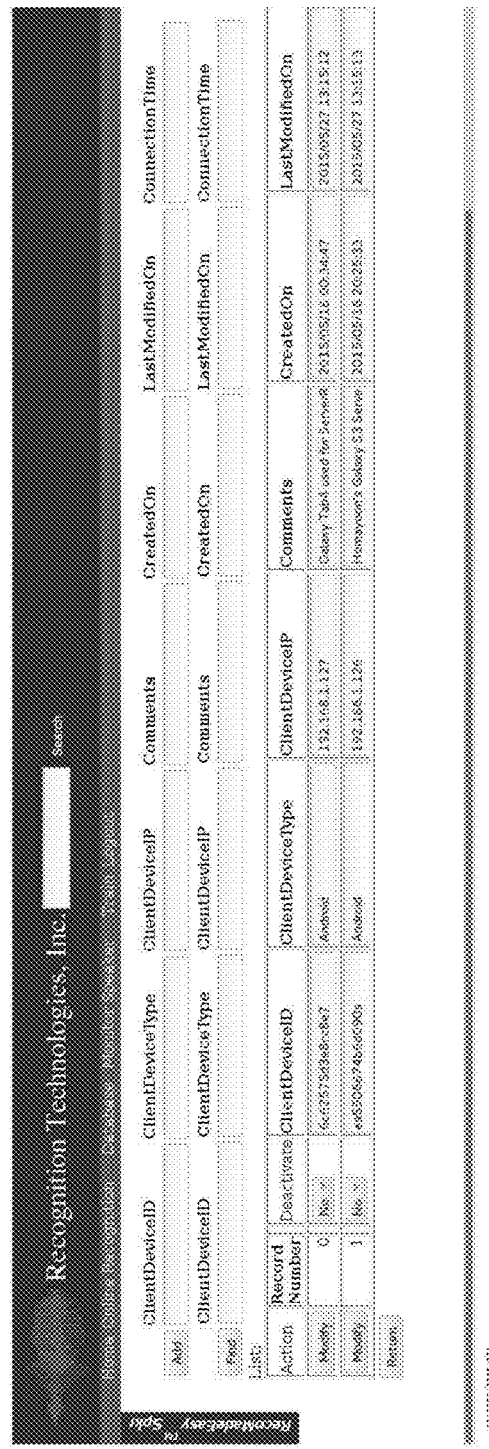
FIG. 41 License Database

ACCESS CONTROL THROUGH MULTIFACTOR AUTHENTICATION WITH MULTIMODAL BIOMETRICS

CROSS-REFERENCE TO RELATED APPLICATION(S)

The present application is a continuation-in-part of U.S. patent application Ser. No. 13/287,994, filed on Nov. 2, 2011, which claims benefit of U.S. Provisional Application No. 61/409,151, filed on Nov. 2, 2010, herein incorporated by reference in their entireties.

BACKGROUND OF THE INVENTION

1. Field

This invention relates to the field of data security, such as secure storage and retrieval of sensitive medical and financial data, multifactor authentication, access control, remote control of devices in absentia, such as in the case of home automation and other remote devices, as well as biometrics. It specifically relates to multifactor authentication for gaining access to a place or a resource such as a data bank, or conducting transactions, using handheld (mobile) or fixed devices. It is also related to near field communication and other wireless communication techniques as well as cryptography and key exchange encryption techniques such as symmetric and asymmetric hashing and encryption.

2. Description of the Related Art

Mobile devices such as smartphones, personal digital assistants (PDAs), as well as many other handheld devices are being used as authentication devices for financial as well as access transactions. In some countries these devices are providing the means for cash transactions in the same way a debit card is used. Some African countries have even been using these devices as prepaid credit devices which may be used for cash transactions simply by having the credit transferred from one phone to another. These are mostly done using the mobile network. In addition, there have been applications where a mobile device is used to access a data repository using well-established authentication methods, as well as hard-wired access control devices used for physical access to restricted areas. Some of these systems have also used biometrics such as fingerprint and iris recognition at fixed entry systems.

ICT Regulation Toolkit is a toolkit which is generated by the Information for Development Program (InfoDev) and the International Telecommunication Union (ITU). A Practice Note [1] gives many different examples of financial services which are available through the use of a mobile phone. These include, Branchless Banking Models, such as the WIZZIT service [2] in South Africa, Mobile Payment systems such as M-PESA in Kenya, Globe Complete G-Cash service in the Philippines, and Airtime Transfers [3] in Egypt, South Africa, and Kenya. See [1] for details.

However, the listed transactions currently rely on one or two of the following two authentication factors:
1. Possession of an item (something one owns).
2. Knowledge of a fact (something one knows).

In the scenario described at the beginning of the Description of the Related Art, the phone is being used as an item being owned (1st authentication factor). In this case, if the phone is stolen or used without permission, one or more transactions may take place before the phone may be deactivated or the credit may be blocked. In fact, technically, the possession of the phone is equivalent to the old standard of possessing currency.

To reduce the chance of the fraud described in the previous paragraph, some implementations also require another factor in the form of something the person knows (2nd factor), such as a challenge passcode. However, most such passcodes are simple to ascertain and to abuse in order to attain unlawful access to the funds associated with the telephone.

SUMMARY

The present invention provides for methods and systems that perform electronic transactions utilizing mobile devices in conjunction with multifactor authentication. The multifactor authentication, described here, utilizes four types of authentication factors including:
1. Possession of an item (something one owns).
2. Knowledge of a fact (something one knows).
3. Identity (something one is).
4. Liveness Factor (proof of being a human and not a machine)

Of course it is preferred to use more than one authentication method in each factor type (category). In order to be able to decide if the device of interest is in the possession of the target individual. As an example, take the first factor of identifying the device itself. One may use the Subscriber Identity which is stored in the form of an ID on the Subscriber Identity Module (SIM) on most phones. Most PDAs and other handheld devices also have similar network subscriber IDs. Other possible device identifiers are the Media Access Control (MAC), or the Universally Unique Identifiers (UUID) and/or (Internet Protocol) IP address, or Caller ID. N.B., MAC addresses are not unique, but the chance of two devices possessing the same MAC address is low. Also, IP addresses may be spoofed.

This invention will not only utilize the third factor in conjunction with the first two factors in order to increase the security of the device and to reduce the chance of providing unauthorized access to individuals, but it also provides methodologies for combining these sources of information to reduce the chance of fraud.

As it will be made more clear, this new methodology may be used for many other similar authentication applications such as any financial transaction, any access control (to account information, etc.), and any physical access scenario such as doubling for a passport or an access key to a restricted area (office, vault, etc.). It may also be used to conduct remote transactions such as those conducted on the Internet (E-Commerce, account access, etc.). Yet another application is access and manipulation of medical, financial, and other sensitive, personal, and/or sensitive records or data. In the next section this multifactor authentication is described further.

For the second factor (knowledge of a fact), as an example, a challenge in the form of a traditional passcode may be requested, in which case it is usually typed in, or depending on the available input devices, preselected or predefined facial expressions (for cameras), natural language understanding or a repeated phrase, through a speech recognizer for a microphone input, a handwritten signature such as described by [4] used with a touchpad or a pen may be used along with other methods, some of which are described in Section 2.3.

For the third factor (something one is), biometric techniques are used. Many different biometric methods may be used, such as those listed in Section 1.3. Some such techniques are Speaker Recognition, Image-Based or Audio-Based Ear Recognition, Face Recognition, Fingerprint Recognition, Palm Recognition, Hand-Geometry Recognition, Iris Recognition, Retinal Scan, Thermographic Image Recognition, Vein Recognition, Signature Verification, Keystroke Dynamics Recognition, and Brain Wave Recognition using a Brain-Computer Interface (BCI). Of course a multimodal biometric recognition is preferred, since it reduces the chance of errors due to technological shortcomings and fraud.

With increasingly sophisticated technologies which are available, more care needs to be given to establishing the liveness of the individual being authenticated by the system. Spoofing techniques enjoy access to better mimicry technologies such as high fidelity recordings of speech of the person, high quality digital images of the person, latex replica of fingerprints, high quality image of the iris of the individual, etc. The liveness factor helps ensure that a person is indeed being authenticated and not a machine posing in his/her place. More details are given in Sections 1.3.1.2, 1.3.4.1, 1.6, and Item 4 of Section 1.1.

Several methodologies will be presented by this invention in the process of combining the above elements from the four possible factors, in order to reduce the chance of fraud. Moreover, in order to ensure that the data kept on the device and on the servers associated with the transaction do not lose their integrity and all transactions are secure, a unique methodology is presented (Section 2) which provides assurance that all the data and models associated with the biometrics, as well as the software being utilized to run the authentication and the transactions are unchanged and authentic. It also ensures that a transaction authority may trust the multifactor authentication being done on a device which is held by the person being authenticated. This trust is essential to allow for the authentication to be done locally on the device being used by the user, or an independent device which is not owned or controlled by the transaction authority. In all, the communication, storage, and processing of transactions among the following modules: data capture, authentication, point of service, transaction authority, and certificate authority are made secure and trustworthy by the process presented in this invention.

As a practical usage of the multifactor authentication capabilities associated with the system described above, new detailed applications are elaborated, enabling practical usage of the said authentication system for gaining access to restricted locations and performing device automation and control, either at a home or a place of business or any other restricted location. Specific examples will be given to clarify the field of invention. Due to the nature of the applications, the device may either be in the form of a handheld device or be mounted in a specific place for usage by the members of the public who are authorized for the usage of the device, in order to gain access to the place of interest or to control remote devices, such as lights, appliances, or other devices.

Furthermore, access may be realized in the form of access to restricted data or records such as access to medical or financial records. Namely, a methodology will be presented that allows for the safe storage of personal data such as medical and financial records on a personal device or computer where the multifactor authentication described in this patent will be used to unlock the data. This ensures that only the owner of the data has access to the data and will be the only person in control of the data. For example, this enables the owner of the data to store the data safely on his/her device and selectively share parts of the data with institutions which may have a shared interest in having access to some of that data. For example, all of a patient's medical records may be stored on his/her personal device, locked with his/her multifactor authentication scheme described here. In one instance, the patient may need to see an internist who may need to review his/her latest blood test results, in which case the patient may unlock the data and transmit that part of the data to the doctor. In this scenario, the patient chooses what part of the data is shared with the doctor and the data is only shared with the patient's consent. Any other person gaining access to the personal device of the patient will not be able to access the data. Also, this allows for patients to carry their medical history with them at all time without having any concern with privacy issues. In fact, different parts of the data may be tagged with different security levels. As an example, if the patient is diabetic or has known severe allergies, he/she may choose to make the data associated with these items public so that in case he/she goes into a shock, the data is available to all individuals accessing his/her device. However, they will not have access to the rest of his/her medical history and details. The important enablement is that the patient makes a decision on what part of the data requires high security and what part does not.

BRIEF DESCRIPTION OF THE DRAWINGS

FIG. 1 describes the process of registering the essential authentication data such as the digest (hash) of the subscriber ID, biometric models, and the binary code of the software being run with certificate authorities. This is the process that takes place once, either when the user has first activates the device or once for each new security level and access credential which is added.

FIG. 2 shows the hardware components of a generic smart device such as a smartphone, PDA, etc.

FIG. 3 shows some of the components present in a generic operating system and service layer. The Authentication Services shown in the Services sublayer of the figure may include the authentication components of this invention. Alternatively, this part may also reside in the Application Layer where the client application runs, depending on the configuration and placement of the different components of the system. The Hardware layer of FIG. 2 is shown at the bottom of drawing. The operating system kernel generally mediates the communication between the service layer and application layer and the hardware layer.

FIG. 4 shows the capture devices for the 4 different authentication factors, the match scores from which are fused (combined) to come up with an ultimate authentication score (Section 1.5) which enables the final authentication decision:

1. There may be up to D device identifiers. Examples of such device identifiers are Subscribe ID (SID), Universally Unique Identifiers (UUID), Media Access Control (MAC), Internet Protocol (IP) address, Near Field Communication (NFC) ID, Bluetooth ID, Telephone Called ID, Radio-Frequency Identification (RFID), a function of the CPU Information (such as a hash value of the /proc/cpuinfo in Linux machines, the Microsoft Windows Product Registration Key, or IOPlatformExpertDevice information for Macintosh operating systems), Infrared Data Association (IrDA) discovery, etc. See Section 1.2 for more information.

2. There may be up to P personal information extraction devices or modules. The capture devices may be shared across this Factor and Factors 3 (multimodal Biometrics) and 4 (Liveness Assessment). Some examples of personal information may be a PIN, a password, a keyword phrase, a preselected hand gesture, a preselected facial gesture, a preselected body movement (gesture), speech response to a question, the information of which is only known to the user, an online signature, a preselected handwritten gesture via a digital pen or a finger on a digitizer, a preselected non-speech audio such as clapping, whistling, etc., a preselected mental image resulting in a change in a Brain Computer Interface (BCI) such as an EEG or fMRI signal, etc. Depending on the methodology used to assess the personal information of choice, different types of human-machine channels (sensors) may be used. See Section 1.2 for more information.

3. There may be up to N biometric sensors used. See Section 1.3 for more information on some of these types of biometrics.

4. There may be up to L liveness capture channels. As described in Section 1.2, the liveness challenges may share the information extraction with authentication Factors 2 (Personal Information) and 3 (multimodal Biometrics). Their distinguishing point is that they are designed such that the information is requested based on a live prompt which may change randomly. This will ensure the fact that the response should be coming from a live user rather than a machine. This ensures that a machine is not used to spoof the multifactor authentication system.

FIG. 5 shows the different basic components of the proposed system. Each of the components in this Figure may have several subcomponents which may be distributed over different devices. The following is a brief description of the different modules.

1. Device Identification Module—The device generally plays several roles. One of its roles is as a representative of the first authentication factor described in Section 1.1. Another role of the device is to manage the user interface. In practice it is possible that this module has different components which are spread out across different devices. For example, there may be a more or less independent RFID device which would provide information to the user interface module as a device identification to be used as a factor of the first type in Section 1.1. However, the most practical case would have this device include the User Interface Module and all the capture devices as well.

2. Information Capture Devices—This module includes the information capture devices and methodologies for the different Modalities of the 4 factors. See the description for FIG. 4 for more.

3. Authentication Service—The authentication service uses the Information captured for the 4 different factor types and conducts the multifactor authentication logic, producing Scores for each authentication factor. Note that there are generally one or more members of each of the 4 factor types, used in the multifactor authentication system of this invention.

4. Authentication Database Module—This module includes biometric models, signed digests (hashed values), and other data related to the service. This module may in general be distributed across different machines or devices, with encrypted communication among the different components. See Section 3.

5. User Interface Device—This device is the main interface for User Communication. It also manages the Information Capture Module and related Device to receive the Personal Information Capture, Multimodal Biometric Sample Capture, and Liveness Media Capture. It also provides feedback to the user. Along with the management of all the functionality of the main components of the system.

6. User Interface Database Module—This module includes data which is related to the client side related to the user interface.

7. Point of Service (POS)—See Section 2.9.

8. POS Database Module—This is the database and its interface, used by the POS. For example, if the POS is a physical access POS, the database would contain the label of the specific portal being opened and its hardware communication data.

9. Transaction Authority (TA)—See Section 2.9.

10. TA Database Module—This module includes the database and its interface which is used by the TA. See Section 2.8.

See Section 4.1 for some practical configurations.

FIG. 6 describes the process of hashing the subscriber ID (S) and the biometric models, $B_n$: $n \in \{1, 2, \ldots, N\}$, such that they are prepared for the registration with the CA or verified before usage. In addition, $C_S$ is the signed certificate which is the result of a code signing technique described in Section 2.7. Also, see Section 2.4 for more information.

FIG. 7 shows the process of encrypting and decrypting the hashed data (digest).

FIG. 8 describes the process of digitally signing the reference data by the Certificate Authority.

FIG. 9 describes the process of signing the hash of the binary code of the software components described in this invention. Let us assume that the software being signed is the client software running on the PDA and its binary code is denoted by $X_C$. Then the code is presented to a one-way hashing algorithm, $H_A$, which includes as one of its components a one-way hashing function, $H_F$. The hashing algorithm splits $X_C$ into blocks of a certain size, which is the size expected as the input of the hashing function, $H_F$. Then it passes the block of binary code to $H_F$ and gets a hashed value (sometimes called the Digest). It generally performs some function such as the modulo function and sums up or uses another function to combine the results. The resulting fixed length code is the output of the hashing algorithm, $H_A$. For examples of Hashing Algorithms and Hashing functions see [5]. The Hashed code, $Y_C$ is encrypted and sent to the certificate authority to produce a signed certificate $C_S$. This signed certificate is in turn hashed again to produce $Y_{N+1}$ and signed again, generally by another certificate authority. This value is passed to the transaction authority and kept on file at the transaction authority as a reference to ensure validity of the integrity of the software being used at the time of the transaction. At the time of the transaction, a new copy of $Y_{N+1}$ is sent to the transaction authority through an encrypted channel to validate the integrity of the software. See FIG. 6 and Section 2.4 for more information.

FIG. 10 describes the process of code signature verification to authenticate the validity and integrity of the software.

FIG. 11 describes the validation process of the reference data on the phone at the time of the authentication.

FIG. 12 describes the serial validation process for multiple certificate authorities.

FIG. 13 describes the parallel validation process for multiple certificate authorities.

FIG. 14 describes the process of registration with a transaction authority such as a credit card company or an access control authority in order to be able use their transaction services.

FIG. 15 describes the generic transaction process through a Point of Service vendor in conjunction with the registered transaction authority relevant to this transaction. The POS may be a vendor who sells goods, provides services, or an access point.

FIG. 16 describes a point of sale transaction employing multifactor authentication in conjunction with a purchaser's mobile device. In this case the Point of Service (POS) is a point of sale cash register.

FIG. 17 describes a web-based electronic commerce transaction utilizing multifactor authentication in conjunction with a purchaser's mobile device through the Internet. In this case the web portal (electronic commerce website) is the POS. The main user interface is the computer which is connected to the web portal. The device (PDA) is also capable of communicating with this POS and provides the multifactor authentication.

FIG. 18 describes a process to realize an electronic passport into a place. In this case, the office building, door (portal), or the border crossing (airport or train station) are considered to be the POS. The transaction authority is the authority which has the credentials for granting access to the user, such as the department of state in the case of a passport, the human resources or security department in the case of an office building, and so on.

FIG. 19 describes a process in which the authentication techniques may be used to unlock a vault, providing access. In this case, for example, the bank vault, storage box in a bank, a post office box in a post office, and the like are considered to be part of the POS. The security outfit which has the credentials to grant access to the user is the transaction authority. In cases like this, an NFC, IrDa, or RFID tag communication between the door and the device also provide information on which door is being requested entry by the user. This information may be conveyed to the transaction authority along with the request and according to the database on file, the transaction authority makes a decision whether it should send an open command to the door or not. This access control process is similar in the description of FIG. 18 as well.

FIG. 20 shows an administration interface for setting up the access device (PDA or tablet in this case). In the figure, 100 is the location for entering an administration username and 101 is the location for entering a password. Other means of authentication such as the current proposed multifactor authentication may also be used for this administration level as well. It is for the sake of simplicity that a standard username/password pair is being used to reduce complexity of the description.

FIG. 21 describes a process in which speaker recognition, face recognition, and speech recognition results may be mixed by choosing relative weights to contribute to a final fusion score for making an authentication decision. Speech recognition in this example is the use of random sentence prompts and passing the resulting speech to the speech recognition engine which returns a score associated with how well the uttered text matches the prompted text. In this example, speaker recognition, face recognition and random prompt check through speech recognition are picked and the weight associated with each modality and factor has been set to 50. This means that each weight would be 50 divided by the total weight which is (50+50+50=) 150, or one third. In the figure, 41, 42, and 43 request the use of the specific modality and 44, 45, and 46 are sliding weight selection mechanisms. 50 provides an interface for changing the speech recognition grammar which is used for generating and recognizing the random prompts. 51 provides an interface to change the language in which the prompt is generated. In the case of the RecoMadeEasy®, the speaker recognition biometric engine is language-independent, so the change of language only affects the prompt generation and recognition. 81 is a button which provides an interface to the administration login page of the access control client application. It takes us to the content of FIG. 20.

FIG. 22 presents a sample result of the fusion scores and fusion ranks of the resulting speaker recognition and face recognition biometric engines between the test sample and the models of the people in an access database for a server room door entry. In this figure, detailed information about the form in which the results are arranged is presented. Under normal access circumstances, this data may remain hidden since the final result is only of interest in making the final decision of the multifactor authentication. In this example, the multifactor authentication is only showing the score fusion between the two biometrics of speaker recognition and face recognition. In the Figure, 112 shows the rank of the fused results. The list is sorted according to this rank. The rank is computed according to the Fusion score, 115. 113 shows the unique ID of the enrolled models which matched the best against the test sample, when the two biometric scores were fused, namely based on score 115. 114 shows the sorted list of full names or full descriptions of the models. 116 shows the rank according to the speaker identification score, 117. 118 shows the rank according to the face recognition score, 119. 120 is a Universal background model as described in [6], which is considered to be one of the competing models to be used as a rejection mechanism. Likewise, 121 is the male average model, used as a competing model for rejection and 122 is the female counterpart. 123 denotes the best matching competing reference model described in detail in Section 1.4, which is also used as a rejection mechanism to provide open-set identification capabilities, as described in [6]. 124 is one of the ambient noise models being used as a rejection mechanism to determine whether there is real speech or just ambient noise. This becomes important in making certain that dead air or ambient noise is not recognized as a real individual in the database, just because it has the closest matching score of all the models. Having one or more ambient and other noise models will ensure that a test sample of that type is correctly identified as such and that a true speaker model is not returned, which would generate a breach of security for the case of access control, for instance.

FIG. 23 shows the case where the administrator places the access device into enrollment mode to enroll individuals rather than providing access through the device. The enrollment is used to learn the biometrics and personal information about an individual who is added to the system by the administrator in order to be able to access certain configurable portals. 102 shows a preconfigured server name with hidden IP address or credentials. Choosing this server as the authentication server, will send the captured authentication data to that server and the results of the multifactor authentication are received from the server. The decision is then made or displayed based on the returned results. An alternative would be to have the administrator enter an IP address or another identifier for the server of choice, as shown in 103. For the enrollment process, described in the description of FIG. 24, there may be a default entry page. However 104 provides a web address entry location for an alternative enrollment portal which would be customized with the look and feel of choice. This is only used when 105 is checked to perform as an access control system and 106 is set to Enroll in contrast with the Access mode. In Enroll mode, the enrollment data is captured and the appropriate biometric models are built from the captured media and the corresponding databases are set with data such as personal information (such as PIN) to be used for a factor of type 2, described in Section 1. If 107 is checked, then it means that the enrollment data should be captured for text-dependent recognition. If it is not set, then the data will be treated for text-independent speaker recognition. 108 and 109 are the username and password used in the multiuser server which has different configurations and databases associated with each username. For example, the username rmeaccess is one that is set on the authentication server and has its own enrollment database, access portal database, and other related databases associated with it. It also may be used to perform a specific task. For example, rmeaccess is a username associated with the multifactor authentication related to an access portal (door to a server room), whereas, rmemedical may be related to a multifactor authentication configuration related to the storage, access, and sharing of medical records. 111 provides the option of saving the password so that simply accessing the administration will load the password for the username on the multifactor authentication server as well and there is no need to enter this password again; only the administration login credentials discussed in the description of FIG. 20 would be enough if this box is checked.

FIG. 24 shows sample data which is requested from the user at the time of enrollment. In this specific example, the user is asked to provide a unique ID (95), his/her full name or description (96), and a PIN (97). This is the preamble to the capture of the biometrics that are associated with this individual. This is a simple enrollment data portal. Alternatively, a more customized or complex enrollment portal may have been designated in 104 of FIG. 23. Tapping or click on 81 takes the user to the administration login page described in description of FIG. 20.

FIG. 25 shows the interface when the personal information is submitted to the enrollment process and provides the interface for capturing the biometrics associated with this individual, identified by the unique ID (92) and full name of description (93). At this point, a combination of biometrics may be captured either in parallel or in series. In the displayed example, the audio and video of the individual are recorded while he/she reads the provided reference text (91). Since the speaker recognition is text-independent, the enrollment need not be done using a fixed text. In fact, in the case of language-independent speaker recognition, the language of the enrollment text may also not be fixed. The text is provided as a convenience to avoid the user from being unable to speak because he/she cannot think of anything to say. As an example, the user may hold his finger on a fingerprint sensor while readying the passage or may read the passage and then be asked to provide fingerprint samples. The camera may also be used to capture the iris of the individual, as well as other biometrics, depending on the available biometric sensors.

FIG. 26 shows the feedback progress bar 83 and the fact that the Start button has changed to Cancel (compared with FIG. 25), to allow for the cancellation of the enrollment. The progress bar 83 is an indication of how much more the person needs to speak. A similar progress bar may be used with possibly showing number of fingerprints captured out of the ones requested, when fingerprints are captured. The Back button provides the means for returning to the idle state of enrollment which is where the personal information is entered.

FIG. 27 shows a possible feedback to let the user know that his/her enrollment has been successful (94). Alternatively, an error message may have been displayed in this location (94), providing feedback to the user about what may have gone wrong with the enrollment process. Possible errors include software license validity or expiration and communication errors with the authentication server.

FIG. 28 shows a set of possible administrative settings such as the name or IP address of the server handling the authentication process and housing the database along with the interface to the access portal. It also includes a location for the address of a site for capturing customized enrollment information with a customized appearance. It allows for choosing whether the authentication will be text dependent and whether the access device is in Access mode (106) or enrollment mode as shown in FIG. 23. It also provides an interface for entering a username and password for the multiuser controls on the server. Each username may provide different settings for different portals with customized access portal hardware, and access to specific devices and users. See the description of FIG. 23 for more.

FIG. 29 shows a tablet device with an interface for inputting a PIN, accepting a speaker recognition audio input, a face recognition video capture, and the means for displaying a random string to be used for liveness testing through speech recognition. It also shows feedback on whether access has been granted or denied and the number of people who have matched the authentication procedure for this specific access control session and the total number of such authentications that need to be successfully performed.

FIG. 30 shows a screenshot of the interface that may be presented on a tablet, PDA, smartphone, computer screen, et cetera, for inputting a PIN (82) as a possible personal information. One way for this PIN entry pad (85) to be displayed and wait for entry is to tap with a finger, a pen, or click using a mouse in the bounding box where the PIN needs to be entered. Initially, the status (89) of the access control system is set to Denied. In order to provide some visual feedback to the user while capturing his/her face, an oval (84) is overlaid on the video monitoring window. It is not necessary for the head to fit in this oval. It is only a reference to provide a visual cue so that the face would essentially fit in the video monitor rectangular region. 86 denotes the random text being displayed by the access control system in order to assess liveness, according to a factor of type 4, described in Section 1. 87 shows the number of people who have already matched the multifactor authentication criteria and 88 shows the number of total matches requested by the system, according to the database setup for the portal (door) of choice. See Section 4.2.5.

FIG. 31 shows an Access button which is a possible method for engaging the access control system and starting the authentication process. Before the Access button is depressed, the system may be in an idle status.

FIG. 32 shows the process of authentication right after the PIN has been entered. At this point, the number of successful authentications out of the total requested authentications is presented, followed by the authentication status. Then the user is presented with a random phrase to read, as a liveness strategy. In the meanwhile, there is feedback provided to the user in the way his/her face is captured, with an informational bounding area to provide feedback on what would be a good distance to keep while looking into and speaking into the access control system.

FIG. 33 shows a scenario in which the user has forgotten to enter the required PIN. An error message is displayed to alert the user to make sure a valid PIN is entered.

FIG. 34 shows the entry of a PIN where the PIN is not displayed for security.

FIG. 35 shows a progress bar on top which provides feedback on how much audio and video have been captured and how much still needs to be captured. It also shows that the Start button which was depressed in the previous interface has turned to a Cancel button in order to cancel the biometric capture. It also shows a Back button to allow for going back to the idle state of the Access Control and completely cancel this authentication session.

FIG. 36 shows a feedback when a successful authentication match has been performed when the requested number of matches is only 1, hence access is Granted (89). This state generally results in the triggering of a positive access state such as the opening of a door, entry to a secured portal, display of and access to secure data, etc.

FIG. 37 shows the entry point for accessing the database and configuration on the sever side. The username and password used here are the ones described in 108 and 109 of FIG. 23 (see the description of FIG. 23).

Figure 39:
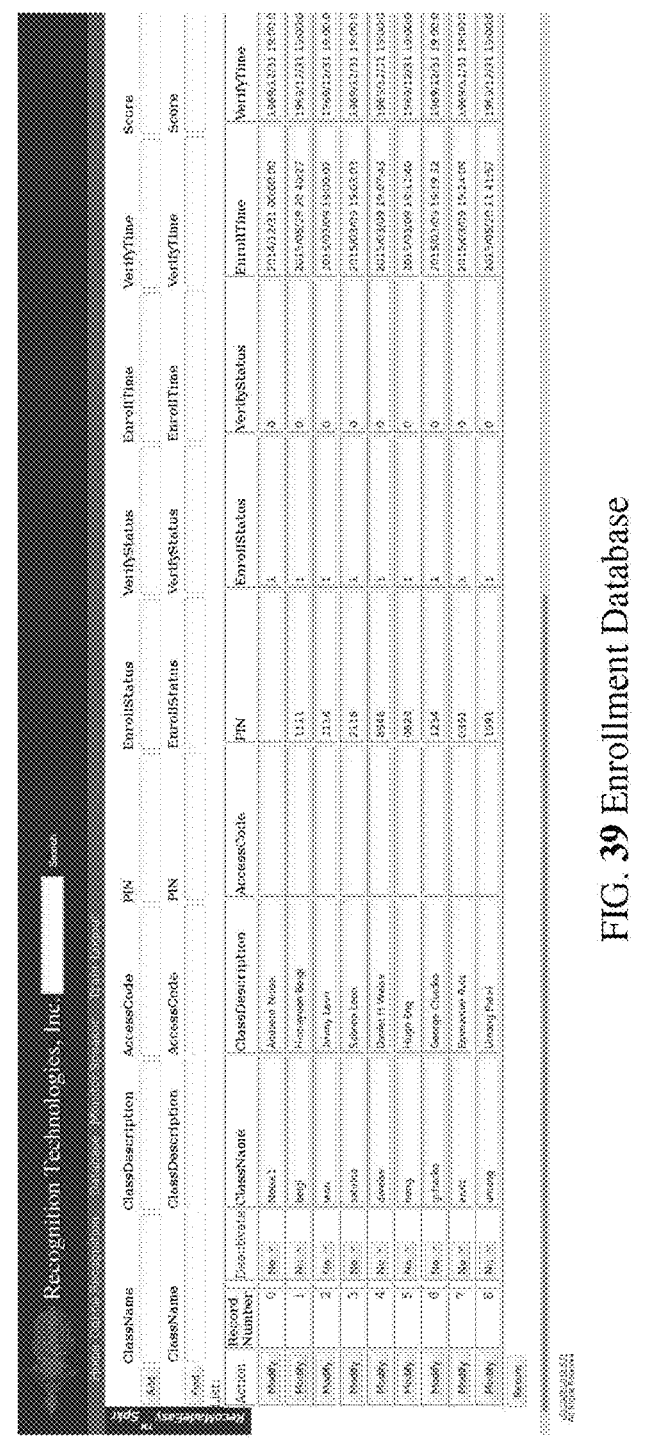

FIG. 38 shows a possible list of databases being kept on the access control server. In this specific scenario, the multifactor authentication and the POS, along with the access control transaction authority are one the same server. The first database in this list is called SpeakerClass. Although it is designated as the SpeakerClass database, it basically contains the list of enrolled users with all their corresponding information with the exception of the biometric models. It should more appropriately be called the enrollment database. See the description of FIG. 39 for more. The second database in this figure is AccessPortal database. It contains information about each physical access portal (or door), including its type, ID, IP address, etc. See the description of FIG. 40 for more. Another database is the App License database which is described in more detail in the description of FIG. 41.

FIG. 39 shows a snapshot of a portion of an enrollment database. This database needs some fundamental fields such as a unique ID, which should uniquely identify each person, preferably in the universe of possible persons. In this specific database, each record is associated with one unique ID. Also, depending on which biometrics are used, each record presents the methodology for accessing the biometric model(s) for each of the biometrics being used for the person associated with that record. The unique ID has been called the ClassName in this Figure. The unique ID may also be considered as the key to the access of each record. In addition, there is also a sequential or unique record number associated with each record so that given this Record Number, the record may be accessed immediately. The next field, which need not be unique, is called the ClassDescription field. It may contain the full name or designation of the individual associated with the record. It may also provide a description of any records which are not associated with a real individual. An example is ClassName of Noise1 which is described as Ambient Noise in the ClassDescription field. This happens to be a noise model and does not represent any individual. There may be other records representing different music or other audio and pictorial events. In addition, every database record has a Deactivate binary input. When it is set to "No", then the record is active, hence it is usable in authentication and other references. If it is set to "Yes", then the record is deactivated and it is treated as a deleted record. In order to reduce fraudulent activity where no trace of a record would be left, physical deletion of any record is prohibited. A record may either be deactivated or reactivated. This way, log entries that refer to a specific record will always remain relevant. Other records may be related to factors of type 2, as described in the section on Multifactor Authentication, Section 1. Some examples given in FIG. 39 are an AccessCode and a PIN. The database also includes status information on whether the person has enrolled his/her biometric models. In other words whether the person has provided biometric samples as references to be used for future multifactor biometric authentication. As an example, EnrollStatus may be 1 or 0. More specific enrollment status fields may also be used. For example, there may be a specific enrollment status field for every biometric being used and they may have independent values, meaning that a person may have been enrolled in the speaker recognition database and not in the face recognition database. Verification and other actions may also have associated status fields. In fact in the case of Verification, the status need not be binary. It may include many more status levels. For example, it may contain information about the number of times the person has failed to be verified, etc. There are generally timestamps associated with different activities of the database such as the last access, last modification, and so on. The enrollment database may also include relational data fields related to any of the factor types described in the Multifactor Authentication section. These relational data fields may point to records in other databases. An example is the association of an individual with a number of devices he/she may use to access the system or to perform transactions such as access control.

Figure 40:
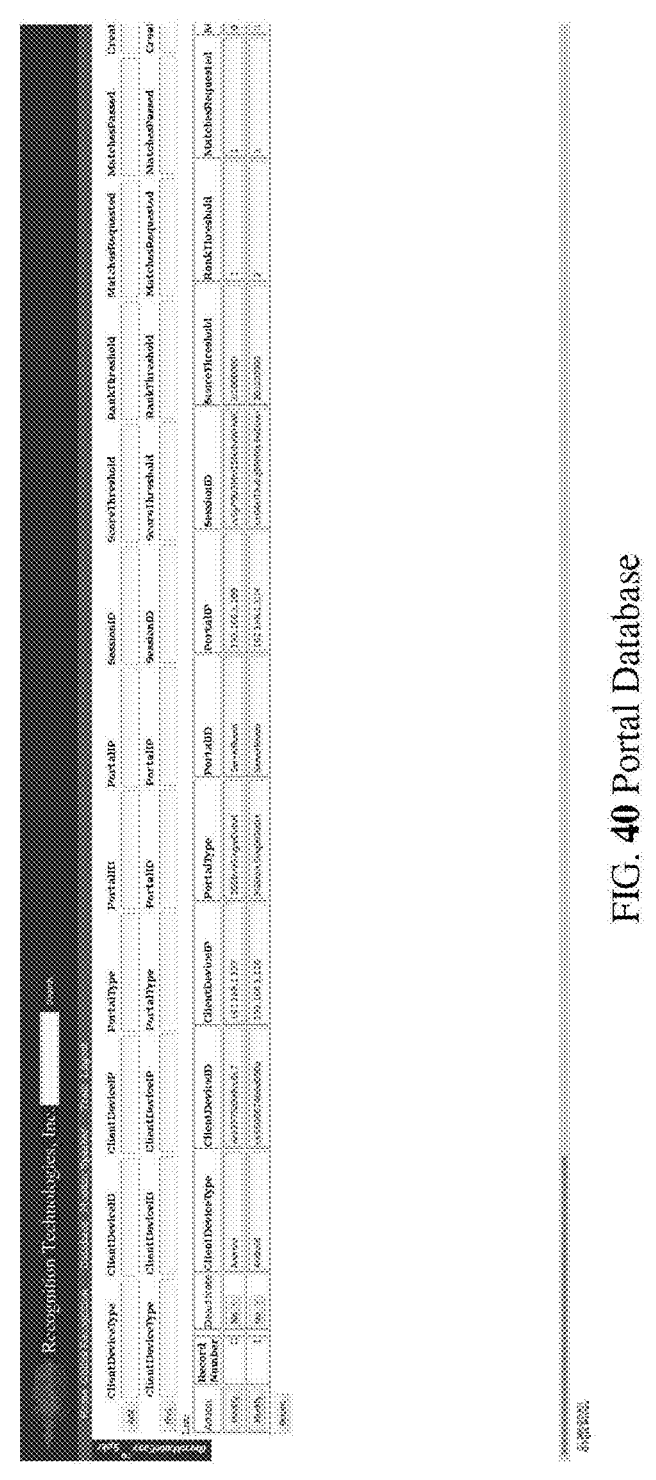

FIG. 40 shows a sample database table called the portal database. This specific example is related to the access control scenario. It includes a cross reference into the client device license database. Just like the database described in the description of FIG. 39, it includes a binary field called "Deactivate". Under normal operations, it is set to "No", which means the record is active. When a door needs to be taken out of service, this field related the record representing the door of choice may be set to "Yes", or deactivated. In this simple representation there is one record for every door, user, and device combination. This is only demonstrated here in this fashion for simplicity. In practice, the database is a relational database where the record of each portal (door) points to a list of users who are allowed to access it and each user's record points to the list of devices the person is allowed to use to access the door. In this example, the door is designated by its IP address since it is reachable through an IP address. The client device is also listed by its type (Android) and its ClientDeviceID. The comments show a human readable description of the device and one for the door. There is a PortalType which provides information on how to handle the opening and closing of the door. This is information about the type hardware that is used at the door to open/close the strike. PortalIP is the IP address of the door. SessionID designates the temporary Session ID of the last request process. ScoreThreshold is a minimum required score to allow the door to be opened. RankThreshold designates the maximum allowable rank of the match as described in 112 in FIG. 22. If the ID of the person at the door is ranked higher than this threshold, the door will not be opened, just as if his/her fusion score result 115 threshold is lower than the designated ScoreThreshold. MatchesRequested designates the minimum number of successful authentication matches done in sequence to allow access. That is 88 in the Figures. Once the value of the number of successful matches, 87 reaches this value, access is granted. See Section 4.2.5 for more details. There may also be other thresholds based on the description of Section 4.2.6. This database also includes other information such as several timestamps depicting the last attempt and last successful attempt, number of failures in a row, etc. This information is kept as a snapshot in the database for immediate access.

However, all these details are also logged into log files which show all the activity of the system.

FIG. 41 illustrates a license database that stores licenses associated with every client which communicates with the system. This license is in the form of a key which has an expiration date built into it. This database shows a snapshot of some of the information kept about each client device, such as the ClientDeviceID, ClientDeviceType, ClientDeviceIP, human readable comments about the device, timestamps for a variety of conditions, etc. The ClientDeviceIP is not necessary for devices that do not have IP addresses associated with them. However, even if they have a temporary IP address such as one provided by DHCP, the temporary IP address is stored in this database for reference. All activity of the device is also logged, not including the secure data.

DETAILED DESCRIPTION OF THE ILLUSTRATIVE EMBODIMENTS

The following is a system in which a person may use a Cellular (Mobile) Telephone, a PDA or any other handheld computer to make a purchase. This is an example only. The process may entail any type of transaction which requires authentication, such as any financial transaction, any access control (to account information, etc.), and any physical access scenario such as doubling for a passport or an access key to a restricted area (office, vault, etc.). It may also be used to conduct remote transactions such as those conducted on the Internet (E-Commerce, account access, etc.). In the process, a multifactor authentication is used.

In this narrative, the words, "PDA", "device," and "phone" are used interchangeably to indicate a Cellular (Mobile) phone, any Personal Digital Assistant (PDA), Personal Music Player (Assistant), or any portable electronic device capable of capturing a biometric and communicating with a computer and/or telephony network.

As we will see later, one of the possible biometrics would be speech (speaker recognition). In this specific case, for example, the PDA of FIG. 2 would have to be able to capture audio and communicate with a network. Examples of such devices are cellular telephones with network access (WiFi, WAN, LAN, NFC, Bluetooth, etc.) and computational capabilities—e.g., iPhone, iPod, iPaq, iPad, Android Pad, fixed computer, or any PDA with a microphone, etc.

FIG. 2 shows the generic infrastructure of a mobile device (PDA). The device generally consists of a central processing unit (CPU) 8 which performs most of the computation, a persistent memory 6 which is used to store data for future use, a random access memory (RAM) 10 which is used for short term storage while a computation takes place or to load and run an application and its dynamic data segments, a subscriber identity model (SIM) device 12 which is used by telephone service providers to store the unique identity of the user account, S, a communication hardware 14 which specializes in telephone, wireless, networking, and related operations, peripheral hardware 22 which includes all other hardware used for the operation of the phone such as illumination, touchpad, switches, volume control, speakers, etc. In addition, there are human interface sensors which are usually used for communication between the user and the phone and some of which may be used to capture biometric information from the user to be processed as an extra authentication factor. Some of these devices have dual purposes (communication and biometric), such as a microphone 16 which may be used for telephone conversations as well as capturing the speech of the individual for speaker recognition—see Section 1.3.1. The camera 18 is another dual use sensor which may be used for taking pictures as well as obtaining images for doing image recognition as a biometric—see biometrics using imaging, starting with face recognition in Section 1.3.2. Other biometric sensors such as a fingerprint sensor 20 may be added to devices for extra security.

For instance, if the biometric of choice is fingerprint, then the PDA would have to have a fingerprint capture device. These requirements have been explored in the description below, for different biometrics.

1 Multifactor Authentication

It is important to clarify some terminology with first, regarding the process of conducting multifactor authentication. There are two ways authentication may be done, verification and identification.

With verification, generally a unique identifier is presented by the person who is asking to be authenticated along with the test data which should be used to authenticate the individual. The unique identifier is usually a key into the database that contains the models related with the target individual. The target ID is the claimed ID which needs to be tested against the test data being presented by the test individual. If the identity of the test individual is confirmed to match the identity of the target (claimed) individual according to the test data, then the test individual is authenticated. If the identity of the test individual does not match that of the target individual, due to the fact that the test data does not match the target model (data) on file, according to the claimed ID that has been provided, the authentication fails. Note that the following summary glossary:

Target Individual—The target individual is the individual whose ID has been submitted by a user requesting authentication as his/her claimed ID.

Target Model—The target model is the model associated with one of the authentication factors which models the identity of the target individual. For example, a target biometric model is the biometric model associated with the enrollment data of the target individual or the individual who is truly identified by the claimed ID.

Test Individual—The test individual is the user who is requesting to be authenticated.

In the case of verification, the claimed ID is provided by the test user. Therefore, verification entails the matching if the test data against the model of the target data and in contrast, the matching of the test data against one or more competing models as reference. This technique is usually very quick, since it only requires a handful of matches at most. On the other hand, an identification process is more costly and time consuming.

It is also possible to perform an authentication by using an identification scheme instead of a verification scheme. One way, which is what is being proposed here is the use of some unique or near unique identifier in conjunction with the test data. If the population of the enrolled users is small, then an identification procedure is performed, namely matching the test data against all the reference models on file and obtaining some score associated with each model on file. In this case, we still need a rejection mechanism for test speakers who are not enrolled in the system. The rejection mechanism used here is described in Section 1.4. In this case, the claimed ID does not need to be unique. It only needs to be limiting in a way to reduce the number possible models substantially. This way, the claimed Identity information is treated as a separate factor, which will be described in Section 1.1 as an authentication factor of type 2 (personal information). Let us assume for the moment that this ID is actually a personal identification number (PIN). It is possible that more than one person in our database has chosen the same 4-digit PIN. However, since there are 10,000 different 4-digit PINs, the presentation of the PIN reduces the number of possible models that may match the test data. In this case, the PIN is a specific sequence of numbers. However, the personal information, as described in Section 1.1, as a factor of type 2, may for example be the answer to a question whose answer is only known to the user. However, since the answer may be in free form, say in the form of a speech response, or a typed response, it is possible that the user may forget how he/she had exactly chosen the response to the question when he/she enrolled into the system. In that case, a match does not have a crisp binary result of 0 (no match) or 1 (match). The response may be 90% correct. For example the question may have been, "In what city were you born?" Assuming the person was born in New York City, he/she could have spelled out "New York City" at the enrollment time. However, at the time of the test, he may have responded using speech as "I was born in New York." The speech recognition system and the natural language understanding would produce a score of, say, 90% associated with this response, in relation with the correct response of "New York City." This score may be fused along the methods described in Section 1.5 with the scores being returned by the multimodal biometrics of say speaker and face recognition to provide a final score for each target individual in the list of enrolled people, using the test data from the user being authenticated. In here, a complete multifactor authentication is proposed which contains few modes from each of four different types of authentication factor which are defined here. Each of these modes produces a score for the test speaker versus the target speakers of choice.

1.1 The Authentication Factors

The present invention uses 4 different types of factors or types of sources for authenticating the individual who is requesting to gain access to a physical or virtual location. A physical location may be a home, an office, a country (passport), a bank vault, or any other location which imposes restrictions on entry based on a person's identity. A virtual location may be a bank account, a merchant account, an account with a seller or a facilitator of a sale between buyers and sellers, personal data stored on a storage device such as passwords and classified information on a hard drive or other storage media. A virtual location may also an entry point into an electronic transaction as described in the Transaction Section 2.2. Each factor type may include one or more modes, which are methods that would fall under that factor type. The following is a list of factor types or sources used for performing the authentication:

1. Specific Device: The identity of the device being used for the authentication through the use of a unique identifier such as UUID or IP address(es) of the device. The device used for the authentication should be associated with the target user (enrolled user who is allowed to use the said service for which authentication is being performed) in a database (Section 3). Multiple checks may be done for the possession of a specific device. For example, the PDA, phone, pad, or compute being used to perform the authentication may be identified by its unique UUID, NFC ID, Bluetooth ID, MAC address, IP address, caller ID phone number, etc. Of course, special care needs to be taken to ensure that these IDs cannot be spoofed, or that spoofing is made substantially hard to achieve. Also, additional device possession may be checked such as the possession of a Radio-Frequency Identification (RFID) or a Near Field Communication (NFC) tag ID, a unique device presenting random sequences which may be uniquely identified as belonging to the individual being authenticated, etc. Each of these identifiers is considered one mode of this factor type and each one provides information about the identity of the device. See the description for FIG. 4 for more such modes related to this factor and one or more of them may be used.

2. Personal Information: Examples of such information may be a personal identification number (PIN), a username, a password, answer to a predetermined or preselected question, the answer of which is only known to the person being authenticated. Furthermore, it may a preselected or predetermined action which is only known to the user and which should be performed at the time of the authentication. Each example is a mode of this factor type and one or more of them may be used.

3. Multimodal biometrics: A combination of a series of biometrics as listed in the Biometrics Section 1.3. The results of these biometric matches are fused to provide a score associated with the biometric challenges, as described in the Biometrics Section 1.3. Historically, a username or ID such as the Personal Information described above has been used as a key to perform biometric verification. In such a case, the identifier needed to be unique and it has been used to choose the biometric model against which a biometric verification is done. In the present invention, aside from this method, a method is used in which an identification (not verification) is done using biometric models on file and competing models (see Sections 1.3.1.1 and 1.4), independent of the personal information. In the proposed case, the personal information needs not be unique and is not used as a key to choose the biometric models for verification, since the process is one of identification. The open-set identification process will yield a sorted list of IDs with associated scores. Each biometric will produce one such list. The scores are then fused according to the description of Section 1.5, to provide a new set of combined scores, associated with the list of IDs on file, plus the competing models described in Section 1.4. The resulting list of IDs is then sorted according to the combined score. The preset features of the authentication are available from the database described in the Access Control Section 3. As described, the portal database contains three preset values, 1. Score Threshold, 2. Rank Threshold, and 3. Matches Requested.

According to these values and the logic described in Section 3, the IDs which pass these criteria, are candidates for being accepted as the authenticated person. The data associated with these IDs are used from the Biometrics Database described in Section 3 to test for the other three factors here, namely, Specific Device, Personal Information, and Liveness Factor. If all the criteria are met, the person is authenticated. Each biometric challenge is a mode of this factor and one or more of them may be used.

4. Liveness Factor: As described in and Section, this may be a reaction to a random prompt. For example, this can be the reading of a displayed random prompt, a valid response to a displayed random question, a facial or hand gesture such as the blinking of a specific eye, a number of times, or the performance of a hand or body gesture such as the snapping of a finger, holding up a number of fingers with a requested orientation, the turning of the face in a special way instructed by the application, etc. Each liveness test is a mode of this factor type and one or more of them may be used.

1.2 An Alternative Perspective of the Proposed System

In order to be able to present the fusion of multiple factors with a combination of different media and traits, the following alternative perspective is provided. It is important to understand the difference between the use of the second factor in contrast with the third factor, as defined in Section 1.1. This invention provides new techniques which may be used as the second factor, such as predefined or preselected facial expressions, predetermined content which may be uttered using a speech recognition system and a natural language processing and understanding engine. Yet another interface to use for the second factor may be the use of hand gestures. One may also use a predetermined handwriting gesture or handwritten word. The use of the handwritten word or gesture includes two aspects in one. The following describes the perspective and categorization that allows combining many traits and challenge-responses from different biometrics.

The following are the different human-machine interface channels, where each interface conveys different factors. Different media are listed below. Under each medium, the different human-machine interface channels are listed. For each channel, there is a list of traits and combination of challenge-response cases with the corresponding factor or combination of authentication factors they provide, as defined in the Section 1.1.

Each of the following human-machine interface channels may be used to perform many different combinations of biometric authentication (factor 3), personal information capture (factor 2), in the form of preselected responses or the discovery of a-priori knowledge of facts, and liveness information (factor 4), in the form of prompted discovery, such as repeating prompted requests or producing actions and responses that would carry proper information related to the prompted query.

1.2.1 Imaging

Imaging provides access to several human-machine interface channels. Imaging may be done from any part of the body, including the face, the ear, the hand, the complete body, the eyes (e.g. retina and iris), etc. It may also be done in different types light such as visible light, infra-red, different types of x-ray, etc. Although due to practicality, the visible light is preferred. Some higher frequency lighting (above visible) may be used for discovering concealment at the same time. Sometimes infrared light may be used for penetrating the skin to the level of the veins (Sections 1.3.10 and 1.3.11), etc. following are some prominent ones.

1.2.1.1 Facial Imaging

Facial imaging may be used for obtaining images of the face in the form of a series of still images, forming a video stream, or a single frame. With this interface, the following information may be obtained, leading to the listed factors or combination of factors.

1.2.1.1.1 Face Recognition (Factor 3)

Face recognition may be conducted by taking frames of pictures of the face, mostly in full frontal position, although they may be done in any orientation. The faces are manipulated to produce features and are matched against a list of faces in the database. This is a biometric.

1.2.1.1.2 Preselected Facial Gestures (Factors 2+3)

The face of the person is used as discussed above, in the form of a biometric. However, at the enrollment stage, preselected facial gestures have been chosen by the user which need to be enacted at the test or verification time, in order for the person to be authenticated. This conveys biometric information, as well as personal information that is only known to the user, in the form of preselected gestures. For example, these gestures may be the blinking of the right eye a few times, followed by blinking the left eye, the lip movement for the utterance of a preselected word, for which the camera will detect a series of lip movements, the use of the tongue for gestures in any fashion, etc. The preselected nature states that the same activity must have been done at the time of training. Therefore, at the test time, the activity is being compare to the enrolled activity. If at test time, both the biometric face recognition and the performed gestures match the models stored in the database from the time of enrollment, the person is authenticated.

1.2.1.1.3 Prompted Facial Gestures (Factors 3+4)

The face of the person is used as discussed above, in the form of a biometric (Section 1.3.4). However, the recognition system is capable of recognizing different facial gestures by using a standard description associated with each gesture. The system randomly prompts the user to perform different gestures. In this case, the point is to ensure liveness and that the system is not being supplied with a pre-recorded or artificially generated series of facial images.

1.2.1.2 Ear Imaging

Ear imaging may be used as a biometric as described in Section 1.3.2, therefore it provides a Factor of type 3.

1.2.1.3 Hand Imaging

Image of the palm of the hand with or without the fingers may be used as a biometric as described in Sections 1.3.6, 1.3.7, and 1.3.11. Standalone, this imaging would provide a biometric which is a Factor of type 3. However, in addition, the image of the hand may be used to capture hand gestures in the form of hand and movement and configuration. If it is done in conjunction with preselected gestures, then it would provide Factors 2+3. If it is done in conjunction with prompted hand gestures, such as a request to do a thumbs-up, or shown the index finger, or to cross two fingers, etc., it would provide a liveness test as well, which means it would produce factors 3+4.

1.2.1.4 Full Body Imaging

Full body imaging may be done to provide biometric information such as Gait (Factor 3). I may also be used to ascertain body language. The body language may be thought of as specific movements of different parts of the body, with relative positions of the different parts of the body, including relate speeds and accelerations. This information may be used in pretty much the same as the previous human-machine interface, to deduce biometrics (Factor 3) such as in Gait recognition (Section 1.3.14), or with preselected body movements (Factor 2) or prompted body movements (Factor 4). Any combination of the above may be used to produce a multifactor authentication procedure.

1.2.2 Audio

As with imaging, audio capture may be used to perform many different combinations of biometric authentication (factor 3), personal information capture (factor 2), in the form of preselected responses or the discovery of a-priori knowledge of facts, and liveness information (factor 4), in the form of prompted discovery, such as repeating prompted requests or producing actions and responses that would carry proper information related to the prompted query.

1.2.2.1 Speech

Speech may be used to provide voice biometrics about the user. Therefore speaker recognition by itself is a biometric (Factor 3), however, speech may also convey content in the form of a predetermined or preselected text (Factors 2+3).

Using speech to convey prompted content would provide a liveness test, hence producing Factors 3+4. In another usage, speech may be used to answer specific question related to the situation at hand. For example, a question may be posed about the local weather, the response to which should be befitting the question. Another example would be a question about the color of an object, the answer to which would require presence in the locality of interest at that specific moment. Depending on the capabilities of the natural language processing and understanding systems being used, in conjunction with the speech recognition capabilities, more or less complex questions may be asked by the system to assess liveness. These examples provide Factors 3+4. In fact, the queries may be formed in such an interactive way that would require Factors 2+3+4. In this case, the person's response would contain information about preselected or known facts, as well as prompts relating to the current state to ensure liveness.

1.2.2.2 Nonspeech Audio

Nonspeech human generated audio (whistle, clicks, taps, claps, etc.) may also be used to mostly provide Factors 2 and 4. A predetermined sound sequence such as a specific series of tones by whistling, or a number and duration of clicks, taps, claps, etc. performed by the mouth, hands, fingers, feet, etc. These may be used to provide an authentication Factor of type 2. Also, a prompted sound sequence such as a specific series of tones by whistling, or a number and duration of clicks, taps, claps, etc. performed by the mouth, hands, fingers, feet, etc. This would constitute an authentication Factor of type 4. A combination of the two types may be combined through an intelligent prompt system such as discussed in Section 1.2.2.1 to provide a combination of Factors 2+4 as well.

1.2.2.3 Audio-Based Ear Recognition

Audio-based ear recognition (Section 1.3.3) may be used to provide biometric information (Factor 3).

1.2.3 Online Handwriting

Online handwriting recognition [7] is very similar to the speech (Section 1.2.2.1). It has three different aspects that it may convey. The first is the recognition of the content of the writing, as in reading the handwriting of a person for content [7]. This aspect may be used to ascertain for Factors of type 2 and 4. The second aspect is online signature recognition where not only the shape, but also the local dynamics of the signature (relative velocities and accelerations of the different points in the signature) are used as a biometric to recognize the person based on his/her signature. Being a biometric measure, this aspect leads to a Factor of type 3. The third aspect is the use of handwritten gestures in which case the same techniques as are used in performing unconstrained handwriting recognition [7] may be used to recognize the gestures. These gestures may either be preselected (Factor 2) or be prompted, such as asking the person to draw a circle or a cross, etc. (Factor 4).

1.2.4 Online Signature Recognition

Signature recognition (verification) [4] is very similar to text-dependent speaker recognition where the signal is a handwriting signal. It may also be seen as a preselected gesture (Section 1.2.5). It provides biometric information (Factor 3), but it also includes personal information which is known to the individual. Unfortunately signatures (in their image form) are public and may be found on signed checks and documents, and therefore they may be available for mimicry. Although the dynamics are hard to mimic, it may still be achievable by seasoned impostors.

1.2.5 Preselected Handwritten Words

Choosing other preselected words, preferably a number of choices to be chosen at the time of the test by the user or system, will be more effective. It provides Factors 2+3.

1.2.6 Preselected Handwritten Gestures

As mentioned in Section 1.2.4, online signatures are special cases of online preselected gestures. In the same manner, one may choose other gestures and enroll the system using these gestures. At the time of the test, the user may use any combination of these preselected gestures which are not publicly available in contrary with signatures. These gestures provide Factors 2+3. Much in the same spirit, the user may be prompted to input specific gestures such as drawing a circle or a cross or any other shape. In the process, the relative motion of the hand, containing motor control dynamics information [8] which provides a biometric (Factor 3), as well the content of gesture which is prompted, which provides a liveness factor (Factor 4). Therefore, this case can provide Factors 3+4.

1.2.7 Brainwave or Brain-Computer Interface (BCI) (e.g. through EEG)

Brainwave recognition (Section 1.3.15) produces a biometric measure, but it generally always requires some context. The context may be either a predetermined context or one which is prompted.

1.2.7.1 Predetermined Brain Activity (Factors 2+3)

In this scenario, predetermined brain activity will generate a specific EEG signature which may be recognized as a biometric (Factor 3) and the knowledge of the specific activity which leads to the EEG signal. The user needs to know the activity and also will generate the EEG signal which is expected. This is somewhat like a text-dependent speaker recognition, where the text is not provided to the user and needs to be known.

1.2.7.2 Use of Brainwave to create a predetermined pattern (Factors 2+3)

In this case, in contrast with the previous case (Section 1.2.7.2), the user uses brain activity to affect a change in an intermediate medium, such as moving a cursor through a path on the screen, etc. Now, the user needs to conduct such activity to drive generate or follow a predetermined path. For the cursor example, we can think of the user using the capability of moving a cursor in a two-dimensional field or picking from a list of letters and numbers to produce a predetermined pattern or character or number sequence.

1.2.7.3 Use of Brainwave to create a prompted pattern (Factor 3+4)

This case is very similar to the case of Section 1.2.7.2, but in this case, the pattern is randomly generated by the requesting machine and the user needs to produce that pattern. This ensures liveness as well, just in case the previous patterns generated by the EEG have been intercepted and reproduced by a spoofing system.

1.2.8 Keystroke Dynamics

Much in the same way as handwriting, keystroke dynamics can provide motor control information which is somewhat text-dependent (Section 1.3.13) or at least dependent on the local ngram being typed [9]. The motor control by itself provides a biometric (Factor 3). The text may also be preselected to provide Factors 2+3. Alternatively, the text may be randomly prompted. In this case, using the NGram information as described in [9] provide the building blocks for testing liveness as well as the biometrics (Factors 3+4).

1.3 Biometric Challenge

There are several biometric challenges which may be used, depending on the available sensors. Today, most devices are equipped with a microphone as well as a camera.

Some newer models of devices such as the iPhone, also have cameras which face the user. Other inexpensive sensors such as fingerprint sensors may be added to devices and are present on some larger devices. The following are some of the biometrics which are deemed practical for such a challenge. However, the list is not limited to the one given below. In general, any biometric system capable of verifying the identity of an individual based on a biological measure may be used for this purpose.

1.3.1 Speaker Recognition

In a generic speaker verification application, the person being verified (known as the test speaker), identifies himself/herself, usually by non-speech methods (e.g., a username, an identification number, et cetera). The provided ID is used to retrieve the enrolled model for that person which has been stored according to the enrollment process, described earlier, in a database. This enrolled model is called the target speaker model or the reference model. The speech signal of the test speaker is compared against the target speaker model to verify the test speaker.

1.3.1.1 Competing Biometric Models

Of course, comparison against the target speaker's model is not enough. There is always a need for contrast when making a comparison. Therefore, one or more competing models should also be evaluated to come to a verification decision. The competing model may be a so-called (universal) background model or one or more cohort models. The final decision is made by assessing whether the speech sample given at the time of verification is closer to the target model or to the competing model(s). If it is closer to the target model, then the user is verified and otherwise rejected. This kind of competing model is used as the state of the art at the present [6]. In addition, the state of the art sometimes uses cohorts of the speaker being tested, according to the user ID which is provided by the user. However, if the person happens to be an impostor, then the cohort is selected based on the user ID which he/she provides. It is possible that the impostor is closer to the user ID he/she is trying to mimic in relation to the cohort which are a small set of speakers in the database who have similar traits to the target speaker. In this patent, a novel technique is used, in addition to the conventional techniques of a universal background model and/or the cohort set. This new technique applies to all biometric models and is not limited to speaker recognition and may be found in Section 1.4.

The speaker verification problem is known as a one-to-one comparison since it does not necessarily need to match against every single person in the database. Therefore, the complexity of the matching does not increase as the number of enrolled subjects increases. Of course in reality, there is more than one comparison for speaker verification, as stated—comparison against the target model and the competing model(s).

1.3.1.2 Liveness Challenge

It is important to make sure that the user of the device is not using a prerecorded message captured from the authorized user of the phone to spoof (see [6]) the speaker recognition engine. To do this, a challenge may be used that would test the liveness of the individual using the phone. Basically, these are some methods for doing such a liveness test.

A phrase is prompted or a question is asked. The user responds to the question or repeats the phrase. The audio is used to do the verification.

In this case, the response to the challenge may be combined with the phrase so that the content of the phrase being said may be decoded using a speech recognizer and the content may be matched against the expected the challenge response.

Most other biometric verification is quite similar to the speaker verification methodology given above. Some special features of other biometrics are listed below.

1.3.2 Ear Recognition—Image-Based

There are two types of image-based ear recognition systems, two-dimensional and three-dimensional. Two-dimensional image-based ear recognition relies on a photograph of the ear which may be taken using the built-in camera of the phone. The image may be taken and processed directly from the camera. The techniques use information about the color, texture, and shape of the ear to determine the identity of the claimant [10, 11, 12, 13]. There are also some 3-dimensional algorithms which either use a three-dimensional image of the ear (in which case they mostly need a supplemental 2-dimensional image for color reference). These techniques either use a three dimensional image [14, 15] of the ear or combine several two-dimensional images to produce a 3-D image [16, 17]. The three-dimensional approach does not seem to be too practical for a PDA application.

1.3.3 Ear Recognition—Audio-Based

The second ear recognition approach uses the acoustic properties of the pinna to establish the identity of the individual. In this approach, a small speaker and a microphone, both point into the ear canal. The speaker sends out a wave (1.5-kHz-22-kHz) into the ear canal at an angle and once the wave goes through the canal and reflects back from the ear drum and the wall of the canal, the microphone picks up the reflection wave. The way the wave is manipulated by this reflection is a related to the transfer function which is made up of the transfer functions of the speaker, the pinna, the ear canal and the microphone. This transfer function is estimated based on the input and reflected output [18]. This technique may be deployed by using a special earphone to replace the normal earphone that usually accompanies the PDA.

1.3.4 Face Recognition

Automatic face recognition has received quite a bit of attention in the last decade mostly due to the availability of the many video cameras in public locations for security purposes. Although, there has been active research in third field for more than 3 decades [19]. There have also been a handful of books written on the subject in the recent years [20, 21]. Cooperative face recognition may be use by incorporating the built-in camera in the PDA to identify the user. In order to ensure liveness of the user, several different techniques may be deployed.

1.3.4.1 Liveness Challenge

One possible liveness challenge is to request one or more pictures from the user with different expressions. For example, the candidate may be asked to make a specific expression which he/she has made in the past and which is registered in the telephone upon enrollment. The challenge would be the random tag associated with some of the enrolled expressions. The user is the only person who would know how to make the specific expression by name. The biometric models (enrollment data) are kept on the PDA in an encrypted form. Therefore, there is no way anyone can see the corresponding expressions. Only The tag is stored on the PDA. The challenger will ask for a specific number which is interpreted by the face recognition software as the label for a specific expression. The tag is then displayed on the PDA and the candidate will point the PDA toward his/her face and changes his expression to the dictated expression and presses a button. The image is then verified using the PDA and the results are passed to the authentication requester (cash register, etc.)

1.3.5 Fingerprint

Finger print recognition [22] would require the existence of a fingerprint sensor.

1.3.6 Palm

On portable devices, hand-palm recognition [23] may be done using the built-in camera.

1.3.7 Hand-Geometry

Normally, hand geometry [24] recognition is used in larger systems, however, on a small portable device, the built-in camera may be used for capturing samples.

1.3.8 Iris

Iris recognition [25] is usually implemented using sophisticated cameras. However, in the applications of interest to this invention, it is presumed that the user will be a cooperative user (see [6]). Therefore, the built-in camera should be sufficient for most applications.

1.3.9 Retina

Using a special modification to the camera for conducting a retinal scan (see [26]).

1.3.10 Thermography

Using a modification to the camera for obtaining thermal images [27]. These modifications are currently costly, but may come down in price and become more practical in the future.

1.3.11 Vein Recognition

Vein recognition [6] generally requires infrared or near-infrared imaging. It may be done using a modification to the camera.

1.3.12 Handwriting

For telephones and PDAs which have a stylus, signature verification citer-m:gruber-2010, may be used. Those with touchpads may also use a simpler gesture recognition systems.

1.3.13 Keystroke

For PDAs and cellular telephones with a keyboard (soft or hard), a phrase will be requested which will be typed using the keyboard and the typing style and dynamics [28, 29, 30, 31, 32] will be used to do the verification.

1.3.14 Gait

Imaging of the full body and the way a person conducts while walking is known as Gait biometric recognition. The length of a person's stride and his/her cadence are somewhat behavioral, but they also possess some physiological aspects. They are affected by the person's height, weight, and gender among other factors. Cadence is a function of the periodicity of the walk and by knowing the distance the person travels, his/her stride length can be estimated [33].

1.3.15 Brainwave Recognition

Brainwave is name given to the capturing of the residual electrical or electro-magnetic signals being produced by the brain of an individual. These signals may be captured using Electroencephalogram (EEG) or other brain imaging techniques such as fMRI, etc. However, EEG is much more practical at the present, since small headset-like devices [34, 35] may be worn by the individual and the brainwave may be captured. Brainwave has been used in the past to control devices, etc. However, it is has never been used as a biometric. This invention uses brainwave somewhat in the same manner as say speech is used for performing speaker recognition [6]. Although the brainwave signals are weak and carry a lot of noise, they would be unique in the way a person would thing of specific tasks. Capturing the brainwave under cooperative condition, when the person cooperates to be able to pass the biometric test, may lead to the verification or identification of the individual. Brainwave interfaces are also known as Brain Computer Interface (BCI).

1.3.16 Multimodal

Any combination of the above biometrics may be used to reduce the error rate and obtain a more reliable result. This combination may be done in any of the methods described in general, by this invention, treating biometric verification as a form of encryption, as well as straight combination of the results.

1.4 Competing Biometric Models

Alternative Choice of Competing Biometric Reference Models: Note that the techniques described here apply to all biometrics and are not limited to voice biometrics. The proposed technique may be used in the presence of a large data set comprising many individuals. If such database exists, then in lieu or in addition to the conventional competing models described in Section 1.3.1.1, multiple reference models are selected from a large pool of biometric models. For example, let us assume that 1500 reference models (such as reference speakers for the case of speaker biometrics also known as voice biometrics) are picked from a population of 1.5 million distinct biometric models (speakers in the case of voice biometrics) at hand. These reference models (reference speakers for voice biometrics) are picked such that they cover the whole space, defined (spanned) by the original 1.5 million models (speakers for voice biometrics). Namely, each chosen reference model is representative of the part of space in the original population of 1.5 million which surrounds it, in the sense of the metric being discussed in Section 1.4. The representative biometric model selection may be done on the basis of a uniform distribution, or it may be done according to a parametric or nonparametric distribution of the 1.5 million models defined in the space being discussed in Section 1.4. Namely, a proportionally higher density of representative biometric models may be used according to the actual population density of the biometric models. In contrast, in parts of the model space where there is a lower density of biometric models, a sparser, more distant set of reference models may be chosen.

In an alternative reference model selection scheme, the original 1.5 million models may be split into populations of known common characteristics. For example in the case of speaker (voice) biometrics, this may mean splitting the models into male and female speakers, or even male adults, female adults, and children. Once this preselection is done, the above may be done to create two (male/female) or three (male/female/child) sets of reference speakers. For the voice biometrics example, either established ground truth about the genders of the speakers represented by each model or automatic gender classification may be used to limit the population for which the rejection (competing) models are chosen. Other common traits may be used for other biometrics. Further reduction in the use of reference models may be done by first associating the reference data with the part of the space for the original 1.5 million models and then using the pertinent subspace of the reference speakers as complement models.

Note that by space, here, we mean the multidimensional space where the biometric models reside. For example, if the model happens to be represented by a single multidimensional vector of features, then the space would be the multidimensional Euclidean space that spans these models. If each model happens to be represented by a multidimensional mean vector and corresponding variance-covariance matrices, then again, the space would be that multidimensional Euclidean space that spans these densities, represented by the given means and variances. If the model is represented by continuous vectors in some discrete or continuous normed vector space, then the corresponding Banach, pre-Hilbert, or Hilbert space containing and governing these models is the space of choice. Refer to [6], specifically Chapter 6 of for such measure spaces, Chapter 8 for the computation of the appropriate metrics and divergences among such models, and Chapter 11 for detailed description of unsupervised clustering. In some cases, where there is a high overlap of the different dimensions of the representative models in their spanned space, a kernel mapping may be used to consider their projections into spaces of different dimensionality, where the metric between any two model representations is computed in that kernel space, described in Chapter 15 of [6].

Hierarchical grouping may be used to speed up the reference model selection. The hierarchy may be done either in a supervised or unsupervised fashion. Example of a supervised hierarchical classification is the initial splitting of all the models into male and female models. Then each group may be split further, by an unsupervised technique which would either do top-down or bottom up unsupervised clustering. Both clustering techniques require the presence of a distortion measure such as a distance or divergence between any two models. In order to be able to use a bottom-up (agglomorative) method, a merging function will also be helpful. The merging function should be able to marge two models and produce a new model that more or less possesses characteristics (traits) from both models being merged. Reference [36] provides an agglomorative technique for creating such hierarchy.

However, in the current invention, a novel approach is used which uses a divisive technique that splits the population, represented by their biometric models spread in their spanning space, as described in Section 1.4 into the number of clusters which are requested. In this case, we would like to cluster 1.5 million biometric models into 1500 clusters. To do this clustering (Chapter 11 of [6]), we define a distortion measure (Chapter 8 of [6]) between any two statistical models which are representations of the models. Depending on the type of model, the distortion measure may be defined differently. For example, if the model is represented by a vector, as it is the case for total variability space models (i-vector models) in speaker recognition, then the distortion measure may be defined as any distortion measure that would apply to two vectors, such as a cosine distance or any other relevant metric or divergence (Section 1.4). See [6] for many such distortion measures. Some of these measures will be divergences and some will uphold the symmetry and triangular properties that would deem a distortion measure a distance measure ([6]). For the sake of generality, we will call the measure a distortion measure which may be a divergence (directed or symmetric) or a distance measure. [6] As another case, if the model is in the form of a set of sufficient statistics, such as mean and covariances, then there are also different ways to define a distortion measure between these collections of densities or distributions which are defined by parametric or nonparametric traits.

1.5 Biometric Score Fusion

As described in the section on Multifactor Authentication (Section 1), as well as in the description of FIG. 21 and FIG. 22, each of the different authentication factors, categorized by the 4 types listed in Section 1, produces a score in the form of a confidence level or likelihood, relating the presented data (whether a biometric sample or other information) to the model or scheme defined for that authentication factor.

Depending on the factor, it is important to modify the given scores such that they would be comparable across the different factors. Each factor is generally measuring a different information, so the nature of these scores is different. In order to be able to compare them, they need to be transformed into a space that would not only present the same nominal range (say between 0 and 100), but also similar spread (distribution) of confidence in the different parts of the range. Once such transformation is determined, the scores are mapped into comparable spaces and any normal statistical measures, moments, and combination techniques such as means, variances, curtosis, etc. may be used to combine them and any metrics such as those defined in Chapter 8 of [6] may be used to compare any two matches. Note that it is not necessary to impose limits such as definitely staying between 0 and 100 for the scores, as long as they statistically have similar distributions in these ranges with possibly a handful of outliers outside the chosen range. We have been speaking of the range if 0 to 100 since percentages are generally well understood by the common population. Although the actual transformed scores may not be true percentages and may go below 0 and above 100, but only in few occasions. As an example, take the output of a verification process based on log likelihood ratio (see [6]). The numbers are generally small negative numbers in that case, but they can go above 0 as well since they are defined as the difference between two log likelihoods, each of which would go from 0 to minus infinity. Being akin to logs of likelihoods, one may first exponentiate them to get a score which is more like a likelihood and then normalize them to get confidence scores which would mostly lie between 0 and 100 with higher confidence represented by scores of near 100 and lower confidence being represented by near numbers near 0. There is no panacea that may be applied to all factors. Each factor needs to be examined on its own merit and its score should be transformed into some form of a confidence score. The final fusion score, representing the results of the total multifactor authentication is produced using a statistical technique such as weighted averaging to combine the individual factors, weighted mostly based on their effectiveness and relevance to the authentication problem. The fusion scores (115) of FIG. 22 are such scores.

1.6 Biometric Liveness Challenge

The liveness challenge in the case of speaker recognition is described in Section 1.3.1.2. However, the liveness challenge does not necessarily have to be done using this speaker liveness challenge. It may be done using other sensory communication and media. For example, this can be the reading of a displayed random prompt, a valid response to a displayed random question, a facial or hand gesture such as the blinking of a specific eye, a number of times, or the performance of a hand or body gesture such as the snapping of a finger, holding up a number of fingers with a requested orientation, the turning of the face in a special way instructed by the application. Another possibility is to use an online signature for assessing liveness. In this scenario, the person being authenticated would use a pen, as described in U.S. Pat. No. 7,474,770 B2 [4] and provide an online signature. Since an online signature has to be provided using a tablet, it will ensure liveness of the individual performing the authentication. The online signature in this case plays two roles. The first role is as one of the biometrics listed in the multimodal biometrics being tested and the second role is the proof of liveness since the data needs to be provided using a pen and a tablet and is not readily spoofable as audiovisual, fingerprint and other media. This is partly due to the fact online signature verification needs to replicate the dynamics of the signature such as velocity, acceleration, pressure, etc. and not just the shape of the signature.

2 Transaction and Data Security and Integrity

In order to ensure that the data kept on the device and on the servers associated with the transaction do not lose their integrity and all transactions are secure, a unique methodology is presented here, which provides assurance that all the data and models associated with the biometrics, as well as the software being utilized to run the authentication and the transactions are unchanged and authentic. It also ensures that a transaction authority may trust the multifactor authentication being done on a device which is held by the person being authenticated. This trust is essential to allow for the authentication to be done locally on the device being used by the user, or an independent device which is not owned or controlled by the transaction authority. In all, the communication, storage, and processing of transactions among the following modules: data capture, authentication, point of service, transaction authority, and certificate authority are made secure and trustworthy by the process presented in this invention.

2.1 The Enrollment and/or Registration Stage

When the phone is registered (or at some later time), the owner of the device does a biometric enrollment and the model/models is/are built and stored on the device. These models are generally representations of the features of the specific biometric of interest. Most biometric models do not store the actual features of the biometric. The models are usually statistical parameters and other function representations of the features captured at the enrollment process combined with statistical or function of features of some larger training sample from the biometric vendor. [6], herein incorporated by reference in its entirety, provides an overview of biometric models as well as a detail treatment of speaker recognition as a biometric.

The initial enrollment may need to be verified by a third party using a Public Key Infrastructure (PKI) such as the X.509 standard being used by most Internet applications and prescribed in detail in the ITU-T RFC 5280 [37]. The noted third party may be a certificate authority, such as those which exist for issuing secure certificates, or may be another trusted institution, such as the service provider, a bank or a notary. The enrollment may be certified using a secure key such as the digital certificate which is signed by an SSL certificate authority. It makes sense for this to be done by the Cellular telephone vendor who makes the sale or by his/her organization. See the Encryption and Key exchange section.

Once the biometric enrollment is completed, the models for doing a biometric challenge are ready to enable the biometric authentication services on the phone.

At this point, account information may be linked to the device/user through registration with a transaction authority FIG. 14 The difference between this step and the actual transaction is that it allows for tailoring the multifactor authentication for the particular device/user in order to dictate the strength of the authentication. This strength may be varied for different user-transaction combinations. Each security level may have a special digital certificate associated with it and at the time of usage, the transaction authority may request different levels of security (different credentials). For example, consider a MasterCard account and access as a country's passport. The financial institution issuing the MasterCard, will conduct an Authentication as listed in the Authentication Procedure step and then will issue a secure certificate in the form of a key to the phone which will be saved by the telephone and associated with that account. The passport office will do the same, generating a passport certificate. The credentials for obtaining these keys may be less or more stringent depending on the security level. The level of security is inherent in the certificate which is issued.

At this stage, the biometric enrollment and account linking is done. Let us assume that there is a MasterCard account certificate issued by bank A and saved on the device, the person's passport is linked with the phone and the employer of the individual has linked in an account for accessing the office building and special parts of the company which require restricted access.

Note that all the information is being stored in the form of encrypted keys in the phone and each key may only be deciphered by the issuing authority who has the related private key used at the time of conducting the transaction. This is in contrast with holding the information on a server or servers which would have to be distributed. A server-based solution is not viable since it requires constant communication with the place where the information is stored and may be fooled to release the information to unauthorized devices. In the situation described here, once the linking is done, the possession of the device holding the keys also becomes important.

For every account which is linked, a minimum requirement of the available authentication methods is picked. The authorizing institution sets the minimum requirements at the setup and the owner of the PDA may add extra authentication methods to apply more security. Each linked account may be set up to require a different combination of authentication methods. N.B., see authentication methods for more information.

2.2 The Transaction

The transaction may be any process requiring authentication such as a physical access control scenario such as a passport, an account access scenario using the Internet or a telephone network, etc. The following sales transaction is used to simplify the understanding of the process.

1. The PDA is set to accept transactions by the owner at the time of conducting the transaction. We will call this the "ready mode."
2. The point of sale terminal (Cashier machine) discovers all the PDAs in ready mode. This discovery process may be done in one or more of many different possible methods, such as Bluetooth, Near-Field Communication (NFC), and Infrared Data Association (IrDA) discovery standards as well as the many wireless standards.
3. Photo of the PDA owner (or his/her name or ID) appears on the cashier's screen.
4. The cashier picks the correct person's PDA from the list and the two machines (PDA and Cashier) are linked.
5. The linking may be done on any network including a Bluetooth, IrDa, WiFi, Near Field Communication device (NFC), or WAN.
6. The PDA owner receives notification for the transaction plus the challenge information.
7. The customer picks a payment method from his PDA's linked accounts.
8. The payment method triggers a combination of challenges based on requirements which have been set in the set up stage by the PDA owner and the authorizing entity (e.g. the bank administering the credit card, the company allowing access to its premises, the passport agency, etc.).
9. In the communication, the cashier checks for the certificate key which has been linked with the transaction much in the same way that TLS and SSL work and check for the validity of the certificate. The cashier checks for the validity of the certificate of the customer through a network with the authorizing agency (much in the same way as a credit card purchase is checked today). The certificate may be revoked at any time, at which instance, the transaction will fail.

10. Challenges happen on the PDA and the results reported to the cashier.

2.3 The Authentication Procedure

The authentication process may check for the validity of the subscriber ID with an authority. Note that the authenticity of the subscriber ID has been validated by the validation process (Section 2.5) and should only be checked by some transaction authority for validity.

Based on the second authentication factor (something one knows), a challenge request may initiated by the point of service. This item may be designed to work seamlessly with a biometric challenge (see Speaker Recognition [6] for example) or it may be entered using the keypad or any other data entry device, such as picking from a list of images, etc.

The authentication also includes one or more biometric challenges [6]. This item has been described below in detail, beginning in Section 1.3.

2.4 Registration with the Certificate Authorities

FIG. 6 shows the primary process in the encryption, validation, and registration of the authentication elements with the Certificate Authorities. In the figure, $Y_i = H_i(X_i)$: $i \in \{0, 1, \ldots, N, N+1\}$ denotes a hashing function [5]. $i=0$ relates to the hashing function for the subscriber ID, S, $i=n: n \in \{1, 2, \ldots, N\}$ relates to the hashing functions which are used to hash the biometric models (prototypes), $B_n$: $n \in \{1, 2, \ldots, N\}$, and $i=N+1$ relates to the hashing function for the code signing certificate of the client software, $C_S$. Technically, it not necessary for these functions to be different, however, the most general case would call for different functions. Also, it is possible for the hashing function to be trivial and just be the identity function given by Equation 1.

$$Y = I(X) \triangleq I(X) = H(X) : H(X) = X \quad (1)$$

The output of the hash function (Also called a Digest) is a string of binary digits called the hash of X, H(X). Non-trivial (non-identity) hashing functions come in a number of varieties, such as checksums, keyed cryptographic hash functions, and keyless cryptographic hash functions. Some popular hash functions are keyless, such as MD5, MD6, SHA-256, SHA-512, etc. Some keyed hash functions are message authentication codes such as UMAC, VMAC, and One-key MAC.

The following definitions are used to describe the digital signature of the information which is stored on the device to ensure the authenticity of the authentication references.

$$X_i \triangleq \text{Authentication Reference } \forall i \in \{0, 1, \ldots, N, N+1\} \quad (2)$$

where $X_0 = S$, $X_n = B_n$ $\forall n \in \{1, 2, \ldots, N\}$, and $X_{N+1} = C_S$. The authentication reference is also referred to as reference data herein.

$Y_i$ denotes the output of the hash function applied on the authentication reference, $X_i$, $$Y_i \triangleq H_i(X_i) \forall i \in \{0, 1, \ldots, N, N+1\} \quad (3)$$

Assuming that there is a certificate authority [37],[5] who is used to sign the references, we denote that authority by CA and the private and public keys of that authority, as defined by the X.509 standard [37] for the Public Key Infrastructure (PKI) are denoted by the following two variables respectively, $$R_{CA} \triangleq \text{Private key of the } CA \quad (4)$$

$$P_{CA} \triangleq \text{Public key of the } CA \quad (5)$$

In the same way as in the case of the certificate authority discussed previously, there will be a private and public key pair which are generated on the PDA at the time of the registration, using the registration application. This pair of keys is denoted by the following two variables, $$B_{PDA} \triangleq \text{Private key of the Device} \quad (6)$$

$$P_{PDA} \triangleq \text{Public key of the Device} \quad (7)$$

We need to define two functions which denote the encryption and decryption of some data. These functions are defined as follows, using any encryption technique which may be desirable. Many such techniques are given by the X.509 standard [37] and a lot more are explained in detail in [5].

$$Z = E(R, Y) \triangleq \text{Encryption function for Private key } R \text{ and data } Y \quad (8)$$

$$D(P, Z): D(P, Z) = Y (\text{Decryption function}) \quad (9)$$

where $$Z_i \triangleq E(R, Y_i) \forall i \in \{0, 1, \ldots, N, N+1\} \quad (10)$$

FIG. 7 shows the generic encryption and decryption of the hashed data.

FIG. 8 shows the signature process using the above definitions. It is important to note that the Certificate Authority (CA) never sees the raw subscriber ID, S, the biometric models, $B_n$, or the signed software certificate, $C_S$, unless the hash function is taken to be the identity function. Note that $C_S$ may have been signed through an independent certification, or the binary of the software may be hashed directly by the software itself. We are using CS here to mean either the signed certificate due to a code signing process described in Section 2.7, or the digest or hash value of that certificate. The CA only receives an encrypted copy of the hashed data for each i, $Z_i$. It also receives the public encryption key of the registration application on the device, $P_{PDA}$, such that it can decrypt the data and see the hashed data, $Y_i$. In addition, the credentials of the registration application are sent along much in the same way as a digital certificate is requested from the CA described in X.509. The credentials are used by the CA to decide if it should sign the hashed data for the device or not. We do not go into any detail about that since it is a well-established process and different CAs have different procedures for that. Then the CA uses its private key, $R_{CA}$, which is unknown to the PDA, to encrypt (sign) the hashed data, $Y_i$. This signed data, $A_i$: $i \in \{0, 1, \ldots, N, N+1\}$, is then sent back to the registration application on the PDA, along with the public key of the CA, $P_{CA}$. $P_{CA}$ is the certificate which is used by the PDA authentication applications in order to be able to decrypt the signed version of the hashed data, $A_i$, in order to get a certified copy of the hashed reference, $Y_i^{CA}$. Superscript CA means that this is the certified hash value of the reference data, $X_i$.

The signed hashed values, $A_i$, and the public key of the CA, $P_{CA}$, are stored in the persistent memory of the device shown in FIG. 2.

2.5 Validation of Reference Data

FIG. 11 shows the validation process for the reference data. At the time of each transaction where authentication is necessary, this process of validation takes place. The data is retrieved from the persistent memory of the device and is decrypted to get the signed hash values of the different reference data. Then the original reference data is retrieved by the authentication application from the persistent memory of the device and is hashed in the same manner as it was done in the hashing step of the registration defined in Section 2.4. These two sets of hash values are then compare as prescribed by FIG. 11 to see if they match. If they match, the multifactor authentication process will begin, described, beginning in Section 2.3 and shown in FIG. 16, FIG. 17, FIG. 18, and FIG. 19 depending on the scenario at hand. In this authentication process, as described, the subscriber ID, multiple biometrics, and multiple types of challenges are used to do the final multifactor authentication of the individual, the device, and transaction.

2.6 Multiple CA Signatures

For more security conscious applications, it is possible to have multiple CAs sign the hash values. This may be done either in parallel or in series. For a series process, the hash values are sent to CA1. Then the resulting signed data from CA1, $A_i^1$ is sent to CA2 to receive $A_i^2$, and so on. Finally, there will be an encrypted data with a series of M public keys associated with the M different CAs. In this case, the registration application will store the order of signatures, O, in an encrypted file, using $R_{PDA}$ and stored in the persistent memory of the PDA, along with $A_i^M$ from the last (Mth) CA, and all M public keys, $P_{CA}^m$:$m \in \{1, 2, \ldots, M\}$.

At the time of validating a data signed by a series of CAs, the authentication application will decrypt the order data, O, from the persistent memory using $P_{PDA}$ and uses it to decrypt the series of encryptions in the reverse order, using $A_i^m$ and $P_{CA}^M$ to get $A_i^{M-1}$ and so on until $Y_i^{CA}$ is deciphered. See FIG. 12. The procedure of validation and authentication will then continue as prescribed in Section 2.5.

For a parallel signature process, each CA signs the same $Y_i$ independently. In this case, all $A_i^M$, $P_{CA}^M$:$m \in \{1, 2, \ldots, M\}$ are stored. No specific order is necessary. At the validation step, all the hash values deciphered from the $A^m$ and from the reference data would have to match. See FIG. 13.

The multiple signature process may be used to store the different signed hash values at different locations. For example, if the device has access to network storage in L locations, it may send each of L signed hash values by L different CAs to these L locations, one of which is the persistent memory of the PDA. Then at the authentication step, it may try to retrieve as many copies of these hashed values as possible. If because of network or technical issues some of the L locations are not accessible, it can use down to a minimum prescribed number of different retrieved signed copies as it can. Then if the prescribed minimum locations is met and if all the hash values match with the data on the PDA, the device may go ahead with the authentication process.

2.7 Software Authenticity

It is important to ensure that the applications in charge of the registration and authentication are genuine and certified. This may be done using standard digital certificates which have been described in detail in [5]. Specifically, a code signing technique (see [38]) may be used to ensure that the code being run is authentic and that it has not been tempered with. Most modern operating systems are equipped with code signature verification. This is especially true with mobile operating systems. FIG. 9 and FIG. 10 show the signing and verification processes for the binary application code. Code signing may be used for the application interface, the authentication service, and all other libraries which are used by this authentication system to ensure that the code is genuine. This may be done on the client side, as well as the server side, when the authentication software is distributed across a client machine, such as a PDA, and a server.

In order to prove the authenticity of the application, being used for authentication, to the transaction authority, the application hashes the certificate associated with its code signature (as described previously), using a hashing function, $H_i$, and sends its encrypted value to the transaction authority when it registers with the transaction authority (see the registration procedure of Section 2.8). To perform this encryption, the application will use the private key that it uses in performing the registration step of Section 2.8, $R_{PDA}$. This information is kept on file at the transaction authority ($C_{PDA}$) along with the other information such as its private key and send it to the POS or transaction authority at the beginning of all communication. Since the transaction authority also stores the public key associated with the device, $P_{PDA}$, at the time of registration (see the registration procedure of Section 2.8), the transaction authority has is capable of decrypting the hash value of the software certificate. Upon every transaction, the software will recompute this value and send it to the transaction authority which will compare it against the data on file and ensures the authenticity of the authentication software running on the PDA. Therefore, the transaction authority can rest assured that the authentication results received from the PDA are sent by the original authentication software and that the software has not been fraudulently spoofed.

2.8 Registration with the Transaction Authorities

A transaction authority (TA) 76 is any authority which has control over the transaction of interest. For example, this may be a credit card company for charge transactions, a financial institution for performing a financial transaction, an office authority for providing access to a building, a government organization for providing passport access, an airport or any other transportation authority for allowing entrance credentials to a terminal, a bank for allowing access to a vault, etc.

In FIG. 14, a PDA and a person 70 would initially have to be registered with a transaction authority 76, in order to be able to conduct a transaction at a later time. The following communication and processes take place between the PDA and the TA in order to have the PDA registered. At the PDA, the PDA performs the following:

1. Validate Reference Data—See Section 2.5.
2. Create $R_{PDA}$ and $P_{PDA}^T$, which are the private and public keys in the PKI encryption key pair described in Section 2.4. These keys are generated by the PDA specifically for communication with this specific transaction authority, TA.
3. Store the keys and send the public key $P_{PDA}^T$, to the TA so that it may use this key for decrypting messages from the PDA.
4. Receive and store a public key from the TA, $P_{TA}$, which has been specifically created by the TA for communication with this PDA. Also, receive and store an account identifier, $ACC_{TA}$, which will be used by the TA in the future to retrieve information related to this registration.

On the other side, the TA will perform the following:

5. Receive the public key generated by the PDA, $P_{PDA}^T$ for use the TA, such the TA may decrypt messages from this PDA.
6. Authenticate the use using a multifactor authentication plus a challenge-response session to provide a three-factor authentication.
7. Create a pair of PKI keys, $R_{TA}$ (private key) and $P_{TA}$ (public key) for the purpose of sending private messages to the PDA.

8. Store $R_{TA}$ and $P_{TA}$.
9. Send $P_{TA}$ and a generated account ID, $ACC_{TA}$, to the PDA. $ACC_{TA}$ is a record locator which will allow the retrieval of the data stored on the storage device of the TA 78.

2.9 A Generic Transaction Involving a POS and a TA

A Point of Service 74 is any party which would provide a sale or a service. Some examples have been provided as a Point of Sale merchant (FIGS. 15 and 16), an electronic commerce process (FIG. 17), an access control system such as the door to an office (FIG. 18), and another access transaction where the transaction is to access a vault (FIG. 19). In the generic scenario, the three parties, PDA, POS, and TA perform the following respectively.

The PDA will perform the following actions:
1. Validate the reference data by performing the actions described in Section 2.5.
2. Perform the biometric challenge in Section 2.3 and the challenge response of the POS for further authentication and a liveness test.
3. Receive the transaction and sign it using $R_{PDA}^{T}$, which was stored on the PDA storage device 72 at the registration step.
4. Send Signed Transaction along with the $ACC_{TA}$ which was stored at the registration stage to the POS.
5. Receive encrypted receipt which is forwarded to the PDA by the POS from the TA.
6. Decrypt the receipt using $P_{TA}$ which was stored on the storage device of the PDA at the TA registration process.

The POS will perform the following actions:
1. Authenticate the PDA/user by the three factor authentication involving steps one and two of Section 2.9.
2. Send transaction list to the PDA for signing.
3. Receive the signed transaction list and the $ACC_{TA}$ from the PDA.
4. Pass the signed transaction list and the $ACC_{TA}$ to the TA.
5. Receive confirmation for the transaction.
6. Pass encrypted receipt from the TA to the PDA.

The TA will perform the following actions:
1. Receive the $ACC_{TA}$ for the PDA, which has been passed along by the POS.
2. Use $ACC_{TA}$ to retrieve the PDA record from the storage device 78.
3. Decrypt the signed transaction list using $P_{PDA}$
4. Verify the account and perform transaction.
5. Send transaction confirmation to the POS.
6. Encrypt receipt for the PDA using $R_{TA}$.
7. Send encrypted receipt to POS so that it may be forwarded to the PDA.

3 Databases

There are several databases which are kept across the different components of the system (FIG. 5). Some examples of these databases are given in FIG. 38, FIG. 39, FIG. 40, and FIG. 41). Depending on how the components of the system are distributed, the databases will have components in different locations. Some data may have to be shared across components, or even duplicated, depending on the access and network capabilities of each component to the data. The data in all cases are encrypted and in the case of biometric models, subscriber ID, software certificate they are hashed and their digest is signed by a certificate authority to ensure authenticity. The signing of certificates should be practiced to the level that any database breaches would not change the integrity of the authentication and would only have superficial side effects.

4 Applications

4.1 Different Configurations

The applications using the combination of multifactor authentication and transaction/data security/integrity may have the following different forms:

1. Standalone (Authentication, Storage, and Transaction Authority are all on the device)—In this case the application, the databases, the models, and any sensitive data are on the device itself. The multifactor authentication and security system enable the use to either access sensitive data on the device or run specific secure applications on the device which in turn may perform different operations. Some examples of such a system would be: Medical records storage and sharing, financial records storage and sharing, Home Automation Control, Simple access control systems such as automobile ignition and control, home-entry, etc.
2. Authentication and authentication databases are on the device, but the Transaction Authority is remote. In this case, the transaction authority may take on many forms. It may be an access control authority, including physical access, virtual access, or access to sensitive data. In this case, since the authentication and authentication database are on the device, the transaction authority needs to be assured of the authenticity of the software, the biometric models, and all other data being used to authenticate the user. This is where the security process, described in Section 2 becomes essential.
3. Authentication, authentication databases, and the transaction authority are remote. The device is only being used to capture the data for the multifactor authentication and its specific identity (such as UUID, SIM, IP, etc.) is used as the first factor described in Section 1.1. In this case, since the device is used for capturing the data, it is important to use the security measures starting from Section 2 to ensure that the software being used for capturing the data and any identity it passes to the authentication server are genuine and have not been tampered with. An example is the spoofing of the specific ID of the device such as the subscriber ID, etc.
4. The transaction authority is on the device, but the authentication and authentication databases are remote. The device is also used to capture the data for the multifactor authentication and its specific identity (such as UUID, SIM, IP, etc.) is used as the first factor described in Section 1.1. An example is access to sensitive data on the device or running secure applications on the device, where the authentication capabilities are served on remote servers. This may be due to the usage of public authentication databases such as a company's employee roster, passport services, etc. Also, the multifactor authentication services may be elaborate enough that they may not be able to run on the device. In this case also, the security safeguards described in Section 2 are of high importance. The software which is capturing the information and the subscriber ID among other things must be assured to be genuine.

The following few sections describe different kinds of applications which are proposed to be used with the multifactor authentication and transaction and data security and integrity processes described in this invention.

4.2 Point of Entry Access Control

FIG. 31 shows a button which would be available at the point of entry. Once the button is depressed, the authentication process will begin. This process is described in Section 4.2. Another possible embodiment for starting the authentication process would use the camera to detect a face. Once a reliable face has been detected by the camera, the software may automatically proceed to the next stage, described in Section 4.2.

4.2.1 Access Denied Status

The default status of the Access Control system is a denied status. Logically, the default is to deny access unless the authentication criteria are met. This is really the starting moment of the access control process, right after it has been initiated by depressing the access button or by the means of an audio or face detection scheme.

4.2.2 Access Control Operation

FIG. 29 shows one possible interface for the access control device. It allows for multifactor authentication such as a PIN, the identity of the device in the form of (Universally Unique Identifiers) UUID and/or IP address, and multimodal biometrics. In the case of this example, speaker and face biometrics are used. In addition, any other biometric listed in Section 1.3 may be used, given the presence of the pertinent sensor. The interface may also use speech recognition as described in Section 1.3.1.2. In this specific example, a random sentence is displayed from a large pool of sentences and the user is asked to read the sentence. Speech recognition is deployed to associate a score (e.g., may be a likelihood score) with whether the user has uttered the requested sentence. This score is then fused with the scores for the biometric matches according to the biometric challenge described in the Biometrics Challenge Section 1.3. The final score is then used to authenticate the user. A predefined threshold is used for making a hard binary decision of whether to authenticate user or not, based on where the score lies with respect to this threshold. This threshold and the comparison, take into account the relative score of the user against competing models as described in Sections 1.3.1.1 and 1.4.

At the beginning of the authentication process, one embodiment is depicted in FIG. 30, where a personal identification number (PIN) is used as a separate factor to reduce the chances of false acceptances and false rejections due to similarities in the biometric traits of the individual requesting access and the biometric models on file. In this embodiment, the PIN is used as a completely independent factor. Another embodiment would use the PIN to limit the number of biometric models (Section 4.2.4) to consider for matching the test sample (Section 4.2.3).

4.2.3 Test Sample

A test sample is data which is captured at the time a user is being authenticated.

4.2.4 Biometric model

A biometric model is generally a statistical or parametric representation of the traits of the individual for whom the biometric model is built. They are generally in the form of mixtures of distributions, multidimensional vectors, or parametric representations. The specifics depend on the type of biometric at hand and the algorithm being used for producing the biometric model. For example, using a speaker model, for voice or speaker biometrics, if a Gaussian Mixture Model (GMM) method is used, the model may be a collection of multidimensional means and variance-covariance representations with corresponding mixture coefficients. Alternatively, for the same model, some systems may choose to only keep the mean vectors, by stacking them into a large supervector. A neural network model, though, may be stored as the set of weights and thresholds for the enrollment sample of that individual.

4.2.5 Multiple Match Access Control—by Count

In order to achieve high levels of security, an access system is proposed here in which one may set a requirement that a predetermined number of authorized individuals should be authenticated in series, in order to gain access to a physical or virtual location. Note that a virtual location may be access to sensitive data, a web portal, etc. In order to enable such authentication, one sets a maximum number of tests that will be done, through which a minimum number of people have to authenticate, in order to grant access. Each time there is a successful authentication, a counter (Figure component 87) is incremented by the authentication software. Once the minimum number of matches (Figure component 88) has been achieved, before getting to the maximum number of tests which are defined by the administration, access is granted to the group of people who have authenticated.

4.2.6 Multiple Match Access Control—by Access Level

Another methodology tests how well each match is done, or what rank of individuals have passed the authentication, the minimum changes. Here is an example to explain the technique. Let us assume that we have an organization where people have different access levels. For example, one person may be an administrator who should have the highest level of access. There is a regular worker who is considered to have the least level of access and there is a project manager who has an intermediate level of access. Therefore, there are three levels of access, administrator, project manager, and worker, listed in order, from high to low. We can require require fewer number of high level access holders than when lower level access individuals are present. For example we may assign a number to each access level. For the sake of simplicity let us assign 3 to administrator, 2 to project manager, and 1 to regular worker. This way, if we set the required access level to 6, the requirements may be met by having two administrators (2×3), one administrator, one project manager, and one worker (3+2+1), or two project managers and two workers (2×2+1×2).

Another technique would be the use of the authentication score in a formula that would require a minimum score for entrance. For example, a possible linear formula would be as follows:—We require a minimum score of 400. Let us assume that generally an excellent authentication score is considered to be 70 for each individual. Furthermore, let us assume that we are going to compute the total score as the weighted sum of the authentication scores weighted by the access level of each individual. Therefore, two administrators getting a score of 70 each, for the authentication, would contribute 420 (=2×(3×70)), which is enough to grant them access. Each of these people would not be given access though. However, let us assume that one of the administrators gets an authentication score of 40. Then the total weighted score would be 330 (=3×70+3×40), which is 70 points shy of obtaining access. In that case, a project manager obtaining an authentication of 50, will contribute 100 (=2×50) to the score and would bring the total score to 430, which allows access. Practically, there would be a minimum score and a maximum number of people set in the set up. The maximum number of people is set to avoid having a great many number of authentications with very low scores, which would naturally be a security breach.

4.2.7 Labeling a Door or a Portal

A specific portal may possess an RFID or NFC tag which may be read by the device and be used to address the said portal to be targeted by the Access Transaction authority. This means that when access is requested, being in the vicinity of a specific portal will enable the tag of that portal to be read and transmitted to the Access transaction authority to grant permission to that specific portal. This ID may undergo the same scrutiny that has been described in Section 3 in order to check whether the person or persons have access to that specific portal. If access privileges are established, the Access Transaction Authority may send a signal to that portal to grant access to the holder of the device being used.

4.3 The Communication (or Other Functionality) Restriction Problem and Solution

This proposed approach solves a problem which exists with the use of NFC and RFID tags. The proposed technique provides the mean to only enable NFC or RFID communication upon a successful multifactor authentication, as described in this invention. The motivation for this is the fact that for example in the case of NFC, currently some credit card companies are including NFC chips which constantly emit information about the credit card. There are shielding sleeves available for sale for RFID and NFC communication shielding to ensure that the credit card information or account information cannot be intercepted by thieves. The current invention can use the described authentication on the device, in order to enable its NFC or RFID communication only when the authentication is successful. In addition, NFC communication may be used to communicate with the POS or the transaction authority, where ever there is a communication stack. A similar scenario allows access to a specific part of restricted network which may provide secure data. This may be thought of as logging into a secure network which provides different restricted services such as the network of a University, a Hospital, etc. Much in the same way, this methodology may be used to enable or disable any other functionality on the device being used. Some examples are location services, Bluetooth communication, etc.

4.4 Home Automation

One application of the system described in this patent is to use the discussed infrastructure to remotely control the devices in one's home. For example, the POS and transaction authority may both reside on a computer or device that would be connected to the different appliances such as lights, toaster oven, air conditioning, etc. in a home. The device may be the smartphone being carried by the homeowner. The authentication service may either run on the smartphone or on the device at home. The multiple factors are captured on the smartphone and the command is also given on that device. The command is similar to a purchase request that was described in FIG. 16 or an access request in an access control problem. Once the authentication has been established, the request is granted by the transaction authority and the POS performs the task.

4.5 Health Care Records

Health care records have been recently converted to electronic formats. It is unclear who has these electronic records at the moment, but it makes sense that the patient (owner of the records) should own these records and should share them with the corresponding health care provider when the need arises. The access control being discussed by the application in Section 4.2 may also be realized in the form of access to restricted data or records such as access to medical or financial records. Using the techniques presented in the Transaction and Data Security and Integrity Section 2, the sensitive medical records may be safely hashed, signed for integrity by a CA, encrypted and saved on the device, belonging to the patient or owner of the data. Let us assume that the person holding the device of interest goes to a healthcare provider who draws some blood and sends the blood to a lab for examination. The results are sent back to the doctor who in turn shares them with the patient. Either the lab or the doctor who is in possession of the resulting digital data, many transfer them to the patient's device. In this process, the patient may ask the institution that has produced the data to sign the hashed version of the data for safe-keeping on the device, together with the original data which is encrypted and saved on the device, in the same way as a biometric models are saved and stored on the device, described in Section 2. Each of the new pieces of data (new medical record) is in this way saved to ensure its integrity. Using the multifactor authentication described in Section 1, any part of the medical records may be unlocked and shared through another pair of POS and transaction authority which would be the receiving health care provider requesting a copy of any part of these records in order to perform further healthcare services for the individual. This new POS/TA pair will be assured of the integrity of the data, since the data and the processing software have undergone the same process as described in Section 2. Each healthcare provider or service the healthcare provider uses (such as a health insurance provider) would have had occasion of registering the user and the software in the same manner as described in Section 2.

As an example, take the instance were the patient may need to see an internist who may need to review his/her latest blood test results, in which case the patient may unlock the data and transmit that part of the data to the doctor. In this scenario, the patient chooses what part of the data is shared with the doctor and the data is only shared with the patient's consent. Any other person gaining access to the personal device of the patient will not be able to access the data. Also, this allows for patients to carry their medical history with them at all time without having any concern with privacy issues. In fact, different parts of the data may be tagged with different security levels. As an example, if the patient is diabetic or has known severe allergies, he/she may choose to make the data associated with these items public so that in case he/she goes into a shock, the data is available to all individuals accessing his/her device. However, they will not have access to the rest of his/her medical history and details. The important enablement is that the patient makes a decision on what part of the data requires high security and what part does not.

4.6 Financial Records

Financial records may be treated in a similar manner as described by Section 4.5. In this case, the data providers will be the banks, credit report companies, or other financial institutions, holding securities or financial certificates for the user. Much in the same way as the health records, the financial date and holdings certificates may be stored and signed with a CA, to only be unlocked using the multifactor authentication and data security described in this invention. Once the financial records or certificates are unlocked, ownership may be transferred to a different user using a transaction authority which is a financial institution. This is also similar to the digital cash case described in Section 4.7.

4.7 Digital Cash

Similar techniques as discussed in Sections 4.6 and 4.5 may be used to store digital cash on a device, where the CA in this case would re-sign the remaining amount, every time a transaction takes place and an amount is removed or added from/to the remaining digital cash on the device. Only the user associated with the device is able to unlock the digital cash certificate using the multifactor authentication and data security described in this invention. At any point, a record-keeping read-only POS may be utilized on the device that would use a read-only amount assessment transaction authority on the device to provide the user with the amount of digital cash which is available on the device.

There have been described and illustrated herein several embodiments of a method and system that performs electronic transactions with a mobile device using multifactor authentication. While particular embodiments of the invention have been described, it is not intended that the invention be limited thereto, as it is intended that the invention be as broad in scope as the art will allow and that the specification be read likewise. Thus, while particular hashing functions and public key infrastructure systems have been disclosed, it will be appreciated that other hashing functions and key infrastructure systems can be used as well. In addition, while particular types of biometric models and biometric verification processes have been disclosed, it will be understood that other suitable biometric models and biometric verification processes can be used. Furthermore, while particular electronic transaction processing has been disclosed, it will be understood that other electronic transaction processing can be similarly used. It will therefore be appreciated by those skilled in the art that yet other modifications could be made to the provided invention without deviating from its spirit and scope as claimed.

REFERENCES

[1] "Practice note: Examples of financial services using mobile phones," World Wide Web, June 2011, http://www.ictregulationtoolkit.org/en/PracticeNote.3096.html.
[2] Anne Crotty, "Wizzit has done its homework, says mphahlele," World Wide Web, September 2005, http://www.nextbillion.net/archive/files/Wizzit %20Business %20Report.pdf.
[3] "The transformational potential of m-transactions," July 2007.
[4] Homayoon Beigi, "U.S. Pat. No. 7,474,770 b2," January 2009, Method and Apparatus for Aggressive Compression, Storage and Verification of the Dynamics of Handwritten Signature Signals, http://www.google.com/patents/US7474770.
[5] Henk C. A. van Tilborg and Sushil Jajodia, Encyclopedia of Cryptography and Security, Springer US, New York, 2nd edition, 2011, ISBN: 978-1-4419-5906-5.
[6] Homayoon Beigi, Fundamentals of Speaker Recognition, Springer, New York, 2011, ISBN: 978-0-387-77591-3, http://www.fundamentalsofspeakerrecognition.org.
[7] Krishna S. Nathan, Homayoon S. M. Beigi, Gregory J. Clary, Jayashree Subrahmonia, and Hiroshi Maruyama, "Real-Time On-Line Unconstrained Handwriting Recognition using Statistical Methods," in International Conference on Acoustics, Speech, and Signal Processing (ICASSP95), May 1995, vol. 4, pp. 2619-2622.
[8] Homayoon S. M. Beigi, "Pre-Processing the Dynamics of On-Line Handwriting Data, Feature Extraction and Recognition," in Progress in Handwriting Recognition, A. C. Downton and S. Impedovo, Eds., pp. 191-198. World Scientific Publishers, New Jersey, 1997, ISBN: 981-02-3084-2.
[9] Homayoon S. M. Beigi, "Character Prediction for On-line Handwriting Recognition," in Proceedings of the Canadian Conference on Electrical and Computer Engineering, September 1992, vol. II, pp. TM10.3.1-TM10.3.4.
[10] A. Fabate, M. Nappi, D. Riccio, and S. Ricciardi, "Ear recognition by means of a rotation invariant descriptor," in Pattern Recognition, 2006. ICPR 2006. 18th International Conference on, 2006, vol. 4, pp. 437-440.
[11] Masoud S. Nosrati, Karim Faez, and Farhad Faradji, "Using 2d wavelet and principal component analysis for personal identification based on 2d ear structure," in Intelligent and Advanced Systems, 2007. ICIAS 2007. International Conference on, November 2007, pp. 616-620.
[12] Hai-Jun Zhang, Zhi-Chun Mu, Wei Qu, Lei-Ming Liu, and Cheng-Yang Zhang, "A novel approach for ear recognition based on ica and rbf network," in Machine Learning and Cybernetics, 2005. Proceedings of 2005 International Conference on, August 2005, vol. 7, pp. 4511-4515.
[13] Li Yuan and Zhi Chun Mu, "Ear recognition based on 2d images," in Biometrics: Theory, Applications, and Systems, 2007. BTAS 2007. First IEEE International Conference on, September 2007, pp. 1-5.
[14] Hui Chen and B. Bhanu, "Human ear recognition in 3d," Pattern Analysis and Machine Intelligence, IEEE Transactions on, vol. 29, no. 4, pp. 718-737, April 2007.
[15] S. Cadavid and M. Abdel-Mottaleb, "Human identification based on 3d ear models," in Biometrics: Theory, Applications, and Systems, 2007. BTAS 2007. First IEEE International Conference on, September 2007, pp. 1-6.
[16] Zhiyuan Zhang and Heng Liu, "Multi-view ear recognition based on b-spline pose manifold construction," in Intelligent Control and Automation, 2008. WCICA 2008. 7th World Congress on, June 2008, pp. 2416-2421.
[17] Heng Liu and Jingqi Yan, "Multi-view ear shape feature extraction and reconstruction," in Signal-Image Technologies and Internet-Based System, 2007. SITIS '07. Third International IEEE Conference on, December 2007, pp. 652-658.
[18] A. H. M. Akkermans, T. A. M. Kevenaar, and D. W. E. Schobben, "Acoustic ear recognition for person identification," in Automatic Identification Advanced Technologies, 2005. Fourth IEEE Workshop on, October 2005, pp. 219-223.
[19] R. Brunelli and T. Poggio, "Face recognition: Features versus templates," IEEE Transactions on Pattern Analysis and Machine Intelligence, vol. 15, no. 10, pp. 1042-1052, October 1993.
[20] Stan Z. Li and Anil K. Jain, Eds., Handbook of Face Recognition, Springer, New York, 2005, ISBN: 978-0-387-40595-7.
[21] Shaohua Kevin Zhou, Rama Chellappa, and Wenyi Zhao, Unconstrained Face Recognition, vol. 5 of International Series on Biometrics, Springer, New York, 2008, ISBN: 978-0-387-26407-3.
[22] D. Maltoni, D. Maio, A. K. Jain, and S. Prabhakar, Handbook of Fingerprint Recognition, Springer, New York, 2003, ISBN: 978-0-387-95431-8.
[23] Khalid Saeed and Marcin Werdoni, "A new approach for hand-palm recognition," in Enhanced Methods in Computer Security, Biometric and Artificial Interlligence Systems, Lecture Notes in Computer Science, pp. 185-194. Springer, London, 2005, ISBN: 1-4020-7776-9.
[24] R. Sanchez-Reillo, C. Sanchez-Avila, and A. Gonzalez-Marcos, "Biometric identification through hand geometry measurements," IEEE Transactions on Pattern Analysis and Machine Intelligence, vol. 22, no. 10, pp. 1168-1171, October 2000.
[25] Li Ma, Tieniu Tan, Yunhong Wang, and Dexin Zhang, "Personal identification based on iris texture analysis," IEEE Transactions on Pattern Analysis and Machine Intelligence, vol. 25, no. 12, pp. 1519-1533, December 2003.

[26] H. Borgen, P. Bours, and S. D. Wolthusen, "Visible-spectrum biometric retina recognition," in International Conference on Intelligent Information Hiding and Multimedia Signal Processing (IIHMSP2008), August 2008, pp. 1056-1062.

[27] Andrea Selinger and Diego A. Socolinsky, "Appearance-based facial recognition using visible and thermal imagery: A comparative study," Computer Vision and Image Understanding, vol. 91, no. 1-2, pp. 72-114, July-August 2003.

[28] L. C. F. Araujo, Jr. Sucupira, L. H. R., M. G. Lizarraga, L. L. Ling, and J. B. T. Yabu-Uti, "User authentication through typing biometrics features," Signal Processing, IEEE Transactions on [see also Acoustics, Speech, and Signal Processing, IEEE Transactions on], vol. 53, no. 2, pp. 851-855, February 2005.

[29] G. L. F. Azevedo, G. D. C. Cavalcanti, and E. C. B. Filho, "An approach to feature selection for keystroke dynamics systems based on pso and feature weighting," in Evolutionary Computation, 2007. CEC 2007. IEEE Congress on, September 2007, pp. 3577-3584.

[30] N. Bartlow and B. Cukic, "Evaluating the reliability of credential hardening through keystroke dynamics," in Software Reliability Engineering, 2006. ISSRE '06. 17th International Symposium on, November 2006, pp. 117-126.

[31] S. Bleha, C. Slivinsky, and B. Hussien, "Computer-access security systems using keystroke dynamics," Pattern Analysis and Machine Intelligence, IEEE Transactions on, vol. 12, no. 12, pp. 1217-1222, December 1990.

[32] J. Hu, D. Gingrich, and A. Sentosa, "A k-nearest neighbor approach for user authentication through biometric keystroke dynamics," in Communications, 2008. ICC '08. IEEE International Conference on, May 2008, pp. 1556-1560.

[33] C. BenAbdelkader, R. Cutler, and L. Davis, "Stride and cadence as a biometric in automatic person identification and verification," in Automatic Face and Gesture Recognition, 2002. Proceedings. Fifth IEEE International Conference on, May 2002, pp. 372-377.

[34] "Emotiv epoc+," WWW, 2015, https://emotiv.com.

[35] Y. M. Chi and G. Cauwenberghs, "Wireless non-contact eeg/ecg electrodes for body sensor networks," in Proceedings of the International Conference on Body Sensor Networks (BSN), June 2010, pp. 297-301.

[36] Homayoon S. M. Beigi, "U.S. Pat. No. 6,684,186," January 2004, Speaker Recognition using a Hierarchical Speaker Model Tree, http://www.google.com/patents/US6684186.

[37] D. Cooper, S. Santesson, S. Farrell, S. Boeyen, R. Housley, and W. Polk, "Internet X.509 Public Key Infrastructure Certificate and Certificate Revocation List (CRL) Profile," RFC 5280 (Proposed Standard), May 2008.

[38] Eric Fleischman, "Code signing," The Internet Protocol Journal, pp. 14-26, March 2002, available at http://www.cisco.com/web/about/ac123/ac147/archived issues/ipj 5-1/ipj 5-1.pdf.

What is claimed is:

1. A method for transaction authentication involving a user of a computing device owned or possessed by the user, the method comprising:
   a) storing at least one device identifier for the computing device owned or possessed by the user;
   b) storing a fact known by the user;
   c) storing biometric data of the user; and
   d) authenticating the user for a transaction involving the computing device owned or possessed by the user by:
      i) determining that at least one device identifier of the computing device owned or possessed by the user corresponds to the at least one device identifier stored in a);
      ii) determining that the user exhibits knowledge of the fact stored in b);
      iii) determining that the user satisfies at least one biometric challenge based upon the biometric data stored in c); and
      iv) determining that the user satisfies at least one liveness challenge which involves 1) presenting a random prompt or question to the user where the random prompt or question is organized such that it can be answered by a live person and not by a machine and 2) recognizing a valid response generated by a live person in response to a random prompt or question.

2. The method of claim 1, wherein:
the at least one biometric challenge of iii) comprises a multimodal biometric challenge.

3. The method of claim 1, wherein:
the valid response of iv) befits the random question or prompt.

4. The method of claim 3, wherein:
the at least one device identifier stored in a) is selected from the group consisting of a unique identifier (UUID), IP address, MAC address, subscriber identifier, caller ID, radio-frequency ID (RFID), near field communication (NFC) ID, Bluetooth ID, CPU information, OS information, and a random sequence.

5. The method of claim 1, wherein:
the fact stored in b) comprises at least one of a passcode, a PIN, and a keyword or phrase.

6. The method of claim 1, wherein:
the biometric data of the user stored in c) comprises a biometric model of the user, and the at least one biometric challenge of iii) involves obtaining at least one biometric test sample of the user and processing the at least one biometric test sample in conjunction with the stored biometric model of the user in order to determine whether the at least one biometric test sample matches the stored biometric model of the user.

7. The method of claim 6, further comprising:
comparing the at least one biometric test sample of the user to the stored biometric model of the user in order to determine whether the at least one biometric test sample matches the stored biometric model of the user.

8. The method of claim 6, further comprising:
using the at least one biometric test sample of the user to derive a test biometric model, and
comparing the test biometric model to the stored biometric model of the user in order to determine whether the at least one biometric test sample matches the stored biometric model of the user.

9. The method of claim 6, wherein:
the at least one biometric test sample of the user is also used as part of the determining of ii) and/or the determining of iv).

10. The method of claim 6, wherein:
the biometric test sample of the user and the stored biometric model of the user involves at least one of speaker recognition, image-based or audio-based ear recognition, face recognition, fingerprint recognition, palm recognition, hand-geometry recognition, iris recognition, retinal scan, thermographic image recognition, vein recognition, signature verification, keystroke dynamics recognition, and brain wave recognition using a brain-computer interface (BCI).

11. The method of claim 6, further comprising:
comparing distance between the at least one biometric test sample and the biometric model of the user with distance between the at least one biometric test sample and at least one competing model in order to determine whether the at least one biometric test sample matches the stored biometric model of the user.

12. The method of claim 11, wherein:
the least one competing model comprises a plurality of biometric models of user clusters.

13. The method of claim 1, wherein:
the valid response of iv) comprises at least one of I) an answer that befits a random question, II) speech uttered by reading a displayed random prompt, III) a facial gesture, IV) a hand gesture or handwriting that befits a random prompt, v) non-speech audio or body response (such as whistling, tapping, clapping, gait or pose) that befits a random prompt, and VI) brainwave activity that befits a random prompt.

14. The method of claim 1, wherein:
the computing device is one of a mobile computing device and a stationary computing device.

15. The method of claim 1, further comprising:
selectively processing the transaction of d) based on the results of the determinations of i), ii), iii) and iv).

16. The method of claim 15, further comprising:
generating a plurality of scores for two or more of the determination of i), ii), iii) and iv);
combining the plurality of scores to derive a resultant score; and
comparing the resultant score to a threshold in order to authenticate the user and selectively process the transaction.

17. The method of claim 15, further comprising:
employing the determinations of i), ii), iii) and iv) for a number of users in series in order to authenticate the number of users and selectively process the transaction for the number of users.

18. The method of claim 15, wherein:
the processing of the transaction involves granting at least one user access to a physical location.

19. The method of claim 18, wherein:
granting the at least one user access to a physical location includes unlocking a door.

20. The method of claim 15, wherein:
the processing of the transaction involves granting at least one user access to data and/or applications stored locally on the computing device or data and/or applications stored remotely from the computing device.

21. The method of claim 20, wherein:
the processing of the transaction involves granting at least one user access to data and/or applications stored locally on the computing device that includes personal records of the user stored on the computing device.

22. The method of claim 21, wherein:
the personal records of the user include data selected from personal health data of the user and personal financial data of the user.

23. The method of claim 20, wherein:
the processing of the transaction involves granting at least one user access to data and/or applications stored locally on the computing device that includes digital cash of the user stored on the computing device.

24. The method of claim 20, wherein:
the processing of the transaction involves granting at least one user access to data and/or applications stored remotely from the computing device for remote home automation control.

25. The method of claim 1, wherein:
the determinations of i)-iv) employ software stored on the computing device and at least the determination of iii) involves at least one biometric model of the user stored in encrypted form on the computing device in c), wherein authenticity of at least one of the software stored on the computing device and the at least one biometric model is verified through exchange of information with a certificate authority.

26. The method of claim 25, wherein the verification of authenticity of at least one of the software stored on the computing device and the at least one biometric model involves:
(A) at the computing device, utilizing a predetermined hash function to generate at least one hash value $Y_i$ and encrypting the at least one hash value $Y_i$ to generate a corresponding at least one encrypted hash value $Z_i$ for communication to at least one certificate authority;
(B) at the at least one certificate authority, decrypting the at least one encrypted hash value $Z_i$ to reconstruct said at least one hash value $Y_i$ and encrypting the at least one reconstructed hash value $Y_i$ to generate a corresponding at least one encrypted hash value $A_i$ for persistent storage at the at least one certificate authority and communication back to the computing device; and
(C) at the computing device, performing a validation that
  (1) decrypts the at least one encrypted hash value $A_i$ communicated from the at least one certificate authority to derive a corresponding at least one hash value $Y_i^{CA}$
  (2) utilizes the predetermined hash function to generate at least one hash value $Y_i$, and
  (3) compares the at least one hash values $Y_i^{CA}$ derived in (C)(1) and the corresponding at least one hash value $Y_i$ derived in (C)(2) to determine if said hash values match one another.

27. The method of claim 26, wherein:
the at least one hash value Y1 generated by the computing device in (A) and (C)(2) are based on the software stored on the computing device, the at least one biometric model, or both.

28. The method of claim 26, wherein:
the user and the computing device are assigned a first public key and private key pair ($P_{PDA}$, $R_{PDA}$) for use in conjunction with registration with the at least one certificate authority;
the computing device uses the private key $R_{PDA}$ to generate the at least one encrypted hash value $Z_i$ in (A); and
the at least one certificate authority uses the public key $P_{PDA}$ to decrypt the at least one encrypted hash value $Z_i$ to reconstruct said at least one hash value $Y_i$ in (B).

29. The method of claim 28, wherein:
a respective certificate authority is assigned a respective second public key and private key pair ($P_{CA}$, $R_{CA}$) for use in conjunction with registration with the user and the computing device;
the respective certificate authority uses the private key $R_{CA}$ to generate the at least one encrypted hash value $A_i$ in (B); and
the computing device uses the public key $P_{CA}$ to decrypt the at least one encrypted hash value $A_i$ to reconstruct said at least one hash value $Y_i$ in (C).

30. The method of claim 26, wherein:
the at least one hash value $Y_i$ comprises a plurality of hash values;
the at least one encrypted hash value $Z_i$ comprises a plurality of encrypted hash values;
the at least one encrypted hash value $A_i$ comprises a plurality of encrypted hash values; and
the operations of (B) are carried out over a plurality of certificate authorities that decrypt the plurality of encrypted hash values $Z_i$.

31. The method of claim 30, wherein:
the operations of (B) generate the plurality of encrypted hash values $A_i$ in a serial order over the plurality of certificate authorities; and
the operations of (C)(1) decrypt the plurality of encrypted hash values $A_i$ in a reverse serial order with respect to the serial order.

32. The method of claim 31, wherein:
the operations of (B) generate the plurality of encrypted hash values $A_i$ in a parallel manner over the plurality of certificate authorities; and
the operations of (C)(1) decrypt the plurality of encrypted hash values $A_i$ in a parallel manner.

33. The method of claim 30, wherein:
the plurality of encrypted hash values $A_i$ is persistently stored in a distributed manner over a plurality of network storage locations.

34. The method of claim 33, wherein:
the plurality of network storage locations is maintained by the plurality of certificate authorities.

35. The method of claim 1, further comprising:
obtaining at least one biometric test sample of the user, and
using the at least one biometric test sample of the user as part of the determining of ii) and the determining of iii).

36. The method of claim 1, further comprising:
obtaining at least one biometric test sample of the user, and
using the at least one biometric test sample of the user as part of the determining of iii) and the determining of iv).

37. A method of controlling access to a physical location by operation of a computing device by a user whose execution provides a physical access control interface, the method comprising:
a) storing a fact known by the user;
b) storing biometric data of the user; and
c) configuring the physical access control interface to selectively grant access to the physical location based on a number of operations, including
    i) determining that the user exhibits knowledge of the fact stored in a);
    ii) determining that the user satisfies at least one biometric challenge based upon the biometric data stored in b); and
    iii) determining that the user satisfies at least one liveness challenge which involves 1) presenting a random prompt or question to the user where the random prompt or question is organized such that it can be answered by a live person and not by a machine and 2) recognizing a valid response generated by a live person in response to a random prompt or question.

38. The method of claim 37, further comprising:
determining whether the user of the physical access control interface belongs to a class of enrolled users that is permitted access to a physical location.

39. The method of claim 37, wherein:
the at least one biometric challenge of ii) comprises a multimodal biometric challenge.

40. The method of claim 37, wherein:
selectively granting access to the physical location involves unlocking a door.

41. The method of claim 37, further comprising:
employing the determinations of i), ii), and iii) for a number of users in series in order to authenticate the number of users and selectively grant access to the physical location for the number of users.

42. A method of controlling access to personal health data of a user stored on a computing device, the method comprising:
a) storing a fact known by the user;
b) storing biometric data of the user; and
c) selectively granting access to the personal health data stored on the computing device based on a number of operations, including
    i) determining that the user exhibits knowledge of the fact stored in a);
    ii) determining that the user satisfies at least one biometric challenge based upon the biometric data stored in b); and
    iii) determining that the user satisfies at least one liveness challenge which involves 1) presenting a random prompt or question to the user where the random prompt or question is organized such that it can be answered by a live person and not by a machine and 2) recognizing a valid response generated by a live person in response to a random prompt or question.

43. The method of claim 42, wherein:
the at least one biometric challenge of ii) comprises a multimodal biometric challenge.

44. The method of claim 43, further comprising:
retrieving at least a portion of the personal health data stored on the computing device; and
authorizing the release of the at least a portion of the personal health data stored on the computing device.

* * * * *